United States Patent
Tanaka et al.

(10) Patent No.: US 7,190,354 B2
(45) Date of Patent: Mar. 13, 2007

(54) INNER TYPE TOUCH PANEL, PROCESS FOR PRODUCING THE SAME AND DISPLAY UNIT

(75) Inventors: Makoto Tanaka, Kanagawa (JP); Katsumi Inoue, Kanagawa (JP); Akihiro Matsufuji, Kanagawa (JP); Kenichiro Hatayama, Kanagawa (JP); Kentaro Shiratsuchi, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 482 days.

(21) Appl. No.: 10/619,213

(22) Filed: Jul. 15, 2003

(65) Prior Publication Data

US 2004/0017364 A1 Jan. 29, 2004

(30) Foreign Application Priority Data

| Jul. 15, 2002 | (JP) | ............................ P.2002-205971 |
| Jul. 15, 2002 | (JP) | ............................ P.2002-205972 |
| Aug. 23, 2002 | (JP) | ............................ P.2002-243770 |

(51) Int. Cl.
*G09G 5/00* (2006.01)

(52) U.S. Cl. ........................................ 345/173; 349/12
(58) Field of Classification Search ........ 345/173–178; 349/12
See application file for complete search history.

(56) References Cited

U.S. PATENT DOCUMENTS

| 6,224,976 | B1 * | 5/2001 | Takushima et al. ...... 428/355 R |
| 6,261,665 | B1 * | 7/2001 | Murata et al. ............... 428/143 |
| 6,400,433 | B1 * | 6/2002 | Arakawa et al. ............ 349/117 |
| 6,611,299 | B1 * | 8/2003 | Fujii et al. ..................... 349/12 |
| 6,965,191 | B2 * | 11/2005 | Koike et al. ................. 313/112 |

FOREIGN PATENT DOCUMENTS

| JP | 05-127822 A | 5/1993 |
| JP | 2000-284126 A | 10/2000 |
| JP | 2002-86554 A | 3/2002 |

OTHER PUBLICATIONS

Hirohiko Naito, "Improvement in Visual Quality for Touch Panel", *Gekkan Disupurei*, Jan. 1991, pp. 67-70.

* cited by examiner

*Primary Examiner*—Amr A. Awad
*Assistant Examiner*—Steven E. Holten
(74) *Attorney, Agent, or Firm*—Buchanan Ingersoll & Rooney PC

(57) ABSTRACT

A touch panel comprising: a cellulose film provide with a hard coat layer having a pencil hardness of 2H or more; a polarizing film; a retardation plate; a first transparent conductive film; a second transparent conductive film; and a substrate, in this order, wherein the first and second transparent conductive films are provided so as to face to each other, and the cellulose film, the hard coat layer, the polarizing film, the retardation plate and the first transparent conductive film define a movable substrate.

9 Claims, 11 Drawing Sheets

INNER TYPE TOUCH PANEL, PROCESS FOR PRODUCING THE SAME AND DISPLAY UNIT

FIELD OF THE INVENTION

This invention relates to an inner touch panel, a process for producing the same and a display unit with the use of the same. More specifically, the invention relates to an inner touch panel having a high surface hardness and a favorable visibility and a process for producing the same.

BACKGROUND OF THE INVENTION

There are various types of touch panels such as resistance film touch panels, optical touch panels, static capacity touch panels, ultrasonic touch panels and electromagnetic inductive touch panels. Among all, resistance film touch panels are widely employed in these days mainly in mobile devices, since these touch panels have advantages of being less expensive and convenient in thinning and weight-saving and allowing external input merely by attaching on the display surface. With the remarkable progress in mobile devices such as cellular mobile telephones and personal digital assistants in recent years, it has been strongly required to achieve a high visibility under sunlight and develop thinner and lighter devices.

In a resistance film touch panel, a fixed substrate provided with a transparent conductive film and a movable substrate provided with a transparent conductive film a replaced in such a manner that the transparent conductive films face to each other via a space. By pressing the panel, the transparent conductive films are brought into contact with each other and the resistance at this point is detected, thereby detecting the contact site. A touch panel is usually attached to the surface of a display. In this case, there arises a problem that two air layers are formed and the visibility is seriously worsened due to the reflection at each air face. Moreover, there arises another problem that the device per se becomes thicker.

As a measure thereto, an inner touch panel having the function of a resistance film touch panel inserted between a polarizing plate and a liquid cell is proposed in JP-A-5-127822 and *Gekkan Disupurei* (1999.01, p. 69). According to this system wherein a circular polarizing plate comprising a polarizing plate combined with a retardation plate is placed outside (in the visible side) the touch panel from the liquid cell, the interfacial reflection in the touch panel is considerably lessened and the visibility is improved. In an inner touch panel, however, a cellulose ester film serving as a protective film for the polarizing plate is provided in the input side and, therefore, sufficient scuff resistance and visibility cannot be always achieved on the surface in the input side.

Moreover, a polarizing plate should be placed in such a manner as to incline the transmission axis of the polarizing plate by 45° in the lengthwise or crosswise direction of the screen of a liquid crystal display unit. Therefore, a polarizing plate produced in a roll form should be punched at 45° to the longer direction in the punching step. Subsequently, the thus punched polarizing plate should be bonded while controlling the axis angle to a retardation plate or the-like to a definite level, if necessary. In case of punching in the direction of 45°, the plate becomes unusable at the roll edges, which brings about another problem that the yield is lowered particularly in a large sized plate.

In producing a touch plate having a circular polarizing plate in the upper substrate, a touch panel electrode such as an silver electrode and/or an insulating coat are printed on the transparent conductive film in one side of the circular polarizing plate in the subsequent step. However, printing cannot be performed continuously since the circular polarizing plate has been already punched out in this case. Therefore, it is unavoidable to employ a sheet-fed printing procedure and thus there arise problems in productivity and cost.

As the circular polarizing plate, use is made of a retardation plate such as a λ/4 plate or a combination of retardation plates such as a λ/4 plate with a λ/2 plate. Since a polarizing film has a high moisture content, it has been a practice to bond a retardation film to a polarizing film via a protective film. As a result, the circular polarizing plate per se becomes thicker, which interferes the construction of thinner and lighter liquid crystal display units. In the case of an inner touch panel, moreover, a circular polarizing plate is used in the upper substrate of the touch panel which is the movable substrate. Therefore, the input load (hereinafter referred to as the ON load) is elevated with an increase in its thickness, which brings about another problem of worsening in the input touch.

To improve the visibility by preventing the reflection on the touch panel surface, there is proposed a method of forming an antireflective layer on the surface. By combining such an antireflective layer with an inner touch panel, in particular, both of the internal reflection and the external reflection can be lessened and thus the visibility can be remarkably improved. Because of having only an insufficient scuff resistance, however, an antireflective film is frequently damaged when used on the touch panel surface. Therefore, it is impossible at present to use an antireflective film on the touch panel surface.

SUMMARY OF THE INVENTION

An object of the invention is to provide an inner type touch panel having improved scuff resistance and visibility at a high productivity and a low cost. Another object thereof is to provide a thinner and lighter inner type touch panel having a high contrast.

The above-described objects can be established by the invention having the following constitution.

(1) An inner touch panel that is a touch panel having two substrates each provided with a transparent conductive film which are placed in such a manner that the transparent conductive films face to each other, characterized in that a movable substrate in the visible side has a polarizing film and a cellulose film provide with a hard coat layer having a pencil hardness of 2H or more is used as a protective film in the visible side while a retardation plate is used as a protective film in the other side.

(2) The inner touch panel that is an inner touch panel according to (1) characterized in that the retardation plate is a λ/4 retardation plate.

(3) The inner touch panel that is an inner touch panel according to (1) or (2) characterized in that the protective film in the visible side made of the cellulose film has a retardation value of 20 nm or less and the absorption axis of the polarizing film is placed so as to make an angle of 20° or higher but lower than 70° to the slow axis of the protective film made of the cellulose film and the retardation plate.

(4) The inner touch panel that is an inner touch panel according to (2) or (3) characterized in that the λ/4 retardation plate has at least two optically anisotropic layers and at least one of the optically anisotropic layers is made of a liquid crystal compound.

(5) The inner touch panel that is an inner touch panel according to any one of (1) to (4) characterized in that the thickness of the movable substrate in the visible side is 80 μm or more but 300 μm or less.

(6) The inner touch panel that is an inner touch panel according to any one of (1) to (5) characterized in that an antireflective layer comprising two or more layers having different refractive indexes is formed on the hard coat layer and the hard coat layer and the antireflective layer are layers comprising as the main component a hardened product of a hardening resin which hardens upon irradiation with an active energy beam or the hardening product together with fine metal oxide particles.

(7) The inner touch panel that is an inner touch panel according to any one of (1) to (6) characterized in that at least one of the two protective films of the substrate in the visible side has been preliminarily saponified in the side to be bonded to the polarizing film.

(8) A process for producing an inner touch panel that is a process for producing the inner touch panel according to any one of (1) to (7) characterized by having a step of in-line bonding a polarizing film, a protective film therefor made of a cellulose film and an retardation plate.

(9) A display unit with the use of the inner touch panel according to any one of (1) to (7) or an inner touch panel produced by a process according to (8).

DETAILED DESCRIPTION OF THE INVENTION

Modes for carrying out the invention will be described in greater detail.

In the inner type touch panel according to the invention (hereinafter sometimes referred to simply as "the touch panel according to the invention"), two substrates each provided with a transparent conductive film are placed in such a manner that the transparent conductive films face to each other.

One of these two substrates closer to a display device is a fixed substrate while the other substrate facing thereto is a movable substrate. Moreover, the touch panel according to the invention has a polarizing film in the movable substrate and it is attached onto a visible face of a display unit and employed as an inner touch panel.

Figure 1:
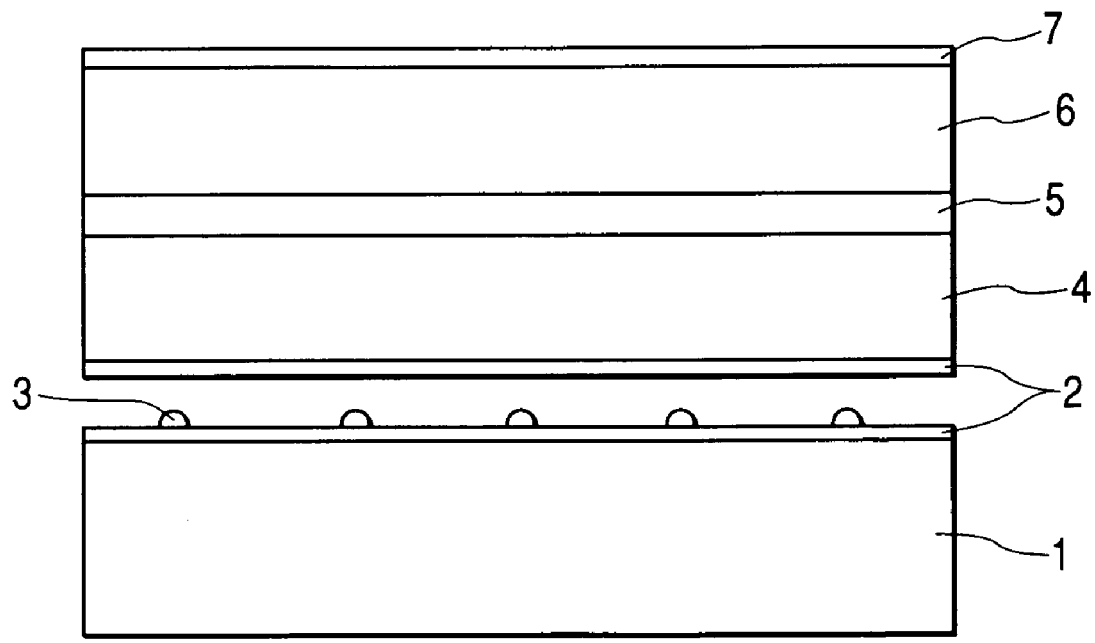
FIG. 1 is a schematic sectional view of an exemplary inner type touch panel

FIG. 1 is a schematic sectional view of an example of the inner type touch panel according to the invention. Now, the constitution of the inner type touch panel will be roughly illustrated by reference to FIG. 1, though the inner type touch panel according to the invention is not restricted to this example.

In FIG. 1, transparent conductive films 2 are formed respectively on a glass substrate 1 which is a fixed substrate and a retardation plate 4 which is a movable substrate placed in the visible side from the glass substrate 1 and these two substrates are placed in such a manner that the transparent conductive films face to each other, thereby constructing a touch panel part. Between these two transparent conductive films, a dot spacer 3 is formed to provide some space. A polarizing film 5 is formed on the retardation plate 4 and a transparent protective film is formed on the polarizing film 5. The retardation plate 4, the polarizing film 5 and the transparent protective film 6 constitute together a polarizing plate. The transparent protective film is a cellulose ester film. Using this film as a base material, a hard coat layer 7 is further formed.

In this inner type touch panel according to the invention, it is preferable from the viewpoint of improving the scuff resistance that the surface of the outermost layer has a pencil hardness of 2H or more, still preferably 3H or more and still preferably 4H or more.

Figure 13:
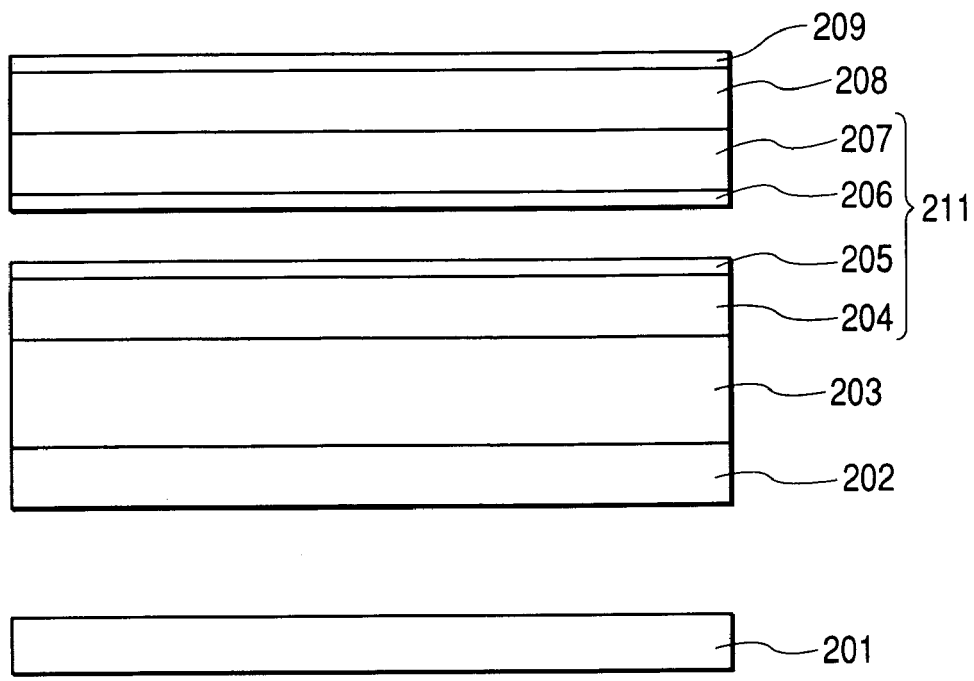
FIG. 13 is a schematic sectional view of an exemplary inner type touch panel.

To improve the visibility, it is preferable to further form an antireflective layer made up of a high-refractive index layer and a low-refractive index layer on the hard coat layer. FIG. 13 (209: Antireflective film 208: Hard coat film, 207: Circular polarizing plate, 206: Transparent conductive film, 205: Transparent conductive film, 204: Transparent substrate, 203: Liquid crystal cell, 202: Circular polarizing plate, 201: Back light)

Figure 14:
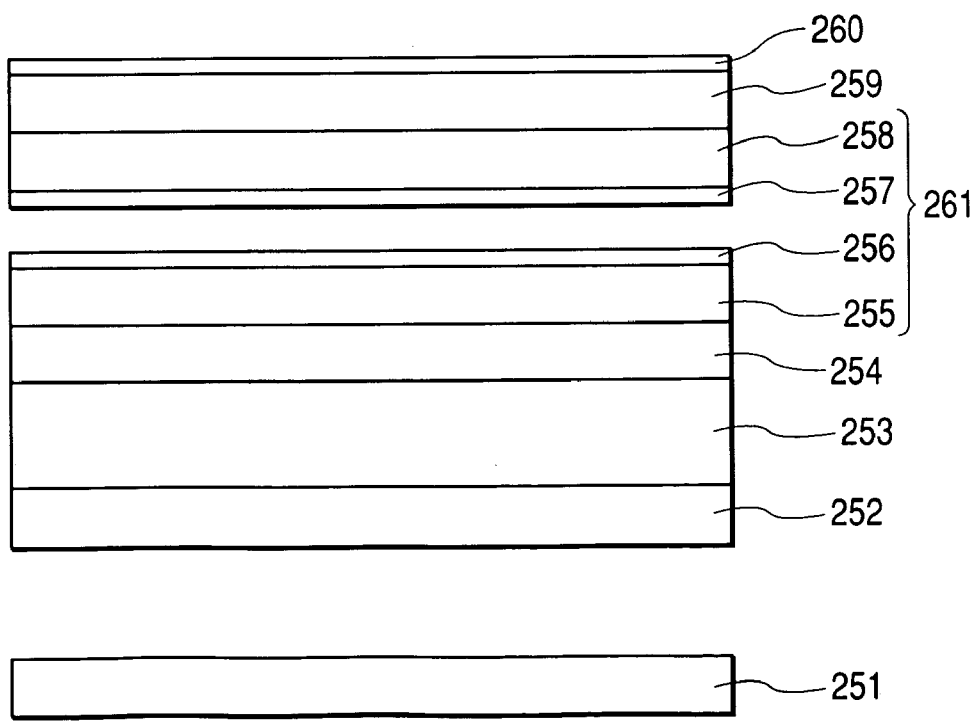
FIG. 14 is a schematic sectional view of an inner type touch panel.

FIG. 14 (260: Antireflective film, 259: Hard coat film, 258: Light shielding plate, 257: Transparent conductive film, 255: Light shielding plate, 254: Circular polarizing plate, 253: Liquid crystal cell, 252: Circular polarizing plate, 251: Back light) is a schematic sectional view of an example of the conventional inner type touch panel.

(Cellulose Ester Film)

The cellulose ester film to be used as the base material or the like in the protective film for the polarizing film or the hard coat layer in the invention is described in detail in Japan Institute of Invention and Innovation (JIII) Journal of Technical Disclosure 2001-1745.

The raw cotton is described in "4. Cellulose acylate raw cotton" (p. 7). The preparation of a solution and a film and a solvent are described in "6. Organic solvent of cellulose acylate solution" (p. 12). Additives are described in "7. Additive for cellulose acylate" (p. 16). A production process is described in "8. Process of producing cellulose acylate film" (p. 22) and "9. Casting, drying and drawing steps" (p. 25). A surface treatment is described in "10. Surface treatment" (p. 30). An undercoating and a back material are described in "11. Undercoating and back material" (p. 32). A functional layer is described in "12. Functional layer" (p. 32).

In the production of the inner type touch panel according to the invention, the cellulose film is provided with a hard coat layer and the film is bonded in-line to other base material(s) of the movable substrate via a retardation plate. That is to say, the step of bonding the film provided with the hard coat layer is consistently carried out following the step of forming other base materials (a protective film for a polarizing film, a polarizing film, a retardation plate, a transparent conductive film, etc.) of the movable substrate. As will be described hereinafter, for example, the formation of the polarizing film and the bonding of the cellulose ester film to the polarizing film are performed consistently. The in-line bonding is favorable from the viewpoints of performance and production efficiency.

To bond the cellulose film to the polarizing film, it is preferable to preliminarily carry out saponification. The in saponification is carried out by applying a liquid saponifying agent. Examples of the application method included dip coating, curtain coating, extrusion coating, bar coating and type E coating. As the solvent in the liquid saponifying agent, it is preferable to employ a solvent which has an excellent wettability appropriate for applying the liquid saponifying agent to a transparent support and can hold favorable surface conditions without forming any irregularity on the transparent support surface. More specifically speaking, it is preferable to use an alcoholic solvent and isopropyl alcohol is particularly preferable therefor. It is also possible to employ an aqueous solution of a surfactant as the solvent. As the alkali in the liquid saponifying agent, it is preferable to use an alkali soluble in the above-described solvent and KOH and NaOH are still preferable therefor. It is preferable that the liquid saponifying agent has a pH value of 10 or more, still preferably 12 or more.

Concerning the reaction conditions, it is preferable to perform the saponification at room temperature for 1 second or longer but not longer than 5 minutes, still preferably for 2 seconds or longer but not longer than 1 minute and particularly preferably for 3 seconds or longer but not longer than 30 seconds. After the completion of the saponification reaction, it is preferable to wash with water the face coated with the liquid saponifying agent.

(Hard Coat Layer)

In forming the hard coat layer, use can be made of a hardening resin. Examples of the hardening resin include heat hardening resins, resins hardening upon irradiation with an active energy beam and so on. It is preferable that the hard coat layer is a resin layer made of a resin hardening upon irradiation with an active energy beam or a hard coat layer containing such a resin.

Examples of the above-described thermally hardening resins include those with using the crosslinking reaction of a prepolymer such as melamine resins, urethane resins and epoxy resins. The resins hardening upon irradiation with an active energy beam will be illustrated hereinafter in greater detail.

It is preferable that the hard coat layer has a pencil hardness of 3H or more, still preferably 4H or more. To highly harden the hard coat layer, it is also possible to add organic or inorganic fine particles or the like. To further elevate the pencil hardness, it is effective to increase the thickness (usually ranging from 3 to 10 μm) of the hard coat layer. In this case, however, there some times arises the problem of fragile breakage such as cracking in the hard coat layer. To strike a good balance between the favorable hardness of the hard coat layer and the fragile breakage avoidance, it is therefore preferable to employ a hard coat layer having a surface elasticity controlled in a range of from 4.5 GPa to 9 GPa and the product of the surface elasticity by the cubic of the hard coat layer thickness controlled in a range of from 30 Kpa·mm$^3$ to 700 Kpa·mm$^3$. Moreover, it is preferable to strike a good balance between the favorable hardness and the fragile breakage avoidance by reducing the film thickness of the hard coat layer and adding inorganic particles and/or organic fine particles to the cellulose ester film employed as the base material or adding a polyfunctional monomer thereto followed by crosslinking the monomer to thereby elevate the hardness of the cellulose ester film. In this case, it is still preferable that the cellulose ester film component is mixed with inorganic particles and/or organic fine particles and further a polyfunctional monomer is added and crosslinked to thereby form a layer having a high hardness which is laminated on a cellulose ester film having a lower hardness. The lamination may be carried out by, for example, co-casting or coating.

In the invention, it is particularly preferable that the hard coat layer is a resin layer made of an active energy beam-hardening resin. Now, the active energy beam-hardening resin will be illustrated.

Examples of the active energy beam for hardening the above-described active energy beam-hardening resin include radial beams, γ-beams, α-beams, electron beams, UV light and so on. Among all, UV light is preferable. The active energy beam-hardening resin layer formed by irradiating the active energy beam may contain a crosslinked polymer. The active energy beam-hardening resin layer containing the crosslinked polymer can be formed by applying a coating solution containing an active energy beam-hardening resin preferably together with a polyfunctional monomer and a polymerization initiator on the base material such as the cellulose ester film as described above and then polymerizing the polyfunctional monomer by irradiating with the active energy beam. As the functional group of the polyfunctional monomer, an ethylenically unsaturated double bond group is preferable.

It is preferable that the above-described polyfunctional monomer is a polyhydric alcohol ester of acrylic acid or methacrylic acid. Examples of the polyhydric alcohol include ethylene glycol, 1,4-cyclohexanol, pentaerythritol, glycerol, trimethylolpropane, trimethylolethane, dipentaerythritol, 1,2,4-cyclohexanol, polyurethane polyol and polyester polyol. Among these compounds, trimethylolpropane, pentaerythritol, dipentaerythritol and polyurethane polyol are preferable. Use may be made of a combination of two or more polyfunctional monomers.

Examples of the polyfunctional monomer include ethylene glycol di (meth) acrylate, 1,4-dicyclohexane diacrylate, pentaerythritol tetra(meth)acrylate, pentaerythritol tri(meth) acrylate, trimethylolpropane tri(meth)acrylate, trimethylolethane tri(meth)acrylate, dipentaerythritol tetra(meth)acrylate, dipentaerythritol penta(meth)acrylate, pentaerythritol hexa(meth)acrylate, 1,2,3-cyclohexane tetramethacrylate, polyurethane polyacrylate, polyester polyacrylate, 1,4-divinylbenzene, 4-vinylbenzoic acid-2-acryloylethyl ester, 1,4-divinyl cyclohexanone, divinyl sulfone, methylenebisacrylamide and methacrylamide, bis(4-methacryloylthiophenyl) sulfide, vinylnaphthalene, vinyl phenyl sulfide, 4-methyacryloxyphenyl-4'-methoxyphenyl thioether and so on. Use may be made of a combination of two or more of these monomers.

It is preferable in the invention to use a compound having a crosslinking functional group, as a polyfunctional monomer in addition to a monomer having an ethylenically unsaturated group, to establish a higher hardness.

Examples of the crosslinking functional group include an isocyanate group, an epoxy group, an aziridine group, an oxazoline group, an aldehyde group, a carbonyl group, a hydrazine group, a carboxyl group, a methylol group and an active methylene group. As a monomer for introducing a crosslinkage structure, use can be also made of vinylsulfonic acid, an acid anhydride, a cyanoacrylate derivative, melamine, etherified methylol, ester and urethane and a metal alkoxide such as tetramethoxysilane. Moreover, use may be made of a functional group which becomes crosslinkable as the result of a decomposition reaction, for example, a block isocyanate group. That is to say, the crosslinking functional group to be used in the invention may be either that undergoes the crosslinking reaction immediately or one that becomes crosslinkable as the result of decomposition. It is preferable to use a ring-opening polymerizable and crosslinking functional group and an epoxy group is particularly preferable. The compound having a crosslinking functional group may be either a monomer or a polymer.

Examples of the epoxy compound as described above include glycidyl ethers such as tetramethylene glycol diglycidyl ether, propylene glycol diglycidyl ether, neopentyl glycol diglycidyl ether and bisphenol A diglycidyl ether, epoxy esters such as 2-hydroxy-3-phenoxyproipyl acrylate and bisphenol A-diepoxy-crylic acid adduct, monomers and oligomers of alicyclic epoxy, and compounds described in JP-A-11-209717 and JP-A-6-157819 and so on. In the case of adding the compound having a crosslinking functional group, the amount thereof preferably ranges from 5 to 50% by mass (weight), still preferably from 10 to 40% by mass in the polyfunctional monomers.

It is possible to add inorganic fine particles to the active energy beam-hardening resin layer serving as the hard coat layer to thereby improve the shrinkage ratio due to crosslinking and enhancing the coating film hardness. As the inorganic fine particles, it is preferable to use those having a high hardness and inorganic fine particles having a Mohs hardness of 6 or more are still preferable. Examples thereof include silicon dioxide particles, titanium dioxide particles, zirconium oxide particles and aluminum oxide particles.

It is preferable to add fine particles having an average particle size of 1 nm or more but not more than 400 nm, still preferably 5 nm or more but not more than 200 nm and still preferably 10 nm or more but not more than 100 nm in an amount of 10% by mass or more but not more than 60% by mass, still preferably 15% by mass or more but not more than 50% by mass and still preferably 20% by mass or more but not more than 45% by mass. Particles having an average particle size of 1 nm or less can be hardly dispersed and aggregates are formed. On the other hand, particles having an average particle size of 400 nm or more cause serious haze. Thus, these cases are both undesirable since the transparency is worsened.

It is preferable that the inorganic fine particles are added in an amount of 1% by mass or more but not more than 99% by mass, still preferably 10% by mass or more but not more than 90% by mass and still preferably 20% by mass or more but not more than 80% by mass and, in the most desirable case, 40% by mass or more but not more than 60% by mass, based on the whole active energy beam-hardening layer.

Inorganic fine particles generally have a poor affinity for the binder polymer (the active energy beam-hardening resin). By merely mixing these components with each other, there arises interface breakage and the resultant film is easily broken. Accordingly, the scuff resistance can be hardly improved thereby. To improve the affinity between the inorganic fine particles and the binder polymer, the surface of the inorganic fine particles can be treated with a surface modifier (a surface treating agent) containing an organic segment. It is preferable to employ a surface treating agent which forms a bond with the inorganic fine particles and has a high affinity for the binder polymer.

Preferable examples of a compound having a functional group capable of forming a bond with a metal atom in the inorganic fine particles include metal alkoxide compounds of silane, aluminum, titanium, zirconium and so on and compounds having an anionic group such as a phosphate, sulfonate or carboxylate group. It is also preferable that such a compound chemically binds to the binder polymer and a compound having a vinyl-type polymerizable group or the like introduced at the end is appropriate therefor. In the case of synthesizing a binder polymer from a monomer having an ethylenically unsaturated group as a polymerizable group and a crosslinking group, for example, it is preferable to use a metal alkoxide compound or an anionic group-containing compound having an ethylenically unsaturated group at the end.

Now, examples of the surface treating agent will be given. Examples of surface treating agent of organic metal compound:

| | |
|---|---|
| a) | Silane-containing organic compounds |
| a-1 | $H_2C=CHCOOC_4H_8OSi(OC_4H_9)_3$ |
| a-2 | $(H_2C=CHCOOC_4H_8O)_2Si(OC_4H_9)_2$ |
| a-3 | $(H_2C=CHCOOC_4H_8O)_3SiOC_4H_9$ |
| a-4 | $H_2C=CHCOOC_3H_6OSi(OC_4H_9)_3$ |
| a-5 | $(H_2C=CHCOOC_3H_6O)_2Si(OC_4H_9)_2$ |
| a-6 | $(H_2C=CHCOOC_3H_6O)_3SiOC_4H_9$ |
| b) | Aluminum-containing organic compounds |
| b-1 | $H_2C=CHCOOC_4H_8OAl(OC_4H_9)_2$ |
| b-2 | $H_2C=CHCOOC_3H_6OAl(OC_3H_7)_2$ |
| b-3 | $H_2C=CHCOOC_2H_4Oal(OC_2H_5)_2$ |
| b-4 | $H_2C=CHCOOC_2H_4OC_2H_4OAl(OC_2H_4OC_2H_5)_2$ |
| b-5 | $H_2C=C(CH_3)COOC_4H_8OAl(OC_4H_9)_2$ |
| b-6 | $H_2C=CHCOOC_4H_8OAl(OC_4H_9)OC_4H_8COOCH=CH_2$ |
| b-7 | $H_2C=CHCOOC_2H_4OAl\{O(1,4\text{-ph})\}_2$ |
| c) | Zirconium-containing organic compounds |
| c-1 | $H_2C=CHCOOC_4H_8OZr(OC_4H_9)_3$ |
| c-2 | $H_2C=CHCOOC_3H_7OZr(OC_3H_7)_3$ |
| c-3 | $H_2C=CHCOOC_2H_4OZr(OC_2H_5)_3$ |
| c-4 | $H_2C=C(CH_3)COOC_4H_8OZr(OC_4H_9)_3$ |
| c-5 | $\{CH_2=C(CH_3)COO\}_2Zr(OC_4H_9)_2$ |
| d) | Titanium-containing organic compounds |
| d-1 | $\{H_2C=C(CH_3)COO\}_3TiOC_2H_4OC_2H_4OCH_3$ |
| d-2 | $Ti\{OCH_2C(CH_2OC_2H_4CH=CH_2)_2C_2H_5\}_4$ |
| d-3 | $H_2C=CHCOOC_4H_8OTi(OC_4H_9)_3$ |
| d-4 | $H_2C=CHCOOC_3H_7OTi_3(OC_3H_7)_3$ |
| d-5 | $H_2C=CHCOOC_2H_4OTi(OC_2H_5)_3$ |
| d-6 | $H_2C=CHCOOSiOTi(OSiCH_3)_3$ |
| d-7 | $H_2C=C(CH_3)COOC_4H_8OTi(OC_4H_9)_2$ |

Examples of anionic functional group-containing surface treating agent:

| | |
|---|---|
| e) | Phosphate group-containing organic compounds |
| e-1 | $H_2C=C(CH_3)COOC_2H_4OPO(OH)_2$ |
| e-2 | $H_2C=C(CH_3)COOC_2H_4OCOC_5H_{10}OPO(OH)_2$ |
| e-3 | $H_2C=CHCOOC_2H_4OCOC_5H_{10}OPO(OH)_2$ |
| e-4 | $H_2C=C(CH_3)COOC_2H_4OCOC_5H_{10}OPO(OH)_2$ |
| e-5 | $H_2C=C(CH_3)COOC_2H_4OCOC_5H_{10}OPOC_{12}$ |
| e-6 | $H_2C=C(CH_3)COOC_2H_4CH\{OPO(OH)_2\}_2$ |
| e-7 | $H_2C=C(CH_3)COOC_2H_4OCOC_5H_{10}OPO(ONa)_2$ |
| e-8 | $H_2C=CHCOOC_2H_4OCOC(1,4\text{-ph})C_5H_{10}OPO(OH)_2$ |
| e-9 | $(H_2C=C(CH_3)COO)_2CHC_2H_4OCOC_5H_{10}OPO(OH)_2$ |
| f) | Examples of sulfonate group-containing organic compound |
| f-1 | $H_2C=C(CH_3)COOC_2H_4OSO_3H$ |
| f-2 | $H_2C=C(CH_3)COOC_3H_6OSO_3H$ |
| f-3 | $H_2C=C(CH_3)COOC_2H_4OCOC_5H_{10}OSO_3H$ |
| f-4 | $H_2C=CHCOOC_2H_4OCOC_5H_{10}OSO_3H$ |
| f-5 | $H_2C=CHCOOC_{12}H_{24}(1,4\text{-ph})SO_3H$ |
| f-6 | $H_2C=C(CH_3)COOC_2H_4OCOC_5H_{10}OSO_3Na$ |
| g) | Examples of carboxylate group-containing organic compound |
| g-1 | $H_2C=CHCOO(C_5H_{10}COO)_2H$ |

-continued

| g-2 | H$_2$C=CHCOOC$_5$H$_{10}$COOH |
| g-3 | H$_2$C=CHCOOC$_2$H$_4$OCO(1,2-ph)COOH |
| g-4 | H$_2$C=CHCOO(C$_2$H$_4$COO)$_2$H |
| g-5 | H$_2$C=C(CH$_3$)COOC$_5$H$_{10}$COOH |
| g-6 | H$_2$C=CHCOOC$_2$H$_4$COOH |

In the above formulae, ph represents a phenyl group.

It is preferable that these inorganic fine particles are surface-treated in a solution. Namely, it is preferable that the inorganic fine particles are added to a solution having a surface treating agent dissolved therein and stirred and dispersed with the use of ultrasonic wave, a stirrer, :a homogenizer, a dissolver or a sand grinder.

In the solution having the surface treating agent dissolved therein, it is preferable to use an organic solvent having a high polarity. Specific examples thereof include publicly known solvents such as alcohols, ketones and esters.

To the solution of the surface-modified inorganic fine particles, the polyfunctional monomer and the photopolymerization initiator as described above are added. Thus, an active energy beam-hardening coating solution can be obtained.

Examples of the photopolymerization initiator include acetophenones, benzophenones, Michler's ketones, benzoyl benzoate, benzoins, α-acyloxime esters, tetramethylthiuram monosulfide and thioxanthones. It is particularly preferable to use a photopolymerization initiator of the photocleavage type. Photopolymerization initiators of the photocleavage type are reported in *Saishin UVKoka Gijutsu* (p. 159, published by Kazuhiro Takasu, K. K. Gijutsu Joho Kyokai, 1991). As examples of commercially available photopolymerization initiators of the photocleavage type, IRGA-CURES (651, 184, 907) manufactured by Ciba-Geigy Japan and the like may be cited.

In addition to the photopolymerization initiator, use may be made of a photosensitizer. Examples of the photosensitizer include n-butylamine, triethylamine, tri-n-butylphosphine and thioxanthone. In the case of using a compound having a crosslinking functional group together, it is preferable to use a photocationic polymerization initiator too. Preferable examples of the photocationic polymerization initiator include onium salts such as diazonium salts, sulfonium salts and iodonium. As specific examples thereof, compounds described in JP-A-11-209717, JP-A-6-157819, etc. maybe cited.

It is preferable to use the photopolymerization initiator in an amount of from 0.1 to 15 parts by mass, still preferably from 1 to 10 parts by mass, per 100 parts by mass of the polyfunctional monomer.

The photopolymerization reaction is preferably carried out by irradiating with ultraviolet rays after applying and drying the active energy beam-hardening layer.

In the invention, a hard coat layer can be formed by applying the active energy beam-hardening coating onto the cellulose ester film by a publicly known film-forming method such as the dipping method, the spinner method, the spray method, the roll coater method, the gravure method or the wire bar method followed by the irradiation with the active energy beam.

In the invention, the scuff resistance of the hard coat layer can be evaluated by the pencil hardness evaluation method, the surface hardness measurement method with the use of a microhardness meter, the elastic modulus measurement method with the use of a Tensilon or the like. It is preferable to employ the pencil hardness evaluation method as specified in JIS K5400.

(Antireflective Layer)

In the invention, an antireflective layer, which is made up of a high-refractive index layer and a low-refractive index layer and is excellent in scuff resistance, may be provided on the hard coat layer formed above to thereby give an antireflective hard coat layer having a high surface hardness and an excellent scuff resistance. Needless to say, use may be made of an antireflective layer made up of three or more layers having different refractive indexes.

The low-refractive index layer and the high-refractive index layer in the invention are layers mainly comprising a hardened product of a hardening resin which hardens upon irradiation with an active energy beam or layers mainly comprising the hardened product with fine particles of a metal oxide.

As the hardening resin which hardens upon irradiation with an active energy beam, it is preferable to use a hardening resin having two or more acrylic groups in a molecule. Specific examples thereof include polyol polyacrylates such as ethylene glycol diacrylate, 1,6-hexanediol diacrylate, bisphenol-A diacrylate, trimethylolpropane triacryalte, ditrimethylolpropane tetraacrylate, pentaerythritol triacrylate, pentaerythritol tetraacrylate, dipentaerythritol pentaacrylate and dipentaerythritol hexaacrylate, polyfunctional urethane acrylates obtained by reacting a polyisocyanate hardening resin with a hydroxyl group-containing acrylate such as hydroxyethyl acrylate, epoxyacrylates obtained by reacting a polyepoxy hardening resin with a hydroxyl group-containing acrylate (methacrylate such as hydroxyethyl acrylate and so on. Moreover, use can be made of polymers which have ethylenically unsaturated groups, such as the following A-1 to A-44, in side chains.

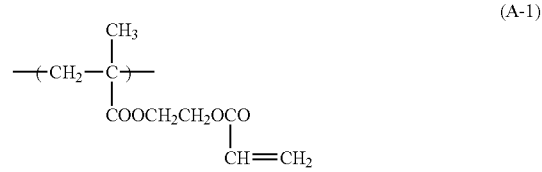

(A-1)

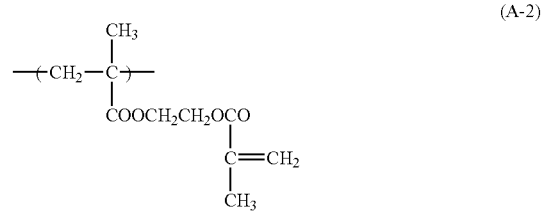

(A-2)

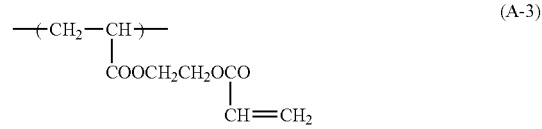

(A-3)

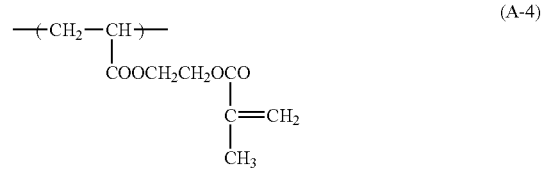

(A-4)

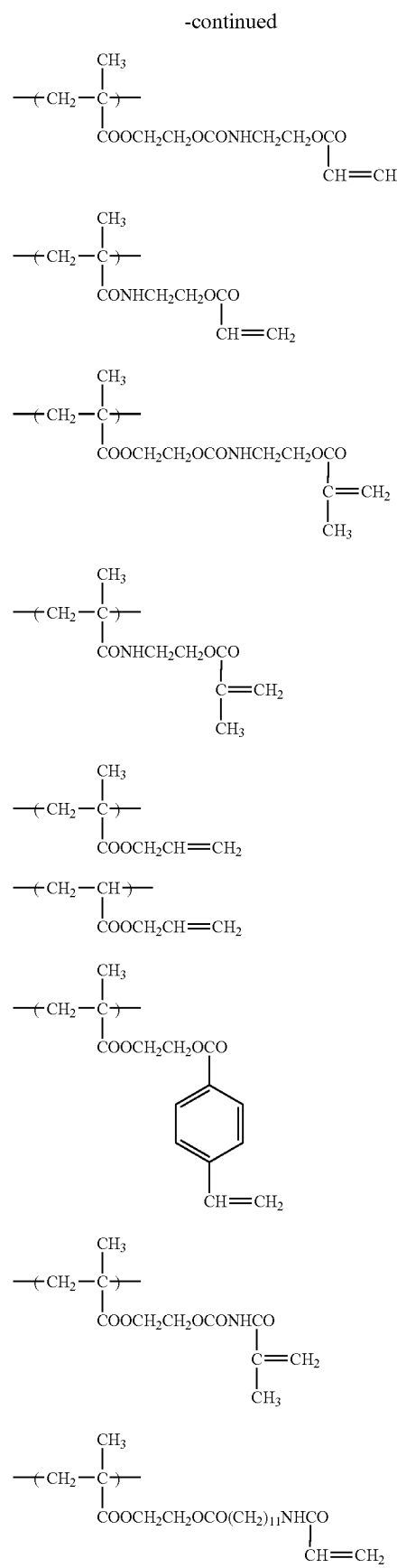
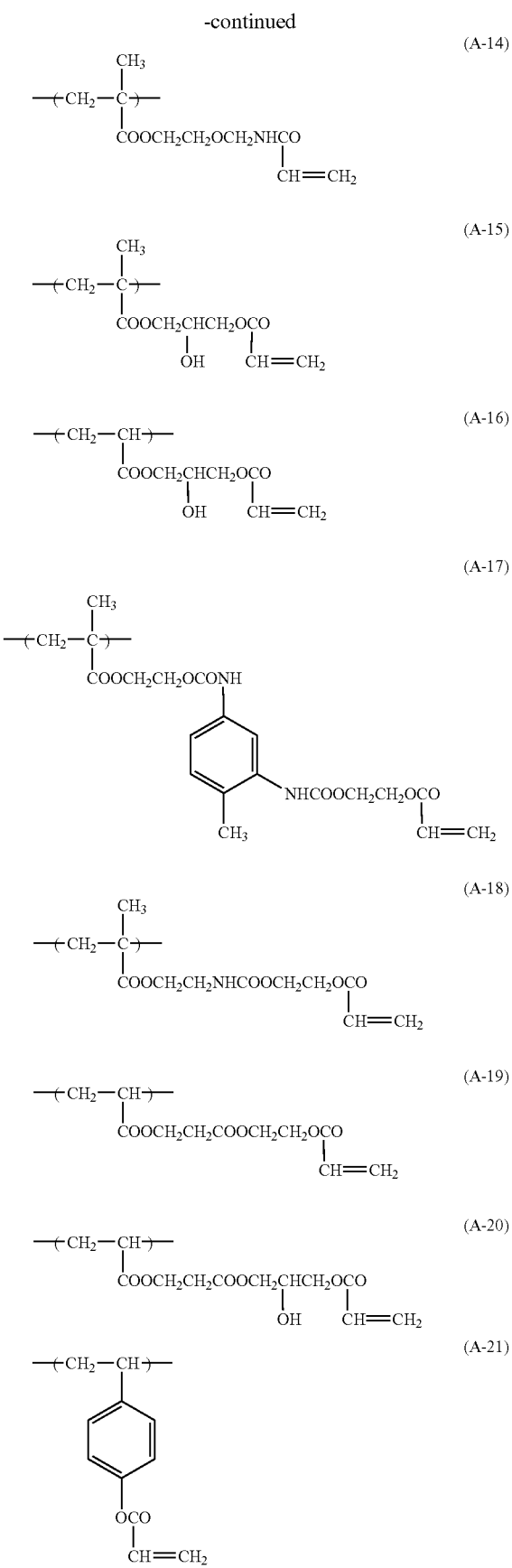

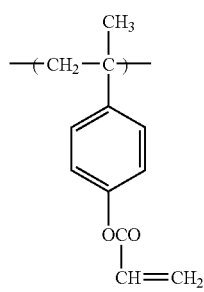
(A-22)
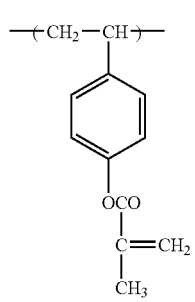
(A-23)
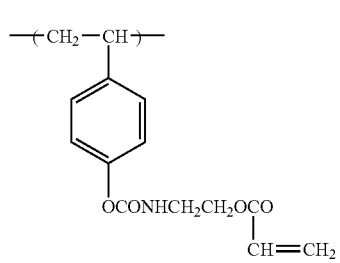
(A-24)
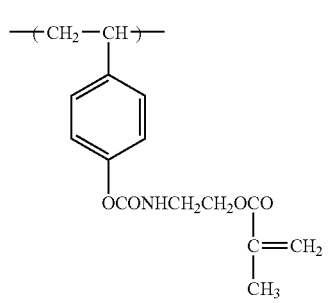
(A-25)
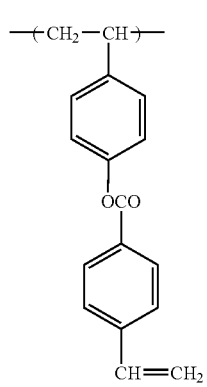
(A-26)
(A-27)
(A-28)
(A-29)
(A-30)
(A-31)
(A-32)
(A-33)

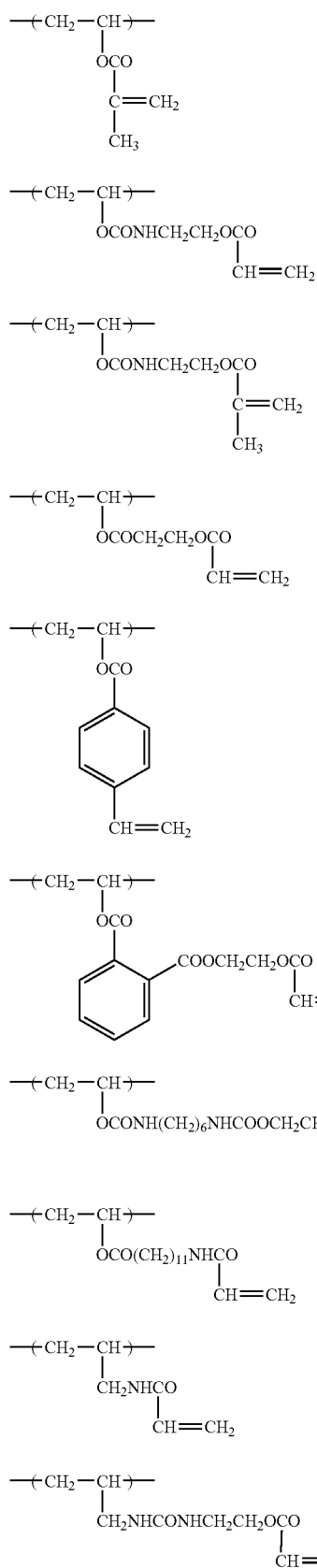

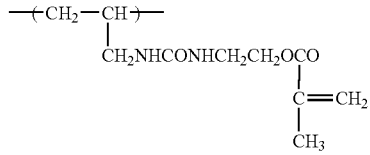

In the case where fine metal oxide particles are added to the high-refractive index layer, examples of the fine metal oxide particles include particles having an average particle size of 100 nm or below, preferably 50 nm or below, of titanium dioxide (for example, rutile, rutile/anatase mixed crystals, anatase and amorphous structure), tin oxide, indium oxide, zinc oxide, and zirconium oxide particles and aluminum oxide particles having a refractive index higher than 1.6. From the viewpoint of lowering the addition level, it is favorable to use titanium dioxide having a high refractive index.

To elevate the affinity between the inorganic fine particles and the hardening resin, it is preferable to treat the surface of the inorganic fine particles with a surface treating agent containing an organic segment. It is preferable that the surface treating agent has a functional group, which forms a bond with the inorganic fine particles or is adsorbed by the inorganic fine particles, and yet has a high affinity for the hardening resin hardening upon irradiation with the active energy beam.

Preferable examples of the surface treating agent having a functional group capable of binding to the inorganic fine particles or being adsorbed thereby include hardening resins of metal alkoxides of silane, aluminum, titanium, zirconium and so on and surface treating agents having an anionic group such as a phosphate, sulfonate or carboxylate group. As a functional group having a high affinity for the organic component, use may be made of a functional group merely having the organic component and a hydrophilic/hydrophobic nature. However, it is preferable to use a functional group capable of chemically binding to the organic group and an ethylenically unsaturated group is still preferable.

Preferable examples of the surface treating agent for the fine metal oxide particles to be used in the invention include a hardening resin having an anionic group and an ethylenically unsaturated group in a molecule and an acrylic acid copolymer having an anionic group such as a carboxylate.

As typical examples of these surface treating agents, the following unsaturated double bond-containing coupling agents, phosphate group-containing hardening resins, sulfate group-containing hardening resins, carboxylate group-containing hardening resins, etc. can be cited.

| | | |
|---|---|---|
| S-1 | $H_2C=C(X)COOC_3H_6Si(OCH_3)_3$ | |
| S-2 | $H_2C=C(X)COOC_2H_4OTi(OC_2H_5)_3$ | |
| S-3 | $H_2C=C(X)COOC_2H_4OCOC_5H_{10}OPO(OH)_2$ | |
| S-4 | $(H_2C=C(X)COOC_2H_4OCOC_5H_{10}O)_2POOH$ | |
| S-5 | $H_2C=C(X)COOC_2H_4OSO_3H$ | |
| S-6 | $H_2C=C(X)COO(C_5H_{10}COO)_2H$ | |
| S-7 | $H_2C=C(X)COOC_5H_{10}COOH$ | |

(In the above formulae, X represents H or $CH_3$.)

It is preferable that these inorganic fine particles are surface-treated in a solution. Namely, the inorganic fine particles are mechanically microdispersed in the presence of the surface treating agent. Alternatively, the inorganic fine particles are microdispersed and then the surface treating agent is added and stirred, or the surface-treatment is carried out before microdispersing the inorganic fine particles and then (optionally heating, drying and heating, or altering the pH value if needed) the inorganic fine particles are microdispersed.

In the solution having the surface treating agent dissolved therein, it is preferable to use an organic solvent having a high polarity. Specific examples thereof include publicly known solvents such as alcohols, ketones and esters.

In the invention, the high-refractive index layer is formed by using an active energy beam such as a radial beam, a γ-beam, an α-beam, an electron beam or UV light. Among all, it is particularly preferable that a polymerization initiator generating radicals with the use of UV light is added and then hardening is carried out under UV-irradiation.

Examples of the polymerization initiator generating radicals under UV-irradiation include publicly known radical generators such as acetophenones, benzophenones, Michler's ketones, benzoyl benzoate, benzoins, α-acyloxime esters, tetramethylthiuram monosulfide and thioxanthones. As cited above, sulfonium salts and iodonium salts which are usually employed as photoacid generators act as radical generators upon UV-irradiation. Therefore, use may be made of such a compound alone in the invention. To elevate the sensitivity, use may be made of a sensitizer in addition to the polymerization initiator. Examples of the sensitizer include n-butylamine, triethylamine, tri-n-butylphosphine, thioxanthone derivatives and so on.

Either one polymerization initiator or a combination of plural polymerization initiators may be used. The polymerization initiator is added in an amount of preferably from 0.1 to 15% by mass, still preferably from 1 to 10% by mass, based on the total mass of the hardening resin contained in the hardening composition for forming the high-refractive index layer.

The high-refractive index layer, which has been formed by hardening the hardening composition by irradiating with the active energy beam, has a refractive index of 1.6 or more, preferably 1.65 or more, and preferably higher by 0.2 or more than the refractive index of the low-refractive index layer.

For the low-refractive index layer, use can be made of a similar hardening resin as the hardening resin employed for the high-refractive index layer which hardens upon irradiation with an active energy beam. After hardening, the resin employed preferably has a refractive index of 1.6 or less. In the case of using fine metal oxide particles, it is preferable to employ silicon dioxide having a low refractive index. It is still preferable that the refractive index of the low-refractive index layer is 1.4 or more but not more than 1.6, still preferably 1.45 or more but not more than 1.55.

It is preferable to form these high-refractive index layer and low-refractive index layer each by applying the coating solution so as to give a thickness after hardening of from 20 to 150 nm, still preferably from 50 to 120 nm. To improve the antireflective effect, it is preferable to control the optical distance (refractive index x thickness) to ¼ of the measuring wavelength. However, it is also possible to shift the optical distance of the high-refractive index layer from ¼ of the observation wavelength, since the gap can be compensated by controlling the thickness of the low-refractive index layer.

In the invention, the high-refractive index layer and the low-refractive index layer can be formed by applying the above-described coating solutions of the active energy beam-hardening composition onto the hard coat layer in the order of the high-refractive index layer and then the low-refractive index layer by a publicly known film-forming method such as the spinner method, the gravure method or the wire bar method and then drying and hardening the same irradiating with the active energy beam.

By forming the high-refractive index layer and the low-refractive index layer on the hard coat layer, an antireflective hard coat layer can be constructed.

It is preferable that the antireflective layer has a reflectivity (positive reflectivity) of 3.0% or less, still preferably 1.5% or less.

To improve the stain-proofness of the above-described antireflective layer, the low-refractive index layer may contain a hardened resin containing fluorine and/or silicon or a layer containing a hardened resin containing fluorine and/or silicon may be formed on the low-refractive index layer.

Examples of the hardening resin corresponding to the above-described hardened resin contained in the low-refractive index layer before hardening include publicly known fluorine-containing hardening resins, silicon-containing hardening resins and hardening resins containing a fluorine-containing block together with a silicon-containing block. Among all, it is preferable to use a hardening resin having a segment highly compatible with the hardened resin mainly constituting the low-refractive index layer and/or the metal oxide and so on together with a segment containing fluorine and/or silicon. Since the low-refractive index layer contains the hardened product of such a resin, fluorine or silicon can be unevenly distributed on the surface.

As examples of the hardening resin containing fluorine and/or silicon, block copolymers and graft copolymers of a monomer containing fluorine or silicon with other hydrophilic or lipophilic monomer may be cited.

Examples of the above-described fluorine-containing monomer include perfluoroalkyl group-containing (meth) acrylic acid esters typified by hexafluoroisopropyl acrylate, heptadecafluorodecyl acrylate, and perfluoroalkyl sulfonamide ethyl acrylates and perfluoroalkylamide ethyl acrylate. Examples of the above-described silicon-containing monomer include siloxane group-containing monomers formed by reacting polydimethylsiloxane with (meth)acrylic acid, etc.

Examples of the above-described hydrophilic or lipophilic monomer include (meth)acrylic acid esters such as methyl acrylate, esters of a polyester having hydroxyl group at the end with (meth)acrylic acid, hydroxyethyl (meth) acrylate and polyethylene glycol (meth)acrylate.

Examples of commercially available hardening resins include acrylic oligomers having a perfluoroalkyl chain microdomain structure such as DEFENSA MCF-300, 312 and 323, oligomers containing a perfluoroalkyl group and a lipophilic group such as MEGAFAC F-170, F-173 and F-175, oligomers containing a perfluoroalkyl group and a hydrophilic group such as MEGAFAC F-171 (manufactured by Dainippon Ink & Chemicals), and fluoroalkyl-based block polymers of vinyl monomers having a segment excellent in surface migration and a segment compatible with resins such as MODIPER FS-700 and 710 (manufactured by NOF Corporation).

To form a stainproof layer on the low refractive index layer as described above, it is preferable to use a hardening resin containing fluorine atom and/or silicon atom and having a low surface energy. Specific examples thereof include hardening silicone resins having fluorinated hydrocarbon groups and polymers having fluorinated hydrocarbon groups which are disclosed in JP-A-57-34526, JP-A-2-19801, JP-A-3-170901, etc.

Thus, the antireflective hard coat layer constituting the touch panel according to the invention has been described. Next, other devices constituting the touch panel according to the invention and the display unit carrying the touch panel will be illustrated.

(Polarizing Plate (Polarizing Film) and Substrate for Touch Panel)

A polarizing plate is made up of a polarizing film and two transparent protective films provided in both sides of the film. In the invention, a retardation plate is employed as one of the protective films, while a cellulose ester film is employed as the other protective film and bonded thereto.

In the invention, a cellulose ester film is used as the protective film of the polarizing film in the visible side and a hard coat layer is formed directly on this film. Thus the number of the films employed can be lessened and the cost can be reduced.

In the invention, the retardation plate is employed as one of the protective films for the polarizing film.

Examples of the polarizing film include iodine-type polarizing films, dye-type polarizing films using dichromatic dyes and polyene-type polarizing films. The iodine-type polarizing films and the dye-type polarizing films are generally produced with the use of polyvinyl alcohol-based films.

The polarizing film is produced by dyeing a polyvinyl alcohol-based film with an iodine-type or dichromatic dye and then drawing. After drawing, it is bonded to the protective film and the retardation plate.

In the invention, a cellulose film, which also serves as the base material of the hard coat layer, is used as the protective film in the visible side. After saponifying the cellulose film, it can be bonded to the polarizing film. In this step, it is preferable form the viewpoints of performance and production efficiency that the bonding of the cellulose film to the polarizing film and the construction of the polarizing film are consistently carried out. It is still preferable that the retardation plate is bonded to the polarizing film at the same time.

Concerning the spatial relationship between the slow axis (lag phase axis) of the retardation plate and the transmission axis of the polarizing film in the liquid crystal display unit according to the invention, it is preferable to arrange them substantially at an angle of 45°, though the relation varies depending on the type of the liquid crystal display unit to which they are applied.

(Circular Polarizing Plate)

Now, the circular polarizing plate to be used in the display unit provided with the touch panel according to the invention (hereinafter referred to also as "the circular polarizing plate according to the invention") will be described in greater detail.

The circular polarizing plate according to the invention has a polarizable film. A protective film is provided on one face of the polarizing film while a $\lambda/4$ plate is provided on the other face thereof.

In usual, a polarizing plate in a continuous length (usually in a rolled state) is produced and punched out depending on the purpose to give a practically available polarizing plate. Unless otherwise noted, the term polarizing plate used in the present description involves both of a polarizing plate in a continuous length and a polarizing plate having been punched out.

As examples of the $\lambda/4$ plate constituting the circular polarizing plate according to the invention, citation may be made of a retardation plate wherein a double refraction film having a large retardation is overlaid upon a double refraction film having a small retardation in such a manner that their optical axes are perpendicular to one another as reported by JP-A-5-27118 and JP-A-5-27119, a retardation plate wherein a polymer film with $\lambda/4$ at a specific wavelength is overlaid upon another polymer film made of the same material with $\lambda/2$ at the same wavelength to thereby give $\lambda/4$ over a wide range as reported by JP-A-10-68816, a retardation plate wherein two polymer films are laminated to thereby achieve $\lambda/4$ over a wide range as reported by JP-A-10-90521, a retardation plate with the use of a denatured polycarbonate film to thereby achieve $\lambda/4$ over a wide range as reported by WO 00/26705, a retardation plate with the use of a cellulose acetate film to thereby achieve $\lambda/4$ over a wide range as reported by WO 00/65384.

In the invention, it is also preferable to use a $\lambda/4$ plate which is obtained by combining at least two optically anisotropic layers. Combinations of two optically anisotropic layers are classified into the following two types.

In the first embodiment, the slow axis of the first optically anisotropic layer intersects with the slow axis of the second optically anisotropic layer substantially at 60°.

It is preferable that the first optically anisotropic layer has a phase difference of substantially $\lambda/2$ at a definite wavelength ($\lambda$) while the second optically anisotropic layer has a phase difference of substantially $\lambda/4$ at the definite wavelength ($\lambda$). It is particularly preferable that the definite wavelength ($\lambda$) is 550 nm, i.e., almost the midpoint in the visible region.

In the case where the definite wavelength ($\lambda$) is 550 nm, the retardation of the first optically anisotropic layer preferably ranges from 150 to 300 nm, still preferably from 180 to 300 nm, still preferably from 200 to 280 nm, and most desirably from 210 to 270 nm. In the case where the definite wavelength ($\lambda$) is 550 nm, the retardation of the second optically anisotropic layer preferably ranges from 60 to 170 nm, still preferably from 70 to 150 nm, still preferably from 80 to 135 nm, and most desirably from 80 to 120 nm.

In the case where a linear polarizing film is combined with a $\lambda/4$ plate to give a circular polarizing plate, it is preferable that the polarizing axis of the linear polarizing film intersects with the slow axis of one of the optically anisotropic layers substantially at 75° whereas the polarizing axis of the linear polarizing film intersects with the slow axis of one of the other optically anisotropic layer substantially at 15°.

In the case where the $\lambda/4$ plate further has a transparent support having the longer direction, it is preferable that the longer direction of the transparent support intersects with the slow axis of one of the optically anisotropic layers substantially at 75° whereas the polarizing axis of the linear polarizing film intersects with the slow axis of one of the other optically anisotropic layer substantially at 15°.

In the second embodiment, the slow axis of the first optically anisotropic layer intersects with the slow axis of the second optically anisotropic layer substantially at right angle.

It is preferable that the difference between the retardation of the first optically anisotropic layer measured at a wavelength of 450 nm and the retardation of the second optically anisotropic layer measured at a wavelength of 450 nm and the difference between the retardation of the first optically anisotropic layer measured at a wavelength of 590 nm and the retardation of the second optically anisotropic layer measured at a wavelength of 590 nm each substantially corresponds to ¼ of the wavelength.

In the case where a linear polarizing film is combined with a λ/4 plate to give a circular polarizing plate, it is preferable that the polarizing axis of the linear polarizing film intersects with the slow axis of one of the optically anisotropic layers substantially at 45° whereas the polarizing axis of the linear polarizing film intersects with the slow axis of one of the other optically anisotropic layer substantially at 45°.

In the case where the λ/4 plate further has a transparent support having the longer direction, it is preferable that the longer direction of the transparent support intersects with the slow axis of one of the optically anisotropic layers substantially at 45° whereas the polarizing axis of the linear polarizing film intersects with the slow axis of one of the other optically anisotropic layer substantially at 45°.

[Constitution of λ/4 Plate]

Figure 15:
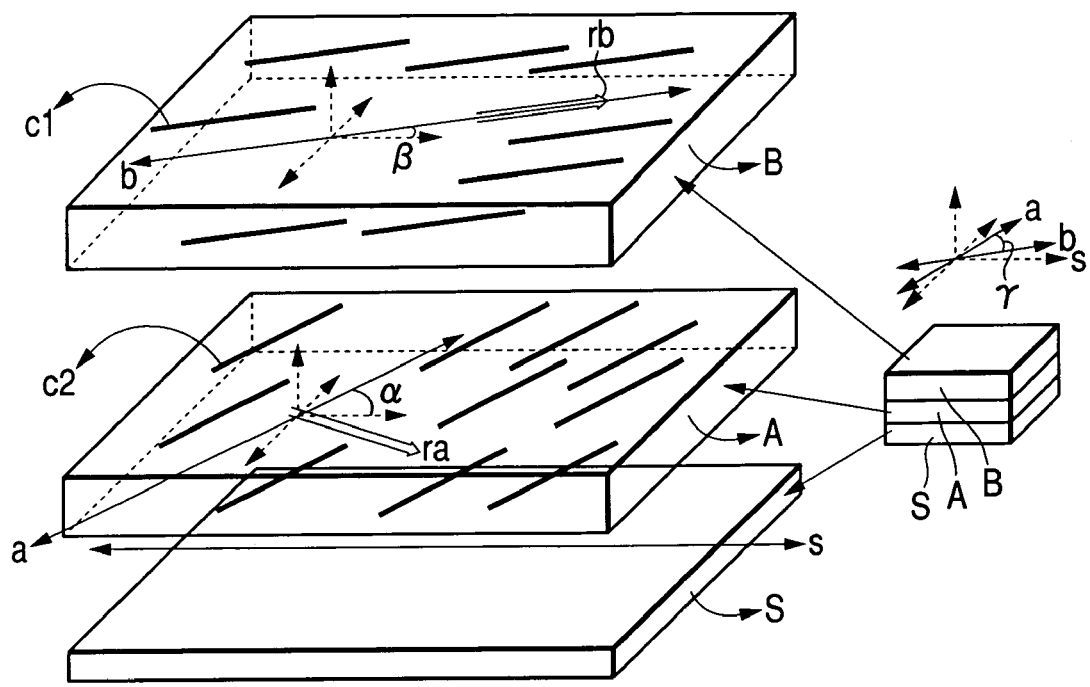
FIG. 15 is a schematic view of a λ/4 plate.

FIG. 15 is a schematic view showing a typical constitution of the λ/4 plate.

The λ/4 plate shown in FIG. 15 has a transparent support (S), a first optically anisotropic layer (A) and a second optically anisotropic layer (B).

The phase difference of the first optically anisotropic layer (A) is adjusted substantially to λ/2 (150 to 350 nm at a wavelength of 550 nm). The phase difference of the second optically anisotropic layer (B) is adjusted substantially to λ/4 (60 to 170 nm at a wavelength of 550 nm).

The angle ($\alpha$) between the longer direction (s) of the transparent support (S) and the in-plane slow axis (a) of the first optically anisotropic layer (A) is 75°. The angle ($\beta$) between the longer direction (s) of the transparent support (S) and the in-plane slow axis (b) of the second optically anisotropic layer (B) is 15°. The angle ($\gamma$) between the in-plane slow axis (b) of the second optically anisotropic layer (B) and the in-plane slow axis (a) of the first optically anisotropic layer (A) is 60°.

The first optically anisotropic layer (A) and the second optically anisotropic-layer (B) shown in FIG. 15 respectively contain rod-shaped liquid crystal compounds (c1 and c2). The rod-shaped liquid crystal compounds (c1 and c2) have been homogeneously oriented. The longer directions of these rod-shaped liquid crystal compounds (c1 and c2) correspond respectively to the in-plane slow axes (a and b) of the optically anisotropic layers (A and B).

The orientation directions of the rod-shaped liquid crystal compounds (c1 and c2) are determined depending on the rubbing directions (ra and rb) of orientation films. The in-plane slow axis (a) of the first optically anisotropic layer (A) intersects at right angle with the rubbing direction (ra) of the orientation film. That is to say, an perpendicular orientation film is employed as the orientation film of the first optically anisotropic layer (A). On the other hand, the in-plane slow axis (b) of the second optically anisotropic layer is (B) is parallel to the rubbing direction (rb) of the orientation film. That is to say, a parallel orientation film is employed as the orientation film of the second optically anisotropic layer (B).

The rod-shaped liquid crystal compounds (c1 and c2) may be replaced by disc-shaped liquid crystal compounds. In the case of using the disc-shaped liquid crystal compounds, these disc-shaped liquid crystal compounds are also oriented homogeneously (i.e., holding the discs erect). The directions of the disc plane of the disc-shaped liquid crystal compounds correspond respectively to the slow axes of the optically anisotropic layers.

Figure 16:
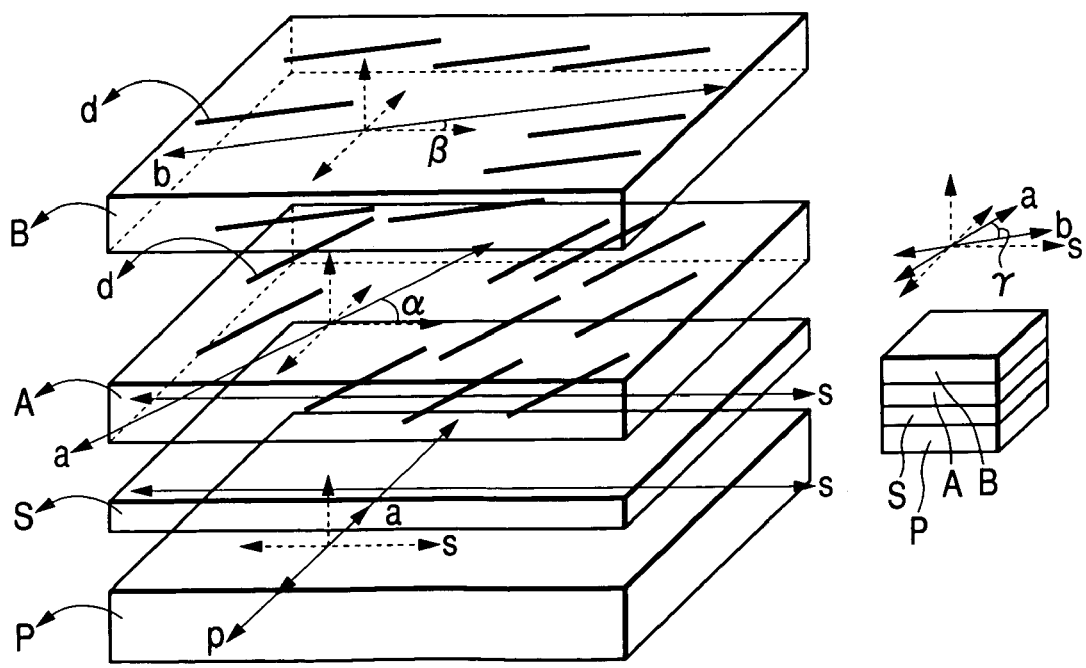
FIG. 16 is a schematic view of a circular polarizing plate.

FIG. 16 is a schematic view showing a typical constitution of a circular polarizing plate.

The circular polarizing plate shown by FIG. 16 has a λ/4 plate made up of a transparent support (S), a first optically anisotropic layer (A) and a second optically anisotropic layer (B) as shown in FIG. 15 and a linear polarizing film (P).

Similar to FIG. 15, the angle ($\alpha$) between the longer direction (s) of the transparent support (S) and the slow axis (a) of the first optically anisotropic layer (A) is 75°. The angle ($\beta$) between the in-plane slow axis (b) of the second optically anisotropic layer (B) and the in-plane slow axis (a) of the first optically anisotropic layer (A) is 15°. The angle ($\gamma$) between the in-plane slow axis (b) of the second optically anisotropic layer (B) and the in-plane slow axis (a) of the first optically anisotropic layer (A) is 60°. The polarizing axis (p) of the linear polarizing film (P) intersects at right angle with the longer direction (s) of the transparent support (S).

Also, the first optically anisotropic layer (A) and the second optically anisotropic layer (B) shown in FIG. 16 respectively contain rod-shaped liquid crystal compounds (c1 and c2). The rod-shaped liquid crystal compounds (c1 and c2) have been homogeneously oriented. The longer directions of these rod-shaped liquid crystal compounds (c1 and c2) correspond respectively to the in-plane slow axes (a and b) of the optically anisotropic layers (A and B).

The rod-shaped liquid crystal compounds (c1 and c2) may be replaced by disc-shaped liquid crystal compounds. In the case of using the disc-shaped liquid crystal compounds, these disc-shaped liquid crystal compounds are also oriented homogeneously (i.e., holding the discs erect). The directions of the disc plane of the disc-shaped liquid crystal compounds correspond respectively to the slow axes of the optically anisotropic layers.

The circular polarizing plate shown in FIG. 16 has a constitution of giving right circular polarization. In a constitution giving left circular polarization, the optical axis of the first optically anisotropic layer having a phase difference of λ/2 is arranged at −75° while the optical axis of the second optically anisotropic layer having a phase difference of λ/4 is arranged at −15. Accordingly, the rubbing direction of the first optically anisotropic layer is at +15° and the rubbing direction of the second optically anisotropic layer is at −15°.

[Optically Anisotropic Layer]

An optically anisotropic layer may be made of a liquid crystal compound or a polymer film. In the invention, at least one of the two optically anisotropic layers is made of a liquid crystal compound. It is preferable that at least two optically anisotropic layers are made of liquid crystal compounds.

Examples of the polymer to be used in an optically anisotropic layer made of a polymer film include polyolefins (for example, polyethylene, polypropylene, norbornene, norbornene-based polymers), polyvinyl alcohol, polymethacrylic acid esters, polyacrylic acid esters and cellulose esters. Moreover, use may be made of a copolymer of these polymers or a polymer mixture.

It is preferable that the optical anisotropy of the film is achieved by drawing. As the drawing, monoaxial drawing is preferred. As the monoaxial drawing, it is preferable to employ lengthwise monoaxial drawing with the use of a difference in peripheral speeds of two or more rolls or tenter drawing wherein a polymer is fastened at both sides and oriented in the crosswise direction. It is also possible that two or more polymer films are used so that the optical properties of the films as a whole fulfill the above-described requirements.

In the case where the polymer employed has a positive inherent double refractive index, the direction achieving the maximum in-plane refractive index of the polymer film corresponds to the drawing direction of the film. In the case where the polymer employed has a negative inherent double refractive index, the direction achieving the maximum in-plane refractive index of the polymer film is perpendicular to the drawing direction of the film.

To minimize unevenness in double refraction, it is preferable to produce the polymer film by the solvent cast method. The thickness of the polymer film preferably ranges from 20 to 500 μm, still preferably from 50 to 200 μm and most desirably from 50 to 100 μm.

As the liquid crystal compound, a rod-shaped liquid crystal compound or a disc-shaped liquid crystal compound is preferable. It is preferable that the liquid crystal compound has been substantially uniformly oriented. It is still preferable that the liquid crystal compound has been fixed in the substantially oriented state. It is the most desirable that the liquid crystal compound has been fixed by a polymerization reaction. It is preferable that the liquid crystal compound has been homogeneously oriented.

As the rod-shaped liquid crystal compound, use may be preferably made of azomethine compounds, azoxy compounds, cyanobiphenyl compounds, cyanophenyl esters, benzoic acid esters, cyclohexanecarboxylic acid phenyl esters, cyanophenyl cyclohexanes, cyano-substituted phenylpyrimidines, phenyldioxanes, tolanes and alkenylcyclohexylbenzonitriles. Further, use may be made of not only these low-molecular weight liquid crystal compounds but also high-molecular weight liquid crystal compounds. It is preferable to fix the orientation of a rod-shaped liquid crystal compound by a polymerization reaction. Polymerizable rod-shaped liquid crystal compounds are described in *Makromol. Chem.*, vol. 190, p. 2255 (1989), *Advanced Materials*, vol. 5, p. 107 (1993), U.S. Pat. No. 4,683,327, U.S. Pat. No. 5,622,648, U.S. Pat. No. 5,770,107, WO 95/22586, WO 95/24455, WO 97/00600, WO 98/23580, WO 98/52905, JP-A-1-272551, JP-A-6-16616, JP-A-7-110469 and JP-A-11-80081.

Polymerizable rod-shaped liquid crystal compounds represented by the following formula (I) are particularly preferable.

Q1-L1-Cy1-L2-(Cy2-L3)$_n$-Cy3-L4-Q2   (I)

In the formula (I), Q1 and Q2 independently represent each a polymerizable group. It is preferable that the polymerization reaction of these polymerizable group is carried out by addition polymerization (including ring-opening polymerization) or fusion polymerization. In other words, it is preferable that the polymerizable groups are-functional groups capable of undergoing addition polymerization reaction or fusion polymerization reaction.

Examples of the polymerizable groups are as follows.

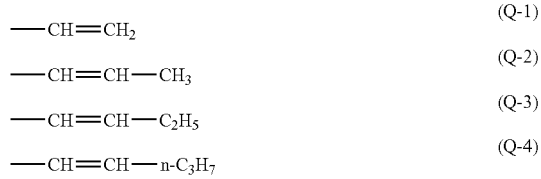

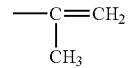(Q-5)

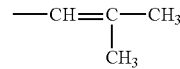(Q-6)

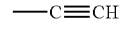(Q-7)

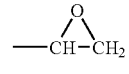(Q-8)

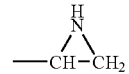(Q-9)

(Q-10)

(Q-11)

(Q-12)

(Q-13)

(Q-14)

(Q-15)

(Q-16)

(Q-17)

It is preferable that the polymerizable groups (Q1 and Q2) are unsaturated polymerizable groups (Q-1 to Q-7), an epoxy group (Q-8) or an aziridinyl group (Q-9), still preferably unsaturated polymerizable groups and most desirably ethylenically unsaturated polymerizable groups (Q-1 to Q-6).

In the formula (I), L1 and L4 independently represent each a divalent linking group.

It is preferable that L1 and L2 independently represent divalent linking groups selected from the group consisting of —O—, —S—, —CO—, —NR1-, divalent chain aliphatic groups, divalent cyclic groups and combinations thereof. The above R1 is an alkyl group having 1 to 7 carbon atoms or a hydrogen atom.

Examples of combined divalent linking groups are as follows. In each case, the left side binds to Q (Q1 or Q2) while the right side binds to Cy (Cy1 or Cy2).

| | |
|---|---|
| L-1: | —CO—O—(divalent chain aliphatic group)—O- |
| L-2: | —CO—O—(divalent chain aliphatic group)—O-(divalent cyclic group)—CO—O— |
| L-3: | —CO—O—(divalent chain aliphatic group)—O—(divalent cyclic group)—O-CO- |
| L-4: | —CO—O—(divalent chain aliphatic group)—O—(divalent cyclic group)—(divalent chain aliphatic group) |
| L-5: | —CO—O—(divalent chain aliphatic group)—O—(divalent cyclic group) |
| L-6: | —CO—O—(divalent chain aliphatic group)—O—(divalent cyclic group)-(divalent chain aliphatic group)—CO—O— |
| L-7: | —CO—O—(divalent chain aliphatic group)—O—(divalent cyclic group)—O—CO—(divalent chain aliphatic group) |

The divalent chain aliphatic group means an alkylene group, a substituted alkylene group, an alkenylene group, a substituted alkenylene group, an alkynylene group or a substituted alkynylene group. An alkylene group, a substituted alkylene group, an alkenylene group and a substituted alkenylene group are preferable and an alkylene group and an alkenylene group are still preferable therefor.

The alkylene group may be branched. It is preferable that the alkylene group has from 1 to 12, still preferably from 2 to 10 and most desirably from 3 to 8, carbon atoms.

The alkylene moiety of the substituted alkylene group is the same as the alkylene group as described above. Examples of the substituents of the substituted alkylene group include halogen atoms.

The alkenylene group may be branched. It is preferable that the alkenylene group has from 2 to 12, still preferably from 2 to 8 and most desirably from 2 to 4, carbon atoms.

The alkenylene moiety of the substituted alkenylene group is the same as the alkenylene group as described above. Examples of the substituents of the substituted alkenylene group include halogen atoms.

The alkynylene group may be branched. It is preferable that the alkynylene group has from 2 to 12, still preferably from 2 to 8 and most desirably from 2 to 4, carbon atoms.

The alkynylene moiety of the substituted alkynylene group is the same as the alkynylene group as described above. Examples of the substituents of the substituted alkynylene group include halogen atoms.

The definition and examples of the divalent cyclic group are the same as the definition and examples of Cy1 to Cy3 which will be described hereinafter.

It is preferable that R1 is an alkyl group having from 1 to 4 carbon atoms or a hydrogen atom, still preferably an alkyl group having from 1 or 2 carbon atoms or a hydrogen atom and most desirably a hydrogen atom.

In the formula (I), L2 and L3 independently represent each a single bond or a divalent linking group.

It is preferable that the divalent linking groups are selected from a group consisting of —O—, —S—, —CO—, —NR2-, divalent chain aliphatic groups, divalent cyclic groups and combinations thereof. The above R2 is an alkyl group having 1 to 7 carbon atoms or a hydrogen atom.

The definition and examples of the divalent chain aliphatic group are the same as the definition and examples of L1 and L4.

The definition and examples of the divalent cyclic group are the same as the definition and examples of Cy1 to Cy3 which will be described hereinafter.

It is preferable that R2 is an alkyl group having from 1 to 4 carbon atoms or a hydrogen atom, still preferably an alkyl group having from 1 or 2 carbon atoms or a hydrogen atom and most desirably a hydrogen atom.

In the formula (I), Cy1, Cy2 and Cy3 independently represent each a divalent cyclic group.

The rings contained in these cyclic groups are preferably 5-membered rings, 6-membered rings or 7-membered rings, still preferably 5-membered rings or 6-membered rings and most desirably 6-membered rings.

The rings contained in the cyclic groups may be fused rings, though single rings are preferred to fused rings.

The rings contained in the cyclic groups may be either aromatic rings, aliphatic rings or heterocycles. Examples of the aromatic rings include a benzene ring and a naphthalene ring. Examples of the aliphatic rings include a cyclohexane ring. Examples of the heterocycles include a pyridine ring and a pyrimidine ring.

As a cyclic group having a benzene ring, 1,4-phenylene is preferable. As a cyclic group having a naphthalene ring, naphthalene-1,5-diyl and naphthalene-2,6-diyl are preferable. As a cyclic group having a pyridine ring, pyridine-2,5-diyl is preferable. As a cyclic group having a pyrimidine ring, pyrimidine-2,5-diyl is preferable.

As the cyclic group, 1,4-phenylene or 1,4-cyclohexylane is particularly preferable.

The cyclic group may have a substituent. Examples of the substituent include halogen atoms, cyano, nitro, alkyl groups having from 1 to 5 carbon atoms, halogenated alkyl groups having from 1 to 5 carbon atoms, alkoxy groups having from 1 to 5 carbon atoms, alkylthio groups having form 1 to 5 carbon atoms, acyl groups having from 1 to 5 carbon atoms, acyloxy groups having from 1 to 6 carbon atoms, alkoxycarbonyl groups having from 2 to 6 carbon atoms, carbamoyl, alkylated carbamoyl groups having from 2 to 6 carbon atoms and amido groups having from 2 to 6 carbon atoms.

In the formula (I), n is 0, 1 or 2. In the case where n is 2, two L3's and Cy2's may be either the same or different. It is preferable that n is 1 or 2, still preferably 1.

Disc-shaped liquid crystal compounds have been reported in various documents (C. Destrade et al., *Mol. Crysr. Liq. Cryst.*, vol. 71, page 111 (1981); ed. by Japan Society of Chemistry, *Kikan Kagaku Sosetsu*, No. 22, *Ekisho no Kagaku*, chap. 4, chap. 10, paragraph 2 (1994); B. Kohne et al., *Agnew. Chem. Soc. Chem. Comm.*, page 1794 (1985); J. Zhang et al., J. Am. Chem. Soc., vol. 116, page 2655 (1994)). JP-A-8-27284 discloses polymerization of a disk-shaped liquid crystal compound.

To fix a disk-shaped liquid crystal compound by polymerization, it is necessary to bond a polymerizable group, as a substituent, to the disk core of the disk-shaped liquid crystal compound. When the polymerizable group is directly bonded to the disc core, however, the oriented state can be hardly held during the polymerization reaction. Therefore, a linking group is introduced between the disc core and the polymerizable group. Accordingly, it is preferable that the disk-shaped liquid crystal compound having the polymerizable group is a compound represented by the following formula (II).

D(-L-Q)$_n$                                               (II)

In the formula (II), D represents a disc core; L represents a divalent linking group; Q represents a polymerizable group; and n is an integer of from 4 to 12.

In the formula (II), it is preferable that the divalent linking group (L) is a divalent linking group selected from the group consisting of alkylene groups, alkenylene group, arylene groups, —CO—, —NH—, —O—, —S— and combinations thereof. It is still preferable that the divalent linking group (L) is a group wherein at least two divalent groups selected from the group consisting of alkylene groups, alkenylene group, arylene groups, —CO—, —NH—, —O— and —S— are combined. It is most desirable that the divalent linking group (L) is a group wherein at least two divalent groups selected from the group consisting of alkylene groups, alkenylene group, arylene groups, —CO— and —O— are combined. It is preferable that an alkylene group has from 1 to 12 carbon atoms. It is preferable that an alkenylene group has from 2 to 12 carbon atoms. It is preferable that an arylene group has from 6 to 10 carbon atoms. The alkylene group, the alkenylene group and the arylene group may have a substituent (for example, an alkyl group, a halogen atom, cyano, an alkoxy group, an acyloxy group).

Examples of the divalent linking group (L) areas follows. In each case, the left side binds to the disc core (D) while the right side binds to the polymerizable group (Q). Al represents an alkylene group or an alkenylene group, and AR represents an arylene group.

| | |
|---|---|
| L-11: | —AL—CO—O—AL— |
| L-12: | —AL—CO—O—AL—O— |
| L-13: | —AL—CO—O—AL—O—AL— |
| L-14: | —AL—CO—O—AL—O—CO— |
| L-15: | —CO—AR—O—AL— |
| L-16: | —CO—AR—O—AL—O— |
| L-17: | —CO—AR—O—AL—O—CO— |
| L-18: | —CO—NH—AL— |
| L-19: | —NH—AL—O— |
| L-20: | —NH—AL—O—CO— |
| L-21: | —O—AL— |
| L-22: | —O—AL—O— |
| L-23: | —O—AL—O—CO— |
| L-24: | —O—AL—O—CO—NH—AL— |
| L-25: | —O—AL—S—AL— |
| L-26: | —O—CO—AL—AR—O—AL—O—CO— |
| L-27: | —O—CO—AR—O—AL—CO— |
| L-28: | —O—CO—AR—O—AL—O—CO— |
| L-29: | —O—CO—AR—O—AL—O—AL—O—CO— |
| L-30: | —O—CO—AR—O—AL—O—AL—O—AL—O—CO— |
| L-31: | —S—AL— |
| L-32: | —S—AL—O— |
| L-33: | —S—AL—O—CO— |
| L-34: | —S—AL—S—AL— |
| L-35: | —S—AR—AL— |

The polymerizable group (Q) in the formula (II) is determined depending on the polymerization reaction. The definition and examples of the polymerizable group (Q) are the same as the definition and examples of the polymerizable groups Q1 and Q2 in the formula (I).

In the case of combining a plural number of L's and Q's, it is preferable that they are the same, though they may be different from each other. Use may be also made of two or more disc-shaped liquid crystal compounds together (for example, a molecule having an asymmetric carbon atom in the divalent linking group together with another molecule having no asymmetric carbon atom).

It is preferable to add a horizontal orientation promoter to the optically anisotropic layer formed by the liquid crystal compound.

Horizontal orientation promoters maybe classified into high-molecular weight compounds and low-molecular weight compounds. Examples of the high-molecular weight type horizontal orientation promoters include polyvinyl butyral, polymelamine and polymethyl methacrylate. Examples of the low-molecular weight horizontal orientation promoters are as follows.

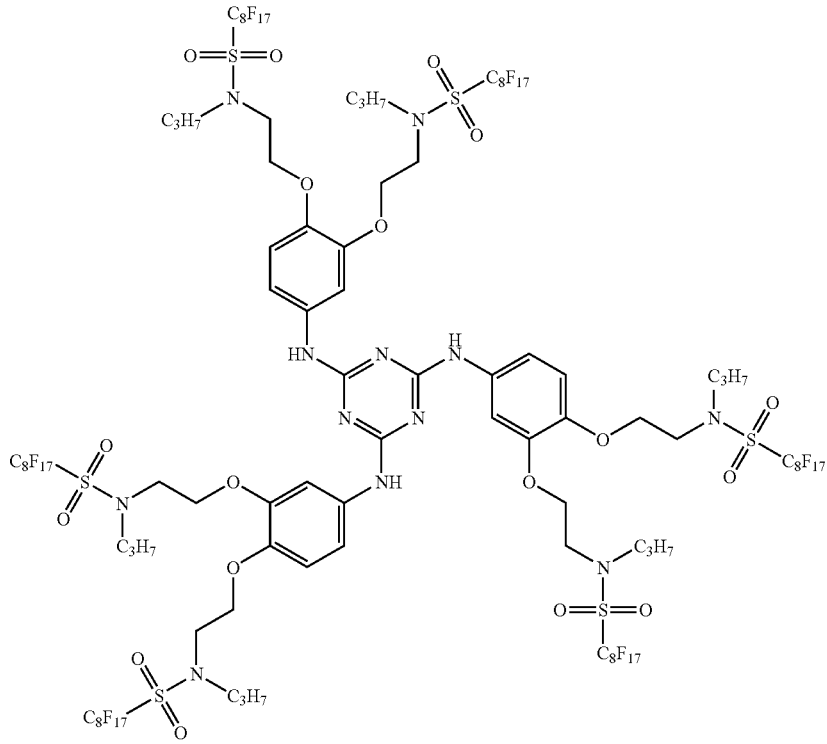

-continued
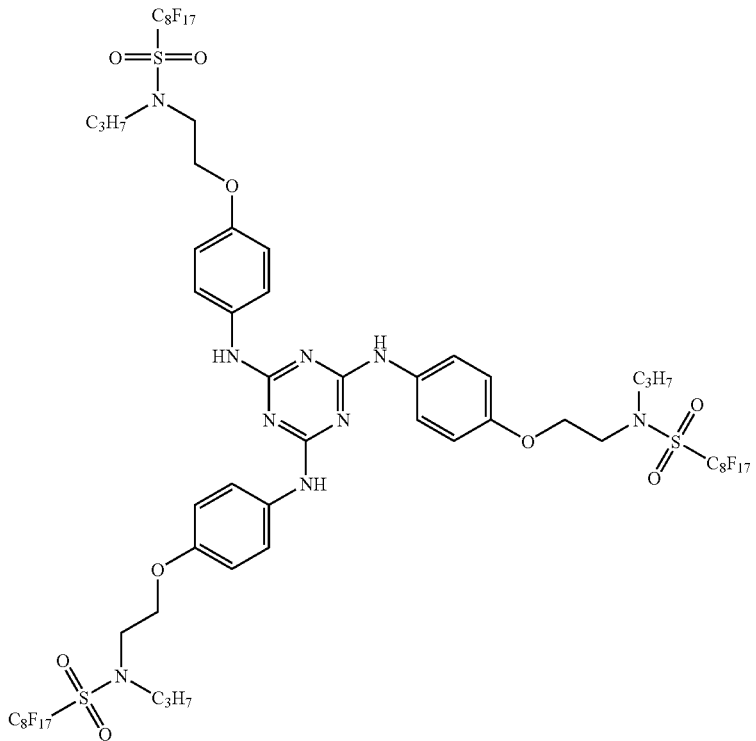
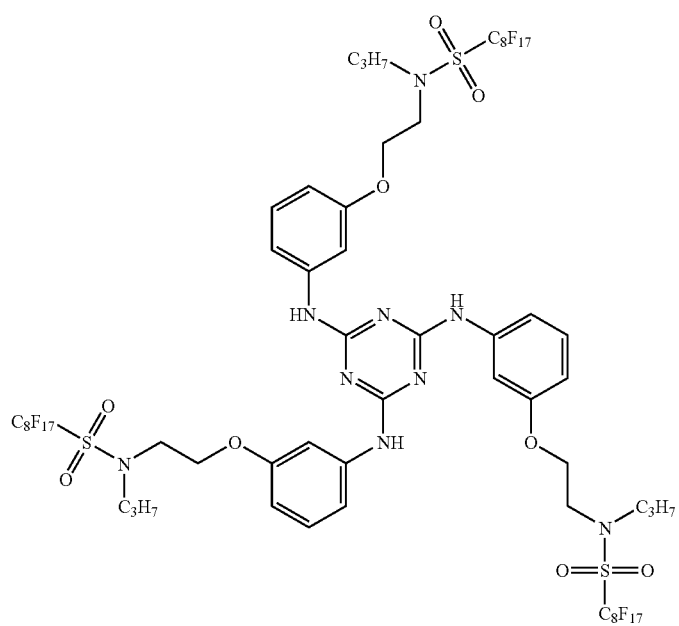

-continued
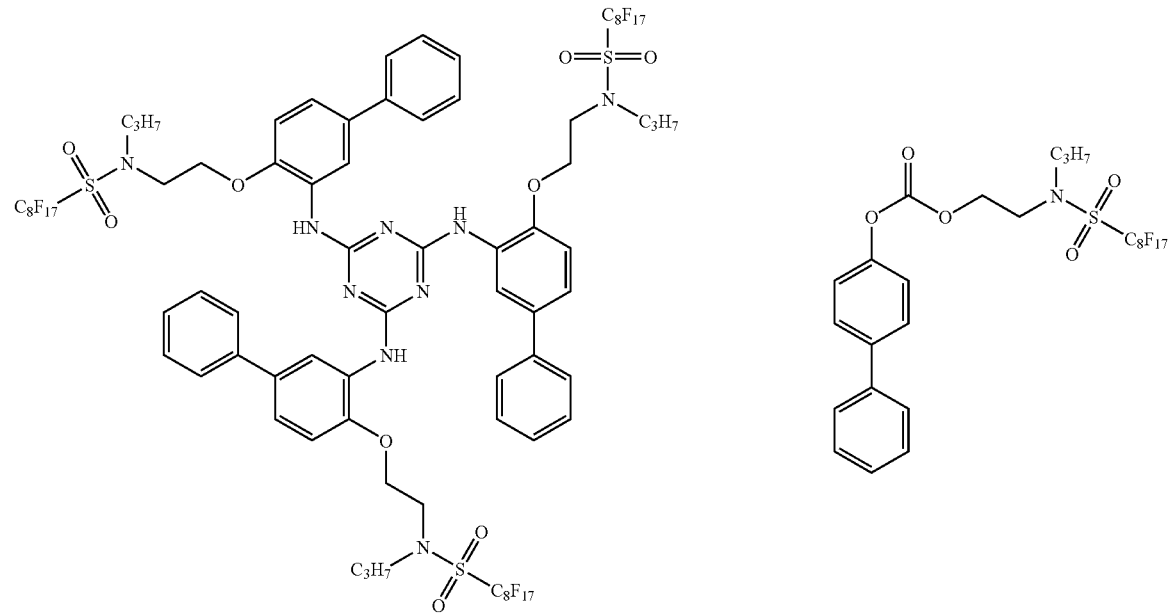
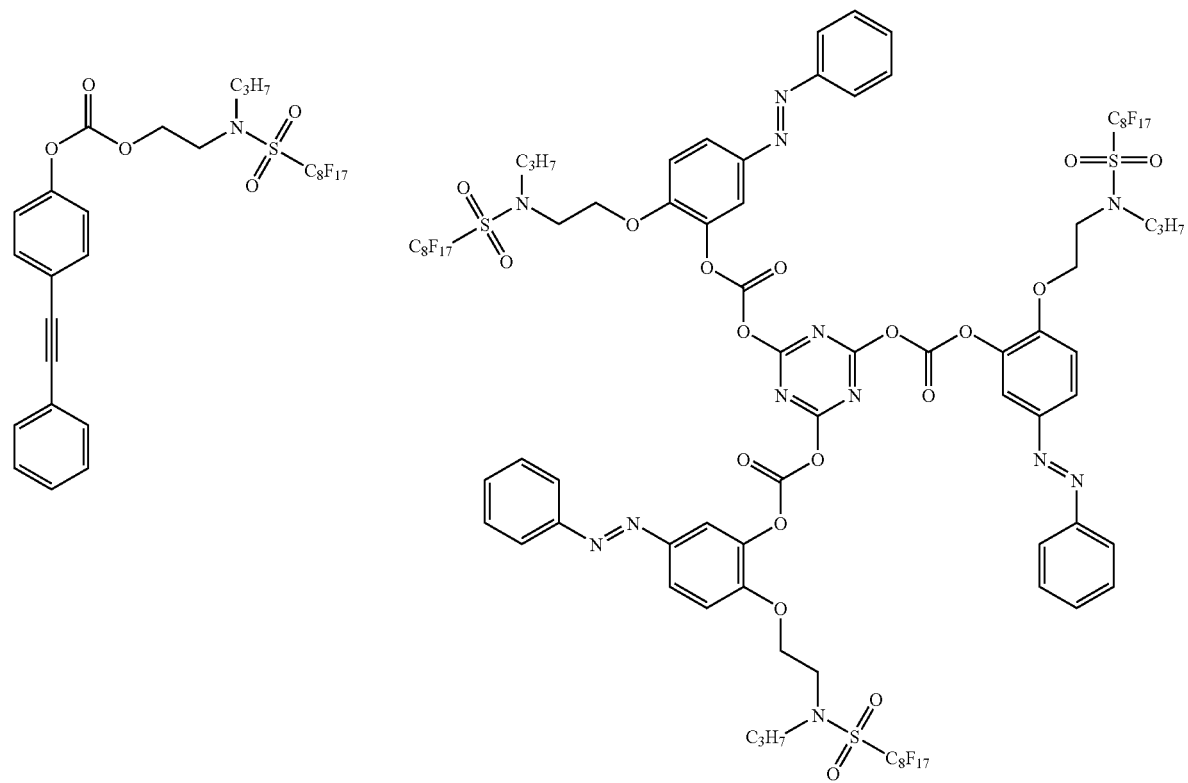

-continued
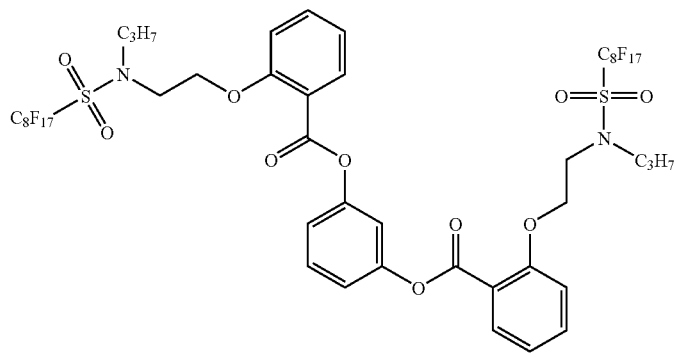
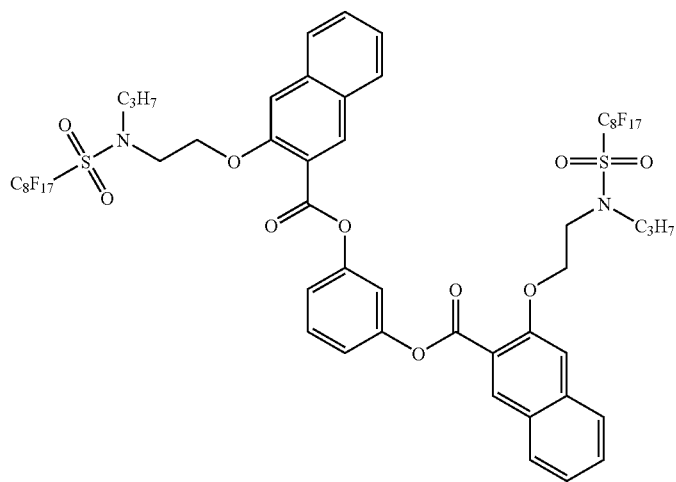
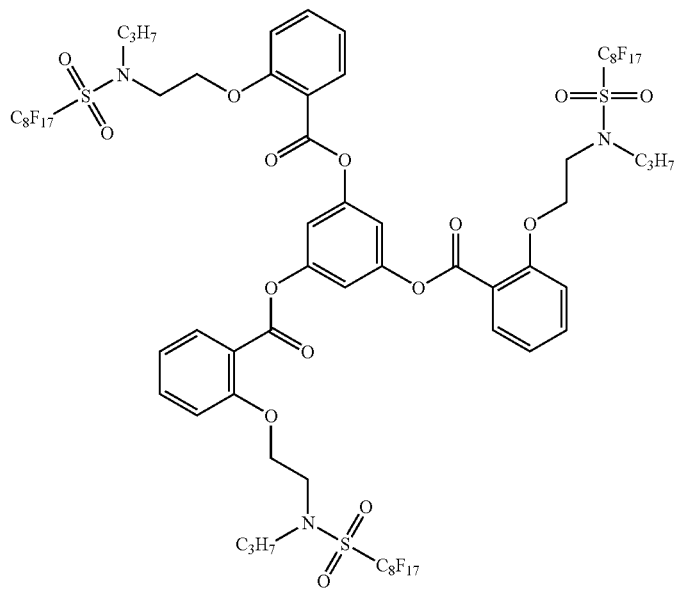

-continued

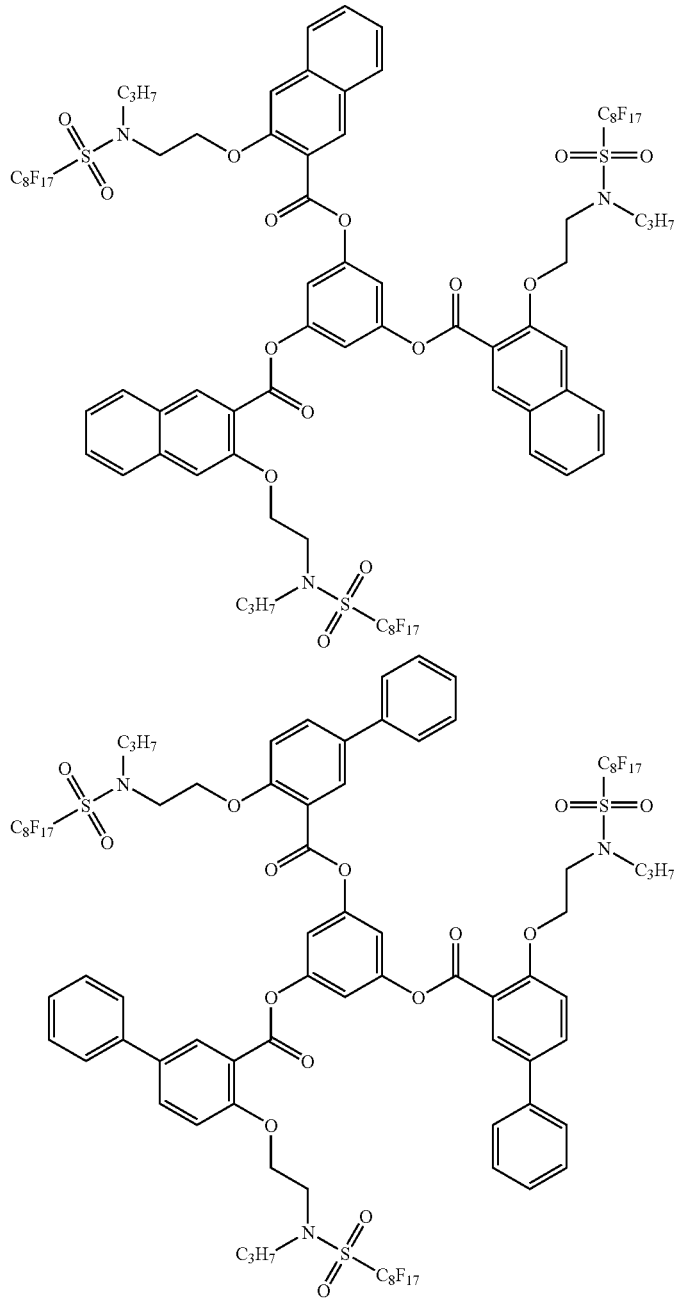

It is preferable to add the horizontal orientation promoter in an amount of from 0.001 to 5% by mass, still preferably from 0.05 to 1% by mass, based on the liquid crystal compound.

The optically anisotropic layer can be formed by applying a coating solution, which contains the liquid crystal compound together with the following polymerization initiator and other additives, onto the orientation film. As the solvent to be used in preparing the coating solution, it is preferable to use an organic solvent. Examples of the organic solvent include amides (for example, N,N-dimethylformamide), sulfoxides (for example, dimethyl sulfoxide), heterocyclic compounds (for example, pyridine), hydrocarbons (for example, benzene and hexane), alkyl halides (for example, chloroform and dichloromethane), esters (for example, methyl acetate and butyl acetate), ketones (for example, acetone and methyl ethyl ketone) and ethers (for example, tetrahydrofuran and 1,2-dimethoxyethane). Alkyl halides and ketones are preferred. It is also possible to use two or more organic solvents together. The coating solution can be applied by a publicly known method (for example, the extrusion coating method, the direct gravure coating method, the reverse gravure coating method or the die coating method).

The thus oriented liquid crystal compound is fixed while holding the oriented state. The fixation is preferably carried out by the polymerization reaction of the polymerizable group (Q) having been introduced into the liquid crystal compound. The polymerization reaction includes a heat polymerization reaction with the use of a heat polymerization initiator and a photopolymerization reaction with the use of a photopolymerization initiator. The photopolymerization reaction is preferred. Examples of the photopolymerization initiator include α-carbonyl compounds (described in U.S. Pat. No. 2,367,661 and U.S. Pat. No. 2,367,670), acyloin ether (described in U.S. Pat. No. 2,448,828), α-hydrocarbon-substituted acyloin compounds (described in U.S. Pat. No. 2,722,512), polynuclear quinone compounds (described in U.S. Pat. No. 3,046,127 and U.S. Pat. No. 2,951,758), combinations of a triarylimidazole dimer with aminophenyl ketone (described in U.S. Pat. No. 3,549,367), acridine and fenadine compounds (described in JP-A-60-105667 and U.S. Pat. No. 4,239,850) and oxadiazonal compounds (described in U.S. Pat. No. 4,212,970).

It is preferable to use the photopolymerization initiator in an amount of from 0.01 to 20% by mass, still preferably from 0.5 to 5% by mass, based on the solid matters in the coating solution. In the photoirradiation for polymerizing the liquid crystal compound, it is preferable to use UV light. The irradiation energy preferably ranges from 20 mJ/cm$^2$ to 50 J/cm$^2$, still preferably from 100 to 800 mJ/cm$^2$. To accelerate the photopolymerization reaction, the photoirradiation may be carried out under heating. To eliminate the effects of oxygen in the atmosphere (oxygen would exert an inhibitory effect on the polymerization), it is also possible to carry out the photoirradiation in a nitrogen atmosphere.

The thickness of the optically anisotropic layer preferably ranges from 0.1 to 10 μm, still preferably from 0.5 to 5 μm.

[Orientation Film]

To orient the liquid crystal compound, it is preferable to employ an orientation film.

The orientation film can be provided by rubbing an organic compound (preferably a polymer), oblique evaporation of an inorganic compound, forming a layer having a micro group, accumulation of an organic compound (for example, ω-tricosanoic acid, dioctadecylmethylammonium chloride or methyl stearate) by the Langmure-Blogette method (LB film). Furthermore, there have been known orientation films having an orienting function imparted thereto by applying an electrical field, applying a magnetic field or irradiating with light. In particular, an orientation film formed by rubbing a polymer is preferable. The rubbing treatment is performed by rubbing the surface of a polymer layer with paper or fabric several times in a definite direction.

It is preferable in the invention that the rod-shaped liquid crystal compound or the disc-shaped liquid crystal compound is homogeneously oriented. Although the expression "homogeneously" is employed in common, its meaning largely differs between these cases. Accordingly, the polymer to be used in the orientation film should be determined depending on the type of the liquid crystal compound (i.e., either a rod-shaped liquid crystal compound or a disc-shaped liquid crystal compound).

To homogeneously (horizontally) orient a rod-shaped liquid crystal compound, use is made of a polymer (a polymer for usual orientation films) which would not lower the surface energy of the orientation film.

To homogeneously (perpendicularly) orient a disc-shaped liquid crystal compound, use is made of a polymer which would lower the surface energy of the orientation film. To lower the surface energy of the orientation film, it is preferable to introduce a hydrocarbon group having from 10 to 100 carbon atoms into a side chain of the polymer.

Specific polymer types are reported in various documents concerning liquid crystal cells (mainly rod-shaped liquid crystal compounds) or optical compensation sheets (mainly disc-shaped liquid crystal compounds).

It is preferable that the thickness of the orientation film ranges from 0.01 to 5 μm, still preferably from 0.05 to 1 μm.

It is also possible that the liquid crystal compound of the optically anisotropic layer is oriented by using the orientation film and then the liquid crystal layer is transcribed onto the transparent support. The liquid crystal compound having been fixed in the oriented state can be maintained in the oriented state without using an orientation film.

In the first embodiment, it is preferable that the angle between the in-plane slow axis of the optically anisotropic layer and the longer direction of the transparent support is adjusted substantially at 75° or 15°.

In a general orientation film, the rubbing direction is parallel to the slow axis direction of the optically anisotropic layer made of a liquid crystal compound. In the case where the angle between the in-plane slow axis of the optically anisotropic layer and the longer direction of the transparent support is adjusted substantially at 15°, it is preferable that a general orientation film (a parallel type orientation film) is used and rubbing is performed in the direction at 15° to the longer direction of the transparent support. That is to say, a lower angle between the longer direction of the transparent support and the rubbing direction is preferred (i.e., 15° being preferable to 75°).

In the case where the angle between the in-plane slow axis of the optically anisotropic layer and the longer direction of the transparent support is adjusted substantially at 75°, on the other hand, it is preferable that a special orientation film (a perpendicular type orientation film) is used and rubbing is performed in the direction at 15° to the longer direction of the transparent support. By using such a perpendicular type orientation film, the rubbing direction is arranged substantially perpendicular to the slow axis direction of the optically anisotropic layer made of the liquid crystal compound. As a result, the angle between the longer direction of the transparent support and the rubbing direction can be controlled to a lower level (i.e., 15° being preferable to 75°).

It is preferable that the perpendicular orientation film contain a copolymer having a repeating unit represented by the following formula (III) or (IV) and another repeating unit represented by the following formula (V) or (VI).

-continued

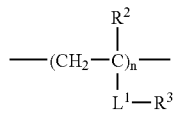
(VI)

In the formula (III), $R^1$ represents a hydrogen atom (an acrylic acid copolymer) or methyl (a methacrylic acid copolymer).

In the formula (III), M represents a proton, an alkali metal (for example, Li, Na or K) ion or an ammonium ion. The ammonium ion may be substituted by an organic group (for example, methyl or ethyl).

In the formulae (III) and (IV), m is from 10 to 95% by mol.

In the formulae (V) and (VI), $R^2$ represents a hydrogen atom, a halogen atom or an alkyl group having from 1 to 6 carbon atoms. It is preferable that $R^2$ is a hydrogen atom or an alkyl group having from 1 to 6 carbon atoms, still preferably a hydrogen atom, methyl or ethyl and most desirably a hydrogen atom or methyl.

In the formula (V), Cy represents an aliphatic cyclic group, an aromatic group or a heterocyclic group.

It is preferable that the aliphatic ring in the aliphatic cyclic group is a 5- to 7-membered ring, still preferably a 5- or 6-membered ring and most desirably a 6-membered ring. Examples of the aliphatic cyclic group include a cyclohexane ring, a cyclohexene ring and a bicyclo[2.2.1]hepta-2-ene ring. To the aliphatic ring, another aliphatic ring, an aromatic ring or a heterocycle may be fused.

Examples of the aromatic ring in the aromatic group include a benzene ring, a naphthalene ring, an anthracene ring, a phenanthrene ring, a pyrene ring and a naphthacene ring. To the aromatic ring, an aliphatic ring or a heterocycle may be fused.

It is preferable that the heterocycle in the heterocyclic group is a 5- to 7-membered ring, still preferably a 5- or 6-membered ring. It is preferable that the heterocycle has an aromatic nature. Aromatic heterocycles are generally unsaturated and preferably have double bonds in the largest number. Examples of the heterocycle include a furan ring, a thiophene ring, a pyrrole ring, an oxazole ring, an isoxazole ring, a isothiazole ring, an imidazole ring, a pyrazole ring, a furazan ring, a pyran ring, a pyridine ring, a pyridazine ring, a pyrimidine ring and a pyrazine ring. To the heterocycle, another heterocycle, an aliphatic ring or an aromatic ring may be fused.

The aliphatic cyclic ring, the aromatic ring and the heterocyclic ring may have a substituent. Examples of the substituent include alkyl groups (for example, methyl, ethyl and t-butyl), substituted alkyl groups (for example, chloromethyl, hydroxymethyl and chlorinated trimethylammonio), alkoxy groups (for example, methoxy), halogen atoms (F, Cl and Br), carboxyl, acryl groups (for example, formyl), amino, sulfo, aryl groups (for example, phenyl), aryloxy groups (for example, phenoxy) and oxo.

In the formula (VI), $L^1$ represents a divalent linking group selected from among —O—, —S—, —CO—, —RN—, —SO$_2$—, alkylene groups, alkenylene groups, arylene groups and combinations thereof. R represents a hydrogen atom or an alkyl group having from 1 to 6 carbon atoms.

In the formula (VI), $R^3$ represents a monovalent group containing at least two aromatic rings or aromatic heterocycles and having from 10 to 100 carbon atoms. The definitions and examples of the aromatic rings and the aromatic heterocycles are the same as the definitions and examples of the aromatic ring and aromatic heterocycle of Cy in the formula (V).

In the formulae (V) and (VI), n is from 5 to 90% by mol.

The copolymer containing the repeating unit represented by the formula (IV) is one of denatured polyvinyl alcohols. It is not always necessary that the repeating unit represented by the formula (IV), which corresponds to the polyvinyl alcohol moiety of the denatured polyvinyl alcohol, has a degree of saponification of 100%. In other words, the denatured polyvinyl alcohol may contain another repeating unit corresponding to vinyl acetate represented by the following formula (VII).

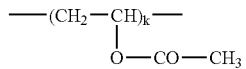
(VII)

In the formula (VII), k is from 0.01 to 20% by mol.

The copolymer may further contain another repeating unit having a polymerizable group. It is preferable that the repeating unit having a polymerizable group is represented by the following formula (VIII).

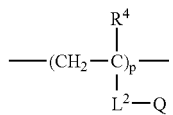
(VIII)

In the formula (VIII), $R^4$ represents a hydrogen atom, a halogen atom or an alkyl group having from 1 to 6 carbon atoms. It is preferable that $R^4$ is a hydrogen atom or an alkyl group having from 1 to 6 carbon atoms, still preferably a hydrogen, methyl or ethyl and most desirably a hydrogen atom or methyl.

In the formula (VIII), $L^2$ represents a divalent linking group selected from the group consisting of —O—, —S—, —CO—, —NR—, —SO$_2$—, alkylene groups, alkenylene groups, arylene groups and combinations thereof. R represents a hydrogen atom or an alkyl group having from 1 to 6 carbon atoms.

In the formula (VIII), Q represents a polymerizable group. The definition and examples of the polymerizable group are the same as the definition and examples of the polymerizable group in the liquid crystal compound.

In the formula (VIII), p ranges from 0.1 to 20% by mol.

Two or more polymers may be used together in the orientation film.

In the invention, use can be preferably made of a λ/4 plate as will be described hereinafter. The λ/4 plate can be obtained by combining at least two optically anisotropic layers. The combinations of two optically anisotropic layers can be classified into the following two types.

In the construction of a circular polarizing plate in the invention, the polarizing film and the λ/4 plate are bonded together by supplying the polarizing film and the λ/4 plate each in a rolled state, continuously bonding them and then winding in a rolled state. Thus, the production yield can be elevated while the cost can be reduced.

More specifically, the step of bonding the polarizing film to the λ/4 plate is put in the drying step, which is to be carried out after completing the step of forming the polarizing film by drawing, or after the drying step. Thus the polarizing film and the λ/4 plate can be continuously fed each in the rolled state and the bonded matter can be wound in the rolled state too so that the production line can be consistently relayed to the subsequent step. In the step of bonding the polarizing film to the λ/4 plate, it is possible to supply the protective film in a rolled state too to thereby continuously bonding the same. From the viewpoints of the performance and production cost, it is still preferable to bond the λ/4 plate and the protective film to the polarizing film at the same time. It is also possible that, after completing the step of forming the polarizing film by drawing, protective films are bonded to the both faces during the drying step or after the drying step to thereby give a polarizing plate provided with the protective films in both sides. Then the λ/4 plate in a rolled state is bonded thereto via an adhesive, thereby giving a circular polarizing plate in the rolled state.

This circular polarizing plate can be used as the lower substrate of a touch panel commonly employed.

From the viewpoints of the liquid crystal material, the orientation direction and the visual field angle characteristics of the display unit, the angle between the slow axis of the λ/4 plate and the absorption axis of the polarizing film is adjusted to 20° or more but less than 70°, preferably at 45°.

To compensate the tolerance in the phase lag to the light wavelength of the λ/4 plate, a λ/2 plate is located in some cases between the polarizing film and the λ/4 plate.

In general, a retardation plate such as a λ/4 plate or a λ/2 plate has a hydrophobic nature and a low moisture permeability. In the case of a polarizing film usually having relatively high moisture content of 10% or more is bonded directly to a hydrophobic protective film, the time required for the vaporization of the moisture in the polarizing film to the outside the polarizing film is prolonged, which brings about undesirable results such as a decrease in the degree of polarization and irregular colors. Accordingly, a λ/4 plate cannot serve as a protective film too in usual. Thus, the constitution of the circular polarizing plate is as follows: protective film/polarizing film/protective film/(λ/4 plate).

In the invention, it becomes possible to bond a less hygroscopic film such as a λ/4 plate directly to the polarizing film as a protective film of the polarizing film by drying the polarizing plate until the moisture content finally attains 5% or less. As a result, the number of the protective films to be used can be lessened and the thickness of the whole circular polarizing plate can be reduced. In its turn, the touch panel and the indication unit carrying the touch panel can be made thinner and lighter.

Furthermore, various functional films can be directly bonded to one or both faces of the circular polarizing plate according to the invention. Examples of the functional films to be bonded include retardation plates such as the λ/4 plate and the λ/2 plate as described above, a light diffusion film, a plastic cell having a conductive layer in the opposite side to the polarizing film, a reflective plate, a hard coat film, an antireflective film and so on.

In the invention, the thickness of the circular polarizing plate is 80 m or more but not more than 300 m. From the viewpoint of making the touch panel thinner and lighter, it is still preferable that the thickness thereof is 100 μm or more but not more than 250 μm.

In the circular polarizing plate according to the invention, the absorption axis of the polarizing film is neither parallel nor perpendicular to the longer direction (such a circular polarizing plate in a continuous length will be sometimes referred to merely as "an obliquely oriented" circular polarizing plate). The angle between the longer direction and the absorption axis is preferably 20° or more but less than 70°, still preferably 40° or more but less than 50° and particularly preferably 44° or more but less than 46°. Thus, a circular polarizing plate of the monoplate type can be effectively obtained in the step of punching out a circular polarizing plate in a continuous length. In the invention, the angle between the longer direction and the absorption axis can be freely designed. In the case of using in combination with other optical members, therefore, the most suitable angle can be selected.

The circular polarizing plate according to the invention is characterized by having a monoplate transmittance at 550 nm of 35% or more and a degree of polarization at 550 nm of 80% or more. It is preferable that the monoplate transmittance is 40% or more, while the degree of polarization is 95.0% or more, still preferably 99% or more and particularly preferably 99.9% or more. Unless otherwise noted, the term "transmittance" as used hereinafter means "monoplate transmittance".

Because of having excellent monoplate transmittance and degree of polarization, the circular polarizing plate according to the invention has an advantage of elevating the contrast in the case of being used as a liquid crystal display unit.

The obliquely oriented circular polarizing plate according to the invention can be easily obtained by the following method. Namely, it can be obtained by achieving oblique orientation by drawing a polymer film for the polarizing film and appropriately controlling the volatile content in the step of drawing the film, the shrinkage ratio in the step of shrinking the film, etc. It is also preferable to control the amount of foreign matters adhered to the film before the drawing. Thus, it is possible to obtain a highly smooth polarizing film which has a low surface roughness and undergoes neither wrinkling nor tightening after drawing.

Now, a preferable drawing method for obtaining the circular polarizing plate according to the invention (hereinafter sometimes referred to as "the drawing method according to the invention") will be described in detail.

<Drawing Method>

Figure 2:
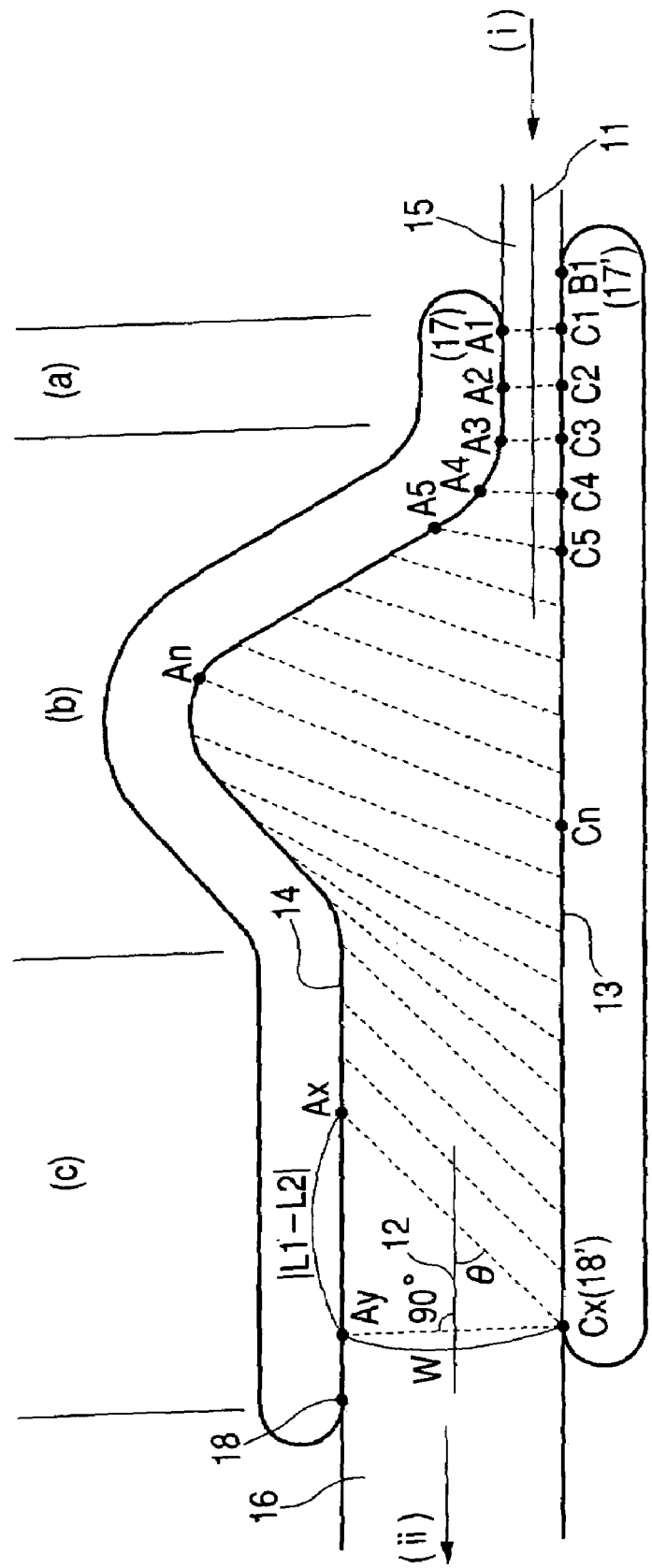
FIGS. 2 and 3 are schematic plan views of exemplary processes for obliquely drawing a polymer film.
Figure 3:
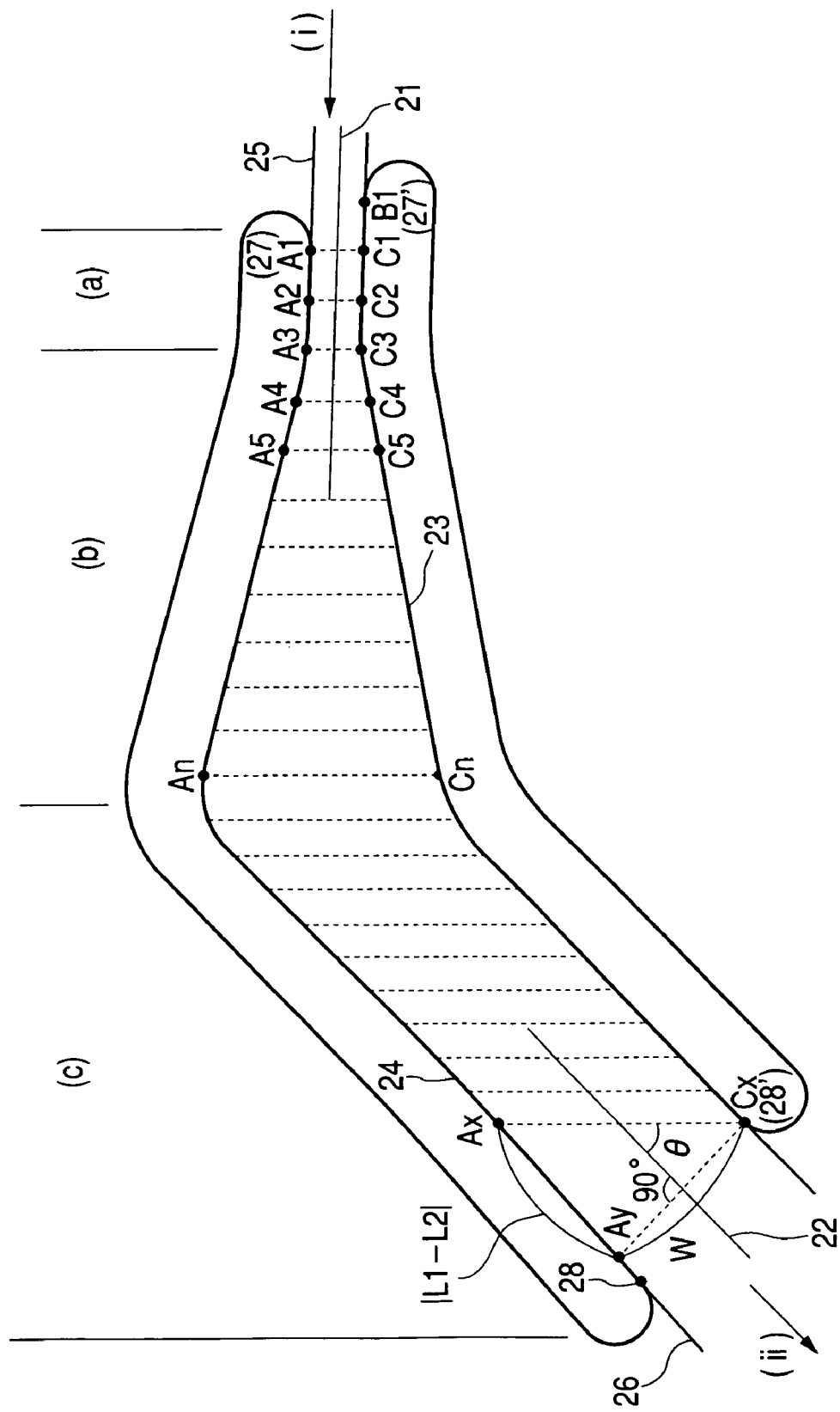

FIGS. 2 and 3 are schematic plan views each showing an example of a method for obliquely drawing a polymer film for the polarizing film.

The drawing method according to the invention involve: (a) the step of introducing a raw film in the direction indicated by the arrow (i); (b) the crosswise direction drawing step; and (c) the step of feeding the thus drawn film to the subsequent step, i.e., the direction indicated by (ii). The term "the drawing step" as will be used hereinafter means the whole step for performing the drawing method according to the invention involving the above steps (a) to (c).

The film is continuously fed from the direction (i) and retained for the first time at the point B1 by a retention member in the left side when seen from the upstream side. At this point, the other edge of the film is not retained and thus no tension arises in the crosswise direction. Namely, the point B1 is not regarded as the substantial starting point of retention according to the invention (hereinafter referred to as "the substantial starting point of retention").

In the invention, the substantial starting point of retention is defined as the point at which both edges of the film are retained for the first time. Namely, the substantial starting point of retention involves two points, i.e., the starting point A1 of retention in the lower stream side and the cross point C1 of a line, which is almost perpendicularly drawn from A1 toward the center line 11 (FIG. 2) or 21 (FIG. 3) of the film in the feeding side, intersects with the trace 13 (FIG. 2) or 23 (FIG. 3) of the trace of the retention member.

Staring with these points, the retention members at both edges are transferred substantially at the same speed. Thus, A1 moves as A2, A3 - - - . An in each unit time and C1 similarly moves as C2, C3 - - - Cn. That is to say, the line connecting the points An and Cn, at which the retention members employed as the standard pass simultaneously, is regarded as the drawing direction at the corresponding point.

In the method according to the invention, An gradually falls behind Cn as shown in FIGS. 2 and 3. Thus, the drawing direction gradually obliques apart from the direction perpendicular to the transfer axis. The substantial relieving point of retention according to the invention (hereinafter referred to as "the substantial relieving point of retention") is defined by two points, i.e., the point Cx of withdrawing from the retention member in the upper stream side and the cross point Ay of a line, which is almost perpendicularly drawn from Cx toward the center line 12 (FIG. 2) or 22 (FIG. 3) of the film to be transferred to the next step, intersects with the trace 14 (FIG. 2) or 24 (FIG. 3) of the trace of the retention member.

The final angle of the drawing direction of the film is determined depending on the ratio of the difference (Ay−Ax) between the strokes of the left and right retention members (i.e., |L1−L2|) at the substantial endpoint of the drawing (the substantial relieving point of retention) to the distance W of the substantial relieving point of retention (the distance between Cx and Ay). Therefore, the oblique angle (θ) of the drawing direction to the transfer direction toward the subsequent step satisfies the following relationship.

$$\tan\theta = W/(Ay-Ax), \text{ i.e., } \tan\theta = W/|L1-L2|$$

Figure 4:
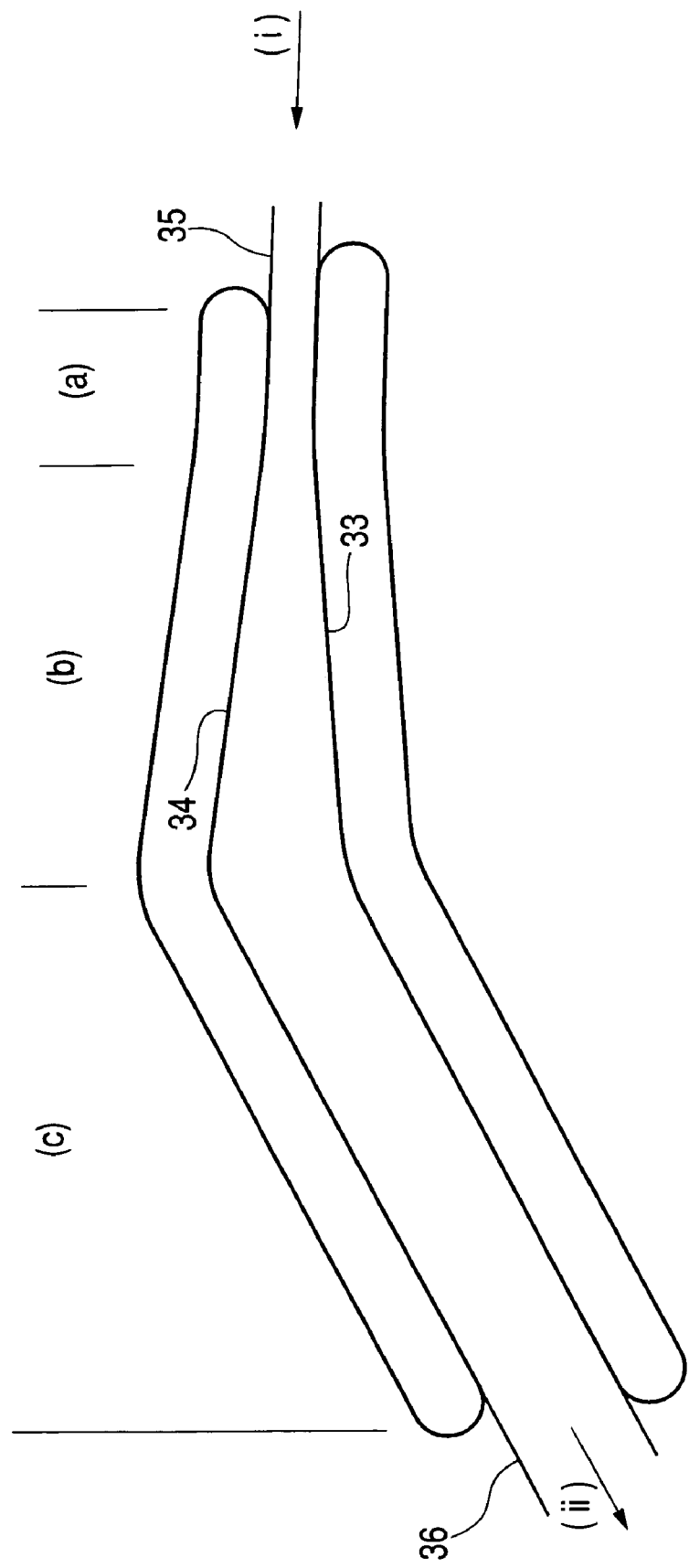
FIGS. 4 to 7 show exemplary aspects of a process for drawing a polymer film.

In FIG. 3 or FIG. 4, the upper film edge is retained after the point Ay till 18 (FIG. 2) or 28 (FIG. 3). However, the other edge is not retained and thus new crosswise drawing does not arise any more. Therefore, 18 and 28 are not regarded as the substantial relieving points of retention in the invention.

As discussed above, the substantial relieving points of retention located at both edges of a film are not mere engagement points respectively into the left and right retention members. To more strictly illustrate the above definition, the two substantial starting points of retention according to the invention each corresponds to the point at which a line connecting one of the left and right retention points to the other retention point intersects almost perpendicularly with the center line of the film to be fed into the film retention step and these two points are located in the uppermost stream.

Similarly, the two substantial relieving points of retention according to the invention each corresponds to the point at which a line connecting one of the left and right retention points to the other retention point intersects almost perpendicularly with the center line of the film to be transferred into the next step and these two points are located in the lowermost stream.

The expression "almost perpendicularly" as used herein means that the angle between the center line of the film and the line connecting the left and right substantial starting points of retention (or the substantial relieving points of retention) is 90±0.5°.

In the case where the stroke difference between the left and right retention members is achieved by using a tenter drawing machine, it is frequently observed that the engagement points into the retention members largely deviate from the substantial starting points of retention or the releasing points from the retention members largely deviate from the substantial relieving point of retention due to mechanical restrictions such as rail length. However, the object of the invention can be established so long as the strokes the substantial starting points of retention and the substantial relieving points of retention as defined above satisfy the relationship according to the formula (1).

The oblique angle of the orientation axis the drawn film obtained above can be controlled and adjusted depending on the ratio of the outlet width W of the step (c) to the difference between the strokes of the left and right retention members |L1−L2|.

In a polarizing plate or a retardation plate, a film oriented at 45° to the longer direction is frequently needed. To obtain an orientation angle close to 45° in this case, it is preferable to satisfy the following formula (2):

$$0.9W < |L1-L2| < 1.1W \qquad \text{formula (2)}$$

It is still preferable to satisfy the following formula (3):

$$0.97W < |L1-L2| < 1.03W \qquad \text{formula (3)}$$

The specific constitution of the drawing process can be arbitrarily designed by taking the cost of the equipment and the productivity as shown in FIGS. 2 to 7, so long as the relationship of the formula (1) is satisfied.

The angle between the direction (i) of introducing the film into the drawing step and the direction (ii) of feeding the film into the next step may be arbitrarily determined. From the viewpoint of minimizing the total installation area of the equipment including the step before and after the drawing, a smaller angle is preferred. Namely, it is preferable that the angle is 3° or less and still preferably 0.5° or less. This level can be established with the use of, for example, the structure shown in FIG. 2 or FIG. 5.

In a method wherein the traveling direction of the film substantially remains unchanged, namely, an orientation angle of 45° to the longer direction, which is preferable as a polarizing film or a retardation film, can be hardly achieved merely by widening the retention members. As shown in FIG. 2, |L1−L2 can be enlarged by once performing the drawing followed by the shrinking step.

Figure 5:
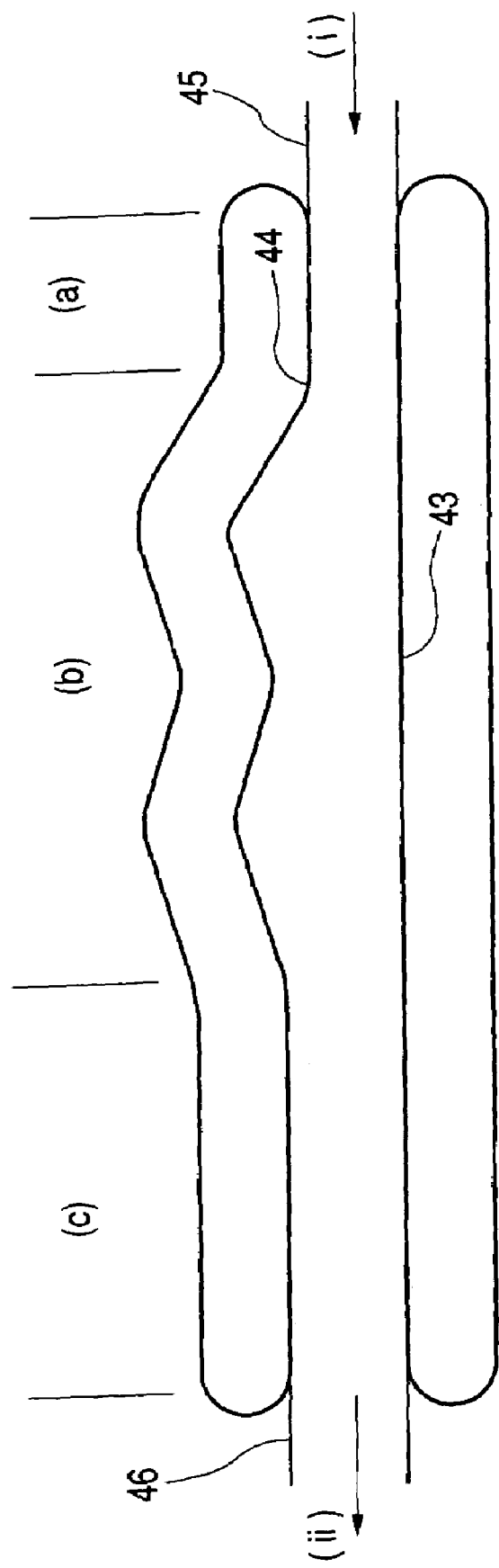

The orientation ratio preferably ranges from 1.1 to 10.0, still preferably from 2 to 10. The subsequent shrinkage ratio is preferably 10% or more. To enlarge the difference |L1−L2|, it is also preferable to repeat the drawing-shrinking procedures plural times as shown in FIG. 5.

Figure 6:
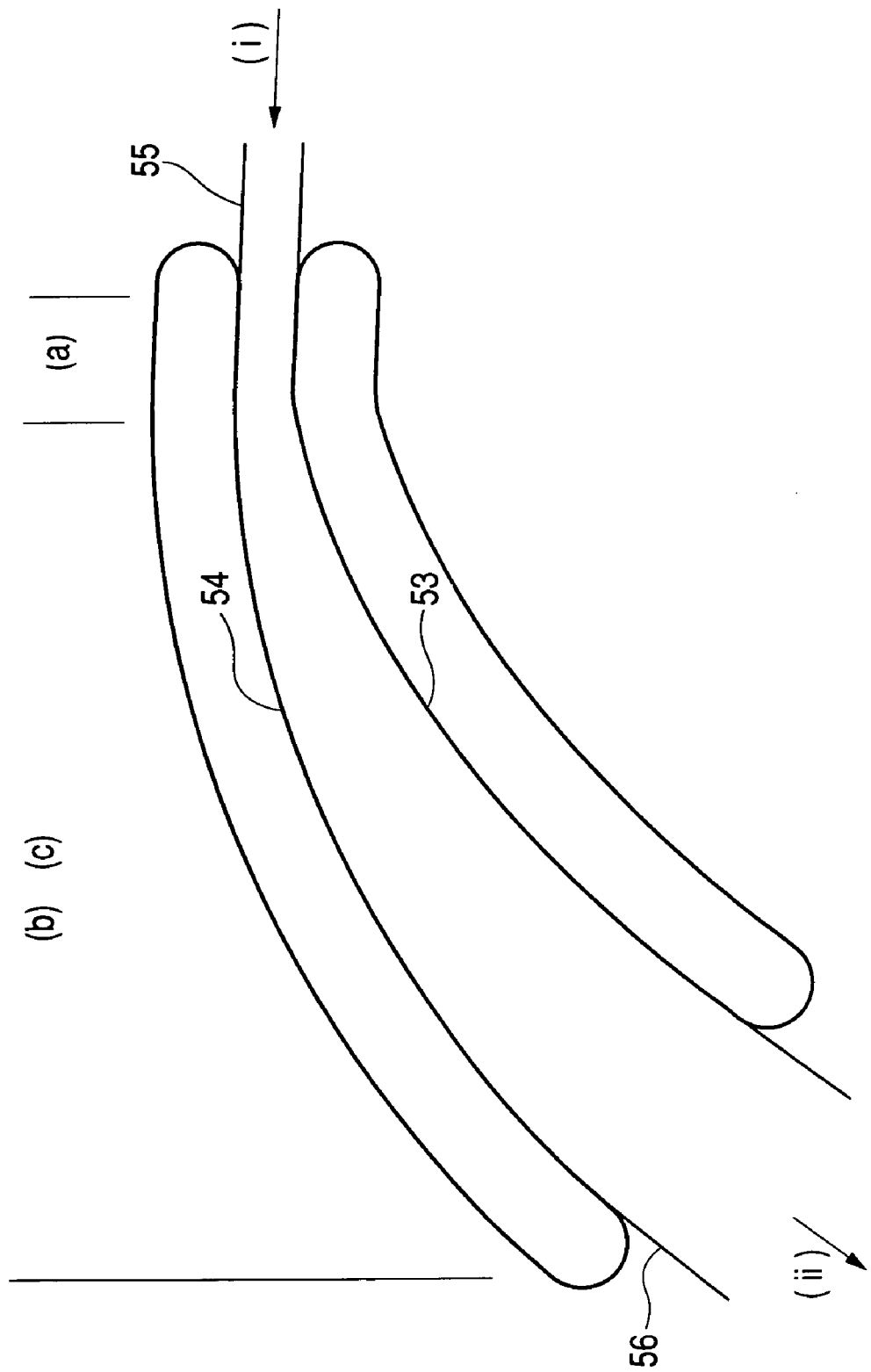

Form the viewpoint of minimizing the equipment cost in the drawing step, a smaller bending number and a smaller bending angle of the traces of the retention member are the better. From this point of view, it is preferable that the film is bent while retaining the both edges of the film so that the traveling direction of the film at the outlet of the step of retaining the both edges of the film and the direction of the substantial drawing of the film slants by 20 to 70°, as shown in FIGS. 3, 4 and 6.

Figure 7:
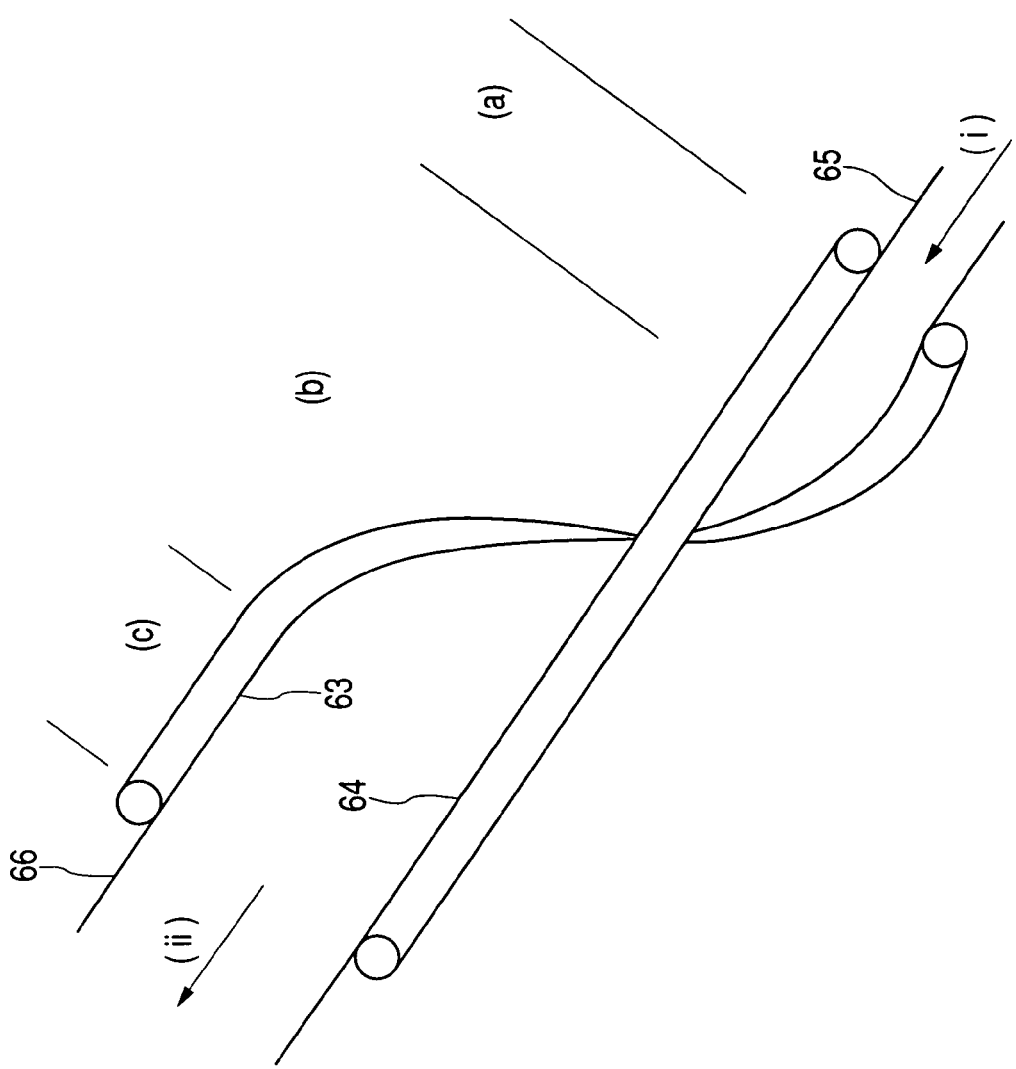

In the invention, it is preferable to employ a so-called tenter drawing machine shown in FIGS. 2 to 6 as the apparatus for drawing the film while retaining the both edges of the film and imparting a tension thereto. In addition to a two-dimensional tenter as shown in FIG. 3, it is also possible to use a drawing step wherein a path difference is given spirally to the holding members at the both edges as shown in FIG. 7.

Tenter drawing machines mostly have a structure wherein chains provided with fixed clips travels along rails. In the case of using a horizontally irregular drawing method as in the invention, the rail edges are not lined up at the inlet and outlet of the step, as shown in FIGS. 2 and 3. As a result, it is sometimes observed that the engagement and disengagement cannot occur simultaneously in both sides. In such a case, the substantial path lengths L1 and L2 do not merely mean the engagement-disengagement distance as described above but the path lengths of the parts wherein the film is held at the both edges by the retention members.

In the case where the traveling speeds of the film differ between the left and right sides of the film at the outlet of the drawing step, the film suffers from wrinkling or tightening at the outlet of the drawing step. It is therefore required that the traveling speeds of the left and right film holding members are substantially the same. It is preferable that the difference between the speeds is 1% or less, still preferably less than 0.5% and most desirably less than 0.05%. The term "speed" as used herein means the length of the trace of each of the left and right retention members per minute. In a general tenter drawing machine, there arises unevenness in speed at the order of second or less depending on the period of sprocket gears driving chains, the frequency of the driving motor and so on, thereby frequently showing unevenness of about several %. This does not corresponds to the difference in speed as discussed herein.

<Shrinkage>

The shrinkage of the polymer film thus drawn can be carried out either during or after the drawing. It is sufficient that the problem of wrinkling in the polymer film, which arises in the step of oblique orientation, ca be overcome by shrinking. As means of shrinking the film, use may be made of, for example, the procedure of eliminating volatile components by heating. However, arbitrary means may be employed so long as the film can be shrunk thereby. Concerning the shrinkage ratio of the film, it is preferable to shrink $1/\sin\theta$-fold or more expressed in the orientation angle to the longer direction 0, or 10% or more expressed in the numerical ratio.

<Volatile Content>

In the drawing step, the film suffers from wrinkling and tightening as there arises a difference between left and right paths. To solve this problem, it is preferable that the polymer film is drawn while sustaining its holding properties and maintaining its volatile content at 5% or more and then shrunk to thereby lower the volatile content. The term "volatile content" as used in the invention means the volume of volatile components per unit volume of the film, i.e., the value (%) determined by dividing the volume of the volatile components by the film volume.

In the invention, it is preferable to employ at least one step of adding the volatile components before drawing the polymer film for the polarizing film. The step of adding the volatile components can be carried out by casting the film and adding a solvent, water, etc. thereto, immersing the film in a solvent, water, etc., coating, spraying, and so on. It is also possible that the dyeing step or the step of adding a film hardener as will be described hereinafter in 21 Dyeing formulation and dyeing method> and <Addition of film hardener (crosslinking agent) and metal salt> also serves as the step of adding the volatile components. In the case where the dyeing step doubles as the step of adding the volatile components, it is preferable that the step of adding a film hardener is performed before the drawing. In the case where the step of adding a film hardener doubles as step of adding the volatile components, the dyeing step may be performed either before or after the drawing. In the case of performing it before the drawing, the dyeing step and the drawing step may be carried out simultaneously.

The preferable volatile content varies depending on the polymer film type. The maximum level of the volatile content may be arbitrarily determined so long as the polymer film sustains its holding properties. In the case of polyvinyl alcohol, the volatile content preferably ranges from 10% to 100%. In the case of cellulose acylate, it preferably ranges from 10% to 200%.

<Distribution of Volatile Components Contained>

Figure 10:
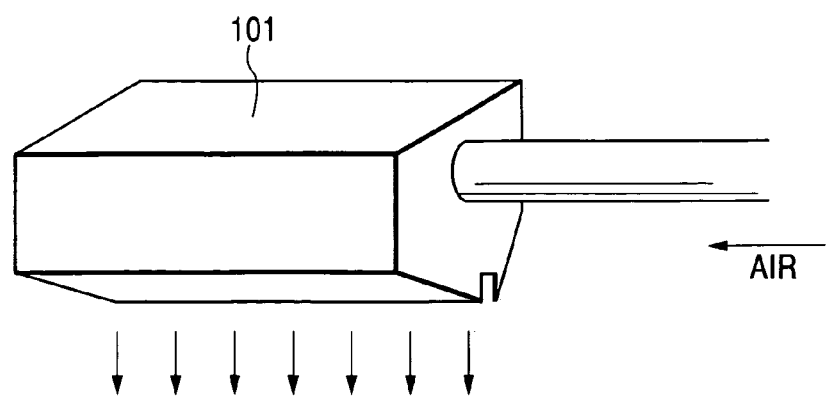
FIG. 10 shows an exemplary air blower.
Figure 11:
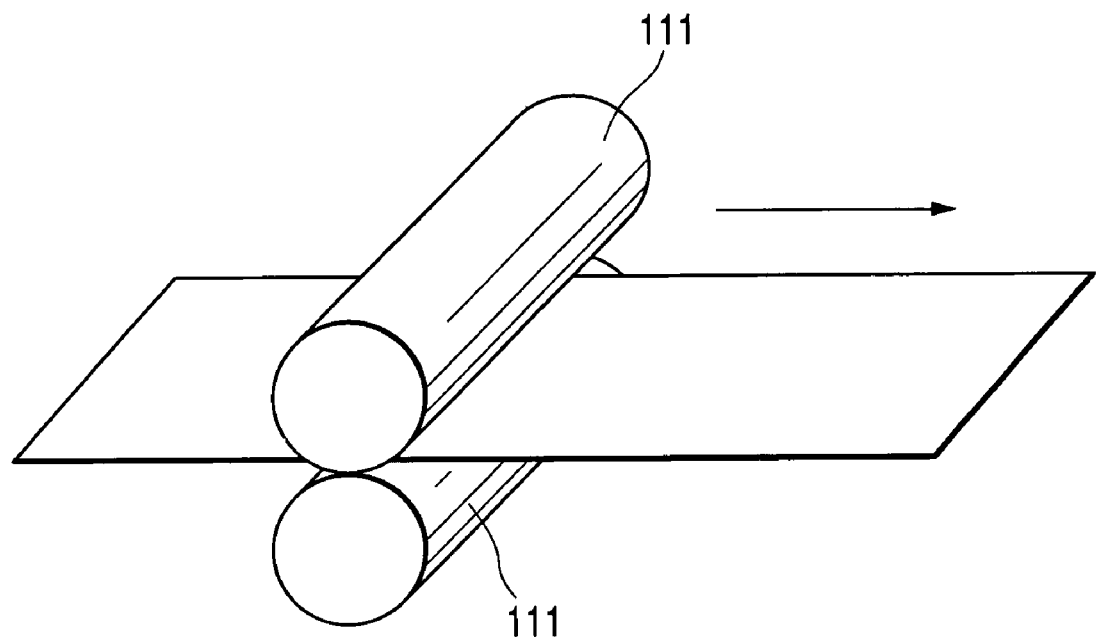
FIG. 11 shows an exemplary nipper.
Figure 12:
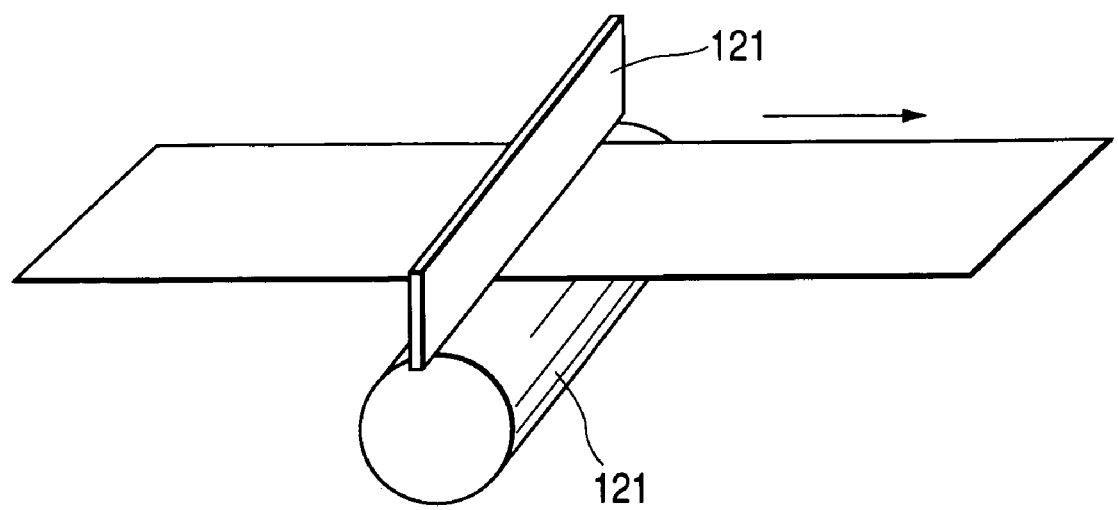
FIG. 12 shows an exemplary blader.

In the case of consistently producing a circular polarizing plate in a continuous length (in particular, in a rolled form), uneven or dislocated dyeing should be avoided. Uneven distribution of the volatile components (i.e., the volatile content varying from part to part in the film face) in the film before drawing causes uneven or dislocated dyeing. Therefore, a narrower distribution (5% or less) of the volatile components in the film before drawing is preferred. The term "distribution of volatile components" means the fluctuation band (i.e., the ratio of the larger difference between the maximum or minimum volatile content and the average volatile content to the average volatile content). Examples of the method of narrowing the distribution of the volatile components contained include uniformly air-blowing the front and back faces of the film, uniformly drawing with a nip roller, wiping with a wiper or the like (wiping with a blade, a sponge, etc.) and so on. Use may be made of an arbitrary method therefor, so long as uniform distribution can be established thereby. FIGS. 10 to 12 respectively show examples of an air blower, a nipper and a blader.

<Distance Between the Appearance and Disappearance of Wrinkles>

Wrinkles occurring in the step of oblique orientation cause no problem so long as they disappear until the substantial relieving points of the retention in the invention. However, it is undesirable that a good amount of time is required from the appearance to the disappearance of the wrinkles, since considerable variation sometimes arises in the drawing direction in such a case. Therefore, it is preferable that the wrinkles disappear within a traveling period as short as possible from the point at which the wrinkling arises. This can be achieved by, for example, elevating the volatilization speed of the volatile components.

<Foreign Matters>

In the invention, foreign matters adhering to the polymer film before drawing would make the surface rough. Therefore, it is preferable to eliminate these foreign matters. In constructing a circular polarizing plate, in particular, the existence of foreign matters causes color unevenness and optical unevenness. It is also important to prevent the film from the adhesion of foreign matters until it is bonded to the protective films. Namely, it is preferable to minimize dust floating in the environment wherein the film is to be produced. The term "content of foreign matters" as used herein means the value determined by dividing the amount (mass) of the foreign matters adhering to the film surface by the surface area. Thus, it is expressed in $g/m^2$. It is preferable that the content of the foreign matters is 1 $g/m^2$ or less, still preferably 0.5 $g/m^2$ or less, and a smaller content of the foreign matters is the better.

The method of eliminating the foreign matters is not particularly restricted. Namely, an arbitrary method is usable therefor, so long as the foreign matters can be eliminated thereby without exerting any undesirable effects on the polymer film before the drawing. Examples of the method include a method of scratching off the foreign matters by jetting a water stream, a method of scratching off the foreign matters by jetting a gas stream, a method of scratching off the foreign matters by using a blade made of rubber or fabric, etc.

<Drying>

Drying may be carried out under arbitrary conditions, so long as the wrinkles formed above can be taken out thereby. However, it is preferable that the drying conditions are controlled so as to attain a drying point within a traveling distance as short as possible after achieving the desired orientation angle. The term "drying point" means a point at which the surface temperature of the film becomes the same as the environmental atmospheric temperature. From this viewpoint, a higher drying speed is preferable.

<Drying Temperature>

Although drying may be carried out under arbitrary conditions so long as the wrinkles formed above can be taken out thereby, the conditions vary depending on the film to be drawn. In the case of constructing a circular polarizing plate according to the invention with the use of a polyvinyl alcohol film, the drying temperature is preferably 20° C. or higher but not higher than 100° C., still preferably 40° C. or higher but not higher than 90° C.

<Swelling Ratio>

In the case where the polymer film is made of polyvinyl alcohol and a film hardener is employed in the invention, it is preferable that the swelling ratio in water varies before and after the drawing so as to maintain the obliquely drawn state without relaxation. More specifically speaking, it is preferable that the film shows a swelling ratio in water of 3% or more before the drawing and 3% or less after the drying.

<Bending Point>

It is sometimes required that the rails regulating the traces of the retention members in the invention have a large bending ratio. From the viewpoint of avoiding the interference of the film holding members with each other or the local concentration of force due to rapid bending, it is desirable that the traces of the holding members move in an arc at the bending points.

<Drawing Speed>

When expressed in the drawing ratio per unit time, the speed of drawing the film in the invention is 1.1-fold/min or more and preferably 2-fold/min or more. A higher speed is preferred. The traveling speed in the longer direction is 0.1 m/min or more and preferably 1 m/min or more. A higher speed is preferred from the viewpoint of productivity. In each case, the upper limit of the speed varies depending on the film to be drawn and the drawing machine employed.

<Tension in the Longer Direction>

In holding the film at the both edges with the retention members in the invention, it is preferable that the film is in a tensed state so as to facilitate the retention. More specifically speaking, the film is tensed by, for example, applying a tension in the longer direction. Although the tension level varies depending on the conditions of the film before the drawing, it is preferable to apply the tension to such an extent that the film is not sagged.

<Temperature at Drawing>

In the step of drawing the film, the environmental temperature is at the solidification point of the volatile components contained in the film or higher. In the case where the film is made of polyvinyl alcohol, it is preferable that the environmental temperature is 25° C. or higher. In the case where a polyvinyl alcohol immersed with iodine and boric acid is drawn for constructing a polarizing film, it is preferable that the environmental temperature is 25° C. or higher but not higher than 90° C., still preferably 40° C. or higher but not higher than 90° C.

<Humidity at Drawing>

In the case of drawing a film containing moisture as the volatile component (for example, a polyvinyl alcohol film or a cellulose acylate film), the drawing may be carried out in a moisture-conditioned environment. In the case of a film made of polyvinyl alcohol, it is preferable that the humidity is 50% or more, still preferably 80% or more and still preferably 90% or more.

<Polymer Film for Polarizing Film>

The polymer film to be drawn for forming a polarizing film in the invention is not particularly restricted. Namely, it is possible to use a film made of an appropriate thermoplastic polymer. Examples of the polymer include PVA, polycarbonate, cellulose acetate, polysulfone and so on.

It is preferable to use a polyvinyl alcohol-based polymer involving PVA. Although PVA usually means a saponification product of polyvinyl acetate, it may contain a small amount of a component polymerizable with vinyl acetate such as an unsaturated carboxylic acid, an unsaturated sulfonic acid, an olefin or vinyl ether. Moreover, modified PVAs containing acetoacetyl group, sulfonate group, carboxyl group, oxyalkylene group, etc. also fall within the category of the polyvinylalcohol-based polymer and can be employed preferably.

Among all, PVA is most desirable.

Although the degree of saponification of PVA is not particularly restricted, it preferably ranges from 80 to 100% by mol and particularly preferably from 90 to 100% by mol from the viewpoint of dissolution properties, etc. Although the degree of polymerization of PVA is not particularly restricted, it preferably ranges from 1000 to 10000 and particularly preferably from 1500 to 5000.

It is preferable that the elastic modulus, expressed in Young's modulus, of the polymer film before the drawing is 0.01 MPa or more but not more than 5000 MPa and still preferably 0.1 MPs or more but not more than 500 MPa. When the elastic modulus is too low, the low shrinkage ratio is lowered during or after the drawing and thus wrinkles can be hardly taken off. When the elastic modulus is too high, the tension applied at the drawing is elevated. In this case, it becomes necessary to strengthen the parts holding the both edges of the film and a heavier burden is loaded on the machine.

Although the thickness of the film before the drawing is not particularly restricted, it preferably ranges from 1 μm to 1 mm and still preferably from 20 to 200 μm from the viewpoints of the stability in film retention and uniformity in drawing.

<Dyeing Formulation and Method>

The polarizing film can be obtained by orienting and dyeing a polymer film for the polarizing film such as a PVA film. Dyeing can be carried out by gas phase or liquid phase adsorption. The liquid phase adsorption can be performed by, for example, using iodine as a polarizer and immersing the polymer film for the polarizing film in an aqueous solution of iodine-potassium iodide. It is preferable that the iodine concentration ranges from 0.1 to 20 g/l, the potassium iodine concentration ranges from 1 to 200 g/l and the mass ratio of iodine to potassium iodide ranges from 1 to 200. The dyeing time is preferably from 10 to 5000 seconds and the liquid temperature is preferably from 5 to 60° C. The dyeing method is not restricted to the immersion method but any dyeing means such as spraying may be employed. The dyeing procedure may be carried out either before or after the drawing step according to the invention. It is particularly preferable to dye the film in a liquid phase before the drawing step, since the film is thus adequately swollen and the drawing can be more easily carried out in this case.

<Addition of Film Hardener (Crosslinking Agent) and Metal Salt>

In the process of producing the polarizing film by drawing a polymer film for the polarizing film such as a PVA film, it is preferable to use an additive for crosslinking PVA. In the case of using the oblique drawing method according to the invention, in particular, the orientation direction of PVA sometimes deviates due to the tension in the drawing step unless PVA is not sufficiently hardened at the outlet of the drawing step. It is therefore preferable to add a film hardener (a crosslinking agent) to the film by immersing the film in a solution of the crosslinking agent or coating with the solution before the drawing step or during the drawing step. The means of adding the film hardener (crosslinking agent) to the polymer film is not particularly restricted but an arbitrary method such as immersion of the film in a solution, coating or spraying may be employed. In particular, the immersion method and the coating method are preferable. As the coating means, use can be made of any usually known procedure with the use of, for example, a roll coater, a dye coater, a bar coater, a slide coater or a curtain coater. It is also preferable to employ a method wherein the film is brought into contact with a fabric, cotton, a porous material or the like impregnated with the solution. As the film hardener (crosslinking agent), those cited in Reduplicated U.S. Pat. No. 232897. From a practical viewpoint, it is preferable to use boric acid or borax. It is also possible to use together with other metal salts of zinc, cobalt, zirconium, iron, nickel, manganese, etc.

The film hardener (crosslinking agent) may be added either before the engagement into the drawing machine or after the engagement. It may be carried out at any point until the end of the step (b) in the example of FIG. 2 or FIG. 3 at which the crosswise drawing is substantially completed. After adding the film hardener (crosslinking agent), a washing step or a water washing step may be provided.

<Polarizer>

In addition to iodine, it is also preferable to dye the film with a dichromatic dye. Specific examples of the dichromatic dye include pigment compounds such as azo pigments, stilbene pigments, pyrazolone pigments, triphenylmethane pigments, quinoline pigments, oxazine pigments, thiazine pigments and anthroquinone pigments. Water-soluble dyes are preferable, though the invention is not restricted thereto. It is also preferable that these dichromatic molecules have a hydrophilic substituent such as a sulfonate group, an amino group or a hydroxyl group introduced thereinto. Specific examples of the dichromatic molecules include C.I. Direct Yellow 12, C.I. Direct Orange 39, C.I. Direct Orange 72, C.I. Direct Red 39, C.I. Direct Red 79, C.I. Direct Red 81, C.I. Direct Red 83, C.I. Direct Red 89, C.I. Direct Violet 48, C.I. Direct Blue 67, C.I. Direct Blue 90, C.I. Direct Green 59, C.I. Acid Red 37 and so on. Moreover, citation may be made of pigments reported in JP-A-62-070802, JP-A-1-161202, JP-A-1-172906, JP-A-1-172907, JP-A-1-183602, JP-A-1-248105, JP-A-1-265205 and JP-A-7-261024. These dichromatic molecules are employed as free acids or alkali metal salts, ammonium salts or amine salts. By blending two or more of these dichromatic molecules, a polarizer having various color hues can be produced. It is preferable to use a compound (a pigment) showing a black color as a polarizer or a polarizing plate in the case of intersecting at right angle with a polarization axis, or to blend various dichromatic molecules so as to show a black color, since an excellent monoplate transmittance and a high polarization ratio can be established thereby.

Also, the drawing method according to the invention is preferably usable in the production of a polyvinylene-based polarizing film by dehydrating PVA or dechlorinating polyvinyl chloride to give a polyene structure and obtaining polarization by conjugated double bonds.

<Protective Film>

To one face of the circular polarizing plate according to the invention, a protective film is bonded before using. The protective film is not restricted in type but use can be made of cellulose esters such as cellulose acetate, cellulose acetate butyrate and cellulose propionate, polycarbonate, polyolefin, polystyrene, polyester, etc. therefor.

The protective film is usually fed in a rolled state. It is preferable that the protective film is continuously bonded to the circular polarizing plate in a continuous length in such a manner that the longer directions thereof agree with each other. The orientation axis (the slow axis) of the protective film may be in any direction. Form the convenience in performance, it is preferable that the orientation axis of the protective film is parallel to the longer direction. Before bonding the protective film, a hard coat film may be provided on one or both faces thereof. In the case of using as the outermost layer, it is particularly preferable to form a hard coat film having a pencil hardness of 2H or more.

Since the absorption axis of the polarizing film in a continuous length according to the invention is not parallel to the longer direction, a polarizing plate wherein the absorption axis of a polarizing film is not parallel to the orientation film of a protective film can be obtained by continuously bonding a protective film having an orientation axis parallel to the longer direction to the polarizing film in a continuous length according to the invention. Such a polarizing plate, wherein the absorption axis of the polarizing film is not parallel to the orientation axis of the protective film bonded thereto, has an advantage of being excellent in dimensional stability. This is particularly favorable in the case of using in a liquid crystal display unit. In the invention, the angle of the slow axis of the protective film to the absorption axis of the polarizing film is 20° or more but less than 70° and preferably 40° or more but less than 50° from the viewpoint of the effect of achieving a high dimensional stability.

It is generally preferable that the protective film has a low retardation. In the case where the absorption axis of the polarizing film is not parallel to the orientation axis of the protective film, the polarization axis and the orientation axis (the slow axis) of the protective film are obliquely deviated when the retardation value of the protective film exceeds a definite level. This is undesirable since the direct polarization alters into elliptic polarization in this case. Therefore, it is necessary in the invention to regulate the retardation value to 20 nm or less, preferably 10 nm or less and still preferably 5 mm or less at a wavelength of 632.8 nm.

From the viewpoint of such a low retardation, it is particularly preferable to select cellulose triacetate as the polymer to be used as the protective film. It is also preferable to use polyolefins such as ZEONEX and ZEONOA (each manufactured by ZEON Corporation) and ARTON (manufactured by JSR). As other examples, non-double refractive optical resin materials reported in, for example, JP-A-8-110402 or JP-A-11-293116 may be cited.

In the process of producing the circular polarizing plate in the invention, the protective film is bonded to the polarizing film in a state with a low moisture content. Therefore, it is possible to bond a film having a low moisture permeability such as a retardation film (a $\lambda/4$ plate or a $\lambda/2$ plate), as the protective film, directly to the polarizing film. Thus, it becomes possible to provide a thinner and lighter display unit having protective films in a number less by two than the existing products per liquid crystal display device. However, it is also possible, as a matter of fact, that a retardation film is bonded with a pressure-sensitive adhesive or the like after bonding protective films to both faces of the polarizing film.

<Adhesive>

The adhesive to be used in bonding the protective film to the polarizing film is not particularly restricted. Examples thereof include PVA-based resins (including modified PVAs having an acetoacetyl group, a sulfonate group, a carboxyl group, an oxyalkylene group and so on) and aqueous solutions of boron compounds. Among all, PVA-based resins are preferable. The thickness of the adhesive layer after drying preferably ranges from 0.01 to 10 µm and still preferably from 0.05 to 5 µm.

<Consistent Process>

In the invention, it is preferable to employ, after drawing, the drying step in which the film (the polarizing film) is shrunk and the volatile content is lowered. In the state where the moisture content of the polarizing film is reduced to 10% or less (preferably 5% or less) after the drying or during the drying, the protective film and the $\lambda/4$ plate are bonded to the polarizing film followed by the post-heating step. To speak the bonding procedure more specifically, the film is retained at the both edges during the drying step and the protective film and the $\lambda/4$ plate are bonded to the film using an adhesive. Next, the both edges are cut off. Alternatively, the film is relieved from the retention members at the both edge after drying and then the film edges are cut off followed by bonding the protective film and the $\lambda/4$ plate. To cut the film edges, use may be made of a technique commonly employed such as the method of using a cutter or the like or the method of using laser beams. After bonding, it is preferable to heat to thereby dry the adhesive and improve the polarization performance. The heating conditions varies depending on the adhesive. In the case of a water-base adhesive, it is preferable to heat to 30° C. or higher, still preferably 40° C. or higher but not higher than 100° C. and still preferably 50° C. or higher but not higher than 80° C. Taking the performance and productivity into consideration, it is preferable to carry out these steps in a consistent production line.

<Punching>

Figure 8:
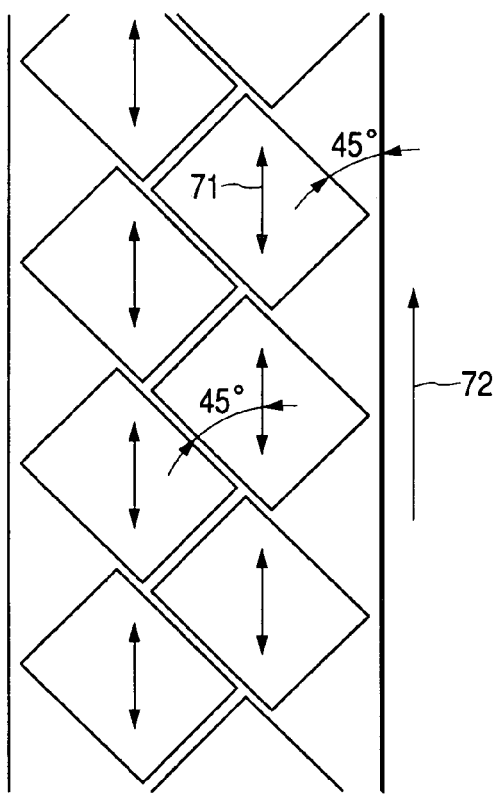
FIG. 8 shows a procedure of punching a circular polarizing plate.
Figure 9:
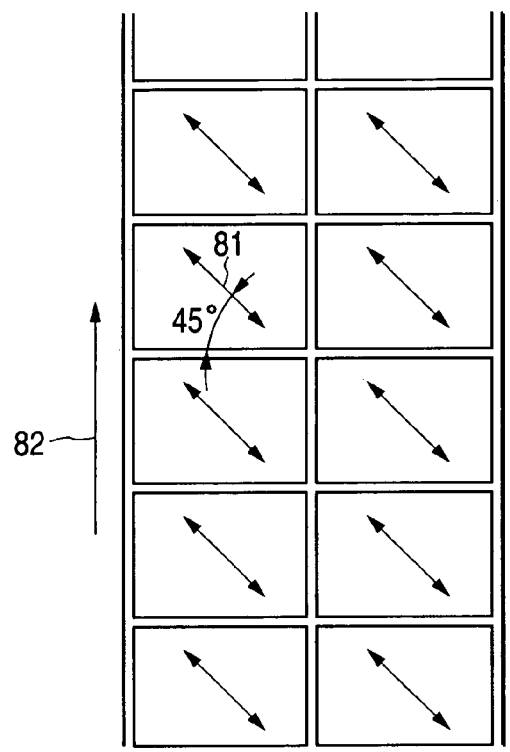
FIG. 9 shows a exemplary procedure of punching a circular polarizing plate.

FIG. 8 shows an example of a procedure of punching a conventional circular polarizing plate, while FIG. 9 shows an example of a procedure of punching a circular polarizing plate according to the invention. In the conventional circular polarizing plate, the absorption axis 71 (i.e., the drawing axis) of the polarizing film agrees with the longer direction 72, as shown in FIG. 8. In the circular polarizing plate according to the invention, in contrast thereto, the absorption axis 81 (i.e., the drawing axis) of the polarizing film slopes at an angle of 45° to the longer direction 82, as shown in FIG. 9. In the case of bonding the polarizing plate to a liquid crystal cell in a LCD, this angle agrees with the angle between the absorption axis of the polarizing film and the lengthwise or crosswise direction of the liquid crystal cell per se, which makes obliquely punching unnecessary in the punching step. As FIG. 9 shows, moreover, the circular polarizing plate according to the invention is linearly cut along the longer direction. Therefore, it can be produced by slitting along the longer direction too without resort to punching, thereby achieving a remarkably improved productivity.

The circular polarizing plate to be used in the touch panel according to the invention has been described.

(Touch Panel)

In the invention, the touch panel has a fixed substrate in the side closer to the display device and a movable substrate facing to it. The fixed substrate and the movable substrate face respectively to transparent conductive films. To improve the display qualities, it is preferable that the fixed substrate and the movable substrate are made of transparent optical materials. In the case of the touch panel having this constitution, it is particularly preferable to use transparent substrates having a low double refractivity.

Examples of the material to be used for the fixed substrate include glass, amorphous films and polymer films made of polyether sulfone, polycarbonate, polyallylate, polyethylene terephthalate, cellulose ester, cyclic olefins, etc.

As the movable substrate, it is preferable in the invention to employ a retardation plate. As discussed above, it is still preferable to employ a movable substrate constructed by bonding to the polarizing film simultaneously with a cellulose ester film which serves as the base material of the hard coat layer as well as a protective film. However, the retardation plate to be used in the invention may be provided separately from the touch panel. It is also possible to use the retardation plate in one or both of the fixed substrate and the movable substrate. In the case where the retardation plate is made of a cellulose ester film, it is particularly preferable to use the film as the movable substrate.

A gap is formed between the transparent conductive films respectively provided for the two substrates. Although there is an air layer in the gap in usual, the gap may be filled with a liquid having a refractive index close to that of the transparent electrode so as to perform optical matching. It is also possible to provide an undercoat layer to the transparent conductive films in the substrate side or an overcoat layer to the transparent conductive films in the side opposite to the substrates to thereby reduce light reflection. To lessen stickiness and improve durability, the surface of the transparent conductive films may be roughened.

A spacer may be provided in the gap. As the spacer, use is made of a dot spacer or a bonded material provided around the fixed substrate or the movable substrate. As the dot spacer, it is preferable to use one of about 0.005 to 1.0 mm in height.

To detect the data input position with the touch panel, use can be made of either a digital system (a matrix system) or an analog system.

In the digital system (the matrix system), a matrix is formed by the transparent conductive film of the fixed substrate (for example, the X-array) and the transparent conductive film of the movable substrate (for example, the Y-array). Thus the data position can be detected corresponding to the contact position of the transparent conductive films with each other under pressing.

In the analog system, electrodes are formed at the both ends in the X-axis direction of the fixed substrate and at the both ends in the Y-axis direction of the movable substrate. Then the resistances in the X-direction and the Y-direction occurring due to the contact of the transparent conductive films with each other under pressing are detected to thereby detect the data input position.

In the invention, it is preferable that the touch panel is used together with a display device. However, the touch panel member may be provided separately from the display member. Alternatively, these members may be integrated together.

(Transparent Conductive Film)

It is preferable that the transparent conductive films to be used in the touch panel according to the invention have a surface resistivity of 2000 Ω/□ (Ω/square) or less, still preferably 1000 Ω/□ or less and still preferably 100 Ω/□ or more but not more than 900 Ω/□.

The transparent conductive films having such a surface resistivity as defined above may be formed by applying a dispersion of a conductive fine particles, a metal alkoxide solution, etc. onto the substrate surface. Alternatively, they may be formed by co-casting a conductive fine particles, a metal alkoxide solution, etc. with a solution for forming the substrate. It is also possible to form the transparent conductive films by using a vacuum film-forming method such as the sputtering method, the vacuum deposition method, the ion plating method or the CVD method, or the gas phase growth method due to atmospheric pressure. Among these methods, it is preferable to employ the sputtering method, the vacuum deposition method or the ion plating method and the sputtering method is particularly preferable therefor. It is also possible to combine some of these methods.

A transparent conductive film may be formed either on one face or both faces of a substrate.

As a coating solution of the conductive fine particle dispersion, use can be made of a coating solution containing at least one type of fine particles selected from among fine metal particles, fine metal oxide particles and fine metal nitride particles.

Examples of the above-described fine metal particles include fine particles of metals such as gold, silver, copper, aluminum, iron, nickel, palladium, platinum, etc. and alloys thereof. Among all, fine particles of silver and silver alloys are preferable. From the viewpoint of weatherability, a palladium-silver alloy is particularly preferable. In the palladium-silver alloy, the palladium content preferably ranges from 5 to 30% by mass. A lower palladium content brings about a poor weatherability, while a higher palladium content causes a decrease in the conductivity.

Examples of the method of preparing the fine metal particles include the low-vacuum deposition method of preparing fine particles and the metal colloid preparation method wherein an aqueous solution of a metal salt is reduced with a reducing agent such as iron (II), hydrazine, boron hydride or an amine such as hydroxyethylamine.

Examples of the fine metal oxide particles include fine particles of $In_2O_3$ type compounds (including doped materials of Sn, etc.), $SnO_2$ type compounds (including doped materials of F, Sb, etc.), ZnO type compounds (including doped materials of Al, Ga, etc.), $TiO_2$, $Al_2O_3$, $SiO_2$, MgO, BaO, $MoO_3$, $V_2O_5$ and composites thereof and so on.

Examples of fine metal nitride particles include fine particles of TiN and so on.

The average particle size of these conductive fine particles preferably ranges from 1.0 to 700 nm, still preferably from 2.0 to 300 nm and most desirably from 5.0 to 100 nm. In the case where the particle size is too large, the light absorption by the conductive fine particles is enlarged. As a result, the light transmittance of the particle layer is lowered and, at the same time, the haze is enlarged. In the case where the average particle size of these conductive fine particles is less than 1.0 nm, the fine particles can be hardly dispersed and the surface resistance of the fine particle layer is rapidly elevated. As a result, it becomes impossible to obtain a conductive film (a conductive fine particle layer) having a low resistance at such a level as allowing the achievement of the objects of the invention.

The conductive fine particle layer can be formed by applying a coating, which is prepared by dispersing the conductive fine particles in a solution mainly comprising water or an organic solvent, etc., onto the base material.

Before the coating, the base material may be subjected to a surface treatment or undercoating. Examples of the surface treatment include corona discharge treatment, glow discharge treatment, (wet) treatment with chromic acid, flame treatment, hot-air treatment, ozone/UV light irradiation treatment, etc. As the material of the undercoat layer, use may be made of copolymers of vinyl chloride, vinylidene chloride, butadiene, (meth)acrylic acid ester, vinyl ester, etc. or water-soluble polymers such as latex and gelatin, though the invention is not restricted thereto.

To stabilize the dispersion of the conductive fine particles, it is preferable to use a solution mainly comprising water. As a water-miscible solvent, it is preferable to use an alcohol such as ethyl alcohol, n-propyl alcohol, i-propyl alcohol, butyl alcohol, methyl cellosolve or butyl cellosolve.

The coating dose of the conductive fine particles preferably ranges from 10 to 1000 $mg/m^2$, still preferably from 20 to 500 $mg/m^2$ and most desirably from 50 to 150 $mg/m^2$. An excessively small coating dose causes a poor conductivity, while an excessive large coating dose worsens light transmittance.

The transparent conductive film may contain a binder. Alternatively, it may be made substantially exclusively of the conductive fine particles without containing any binder.

In the case of using a binder, a hydrophilic binder, a hydrophobic binder or a latex can be used, though the material thereof is not specifically restricted. Examples of the hydrophilic binder include gelatin, gelatin derivatives, agar, sodium alginate, starch, polyvinyl alcohol, polyacrylic acid copolymers, maleic anhydride copolymers, carboxymethylcellulose, carboxyethylcellulose, hydroxymethylcellulose, hydroxyethylcellulose and so on. Examples of the hydrophobic binder include cellulose esters (for example, nitrocellulose, diacetylcellulose, triacetylcellulose and methylcellulose), vinyl polymers including vinyl chloride, vinylidene chloride and vinyl acrylate, and polymers such as polyamide and polyester.

To improve the conductivity and light transmittance, the transparent conductive film can be treated with heat or water. It is preferable that the heat treatment temperature is 150° C. or lower, still preferably form 100° C. to 150° C., though it varies depending on the heat resistance of the polymer film. At a temperature higher than 150° C., the polymer film is frequently deformed due to heat. At a temperature lower than 100° C., the effect of the heat treatment can be scarcely achieved and thus the heat treatment time is prolonged.

As the method of the heat treatment, it is preferable to treat the film by passing through a heating zone in the state of a web, since a uniform treatment can be performed thereby. The retention time can be controlled depending on the length of the heating zone and the traveling speed. Although it is also possible to heat a rolled film in a thermostatic chamber, a time schedule should be designed in this case by taking variation in heat conduction into consideration.

Before the heat treatment, the transparent conductive film may be treated with water (for example, washing with water) to thereby further improve the efficiency of the heat treatment. The water treatment such as water-washing may be carried out by applying water alone by a commonly employed method, more specifically speaking, applying water by dip coating or using a wire bar, and a method of pouring water to the transparent conductive film with a spray or a shower. After applying water to the transparent conductive film, the excessive water may be scratched off with a wire bar or a rod bar or eliminated with an air knife, if needed.

By such a water treatment, the surface resistance of the transparent conductive layer can be further lowered after the heat treatment. In addition, remarkable effects of elevating the transmittance, smoothening the transmission spectrum and lowering the refractive index after overlaying an antireflective layer can be thus established.

As the vacuum film-forming method for forming the transparent conductive film, use can be made of the method reported in *Tomeidodenmaku no Shintenkai*, CMC, supervised by Yutaka Sawada, *Gekkan Disupurei*, September, 1999.

Examples of the metal oxide to be subjected to the film formation include $In_2O_3$ type compounds (including doped materials of Sn, etc. and ITO), $InO_2$ type compounds (including doped materials of Sb, etc.), ZnO type compounds (including doped materials of Al, Ga, etc.) and composites thereof such as $In_2O_3$-ZnO type compounds. Examples of the metal nitride include TiN and so on. Also, silver may be used together in the film formation.

In the case of forming the transparent conductive film on the polymer film by the sputtering method or the like, it is favorable to coat the film surface with a polymer such as a fluorinated resin, an acrylic resin, a silicone resin, a propylene resin or a vinyl resin or an inorganic matter such as $SiO_2$, $TiO_2$, $ZrO_2$ or $SnO_2$. It is also preferable to coat the film surface with a polymer having inorganic fine particles dispersed therein.

The film thickness of the coating is preferably 2 nm or more but not more than 100 μm, still preferably 2 nm or more but not more than 50 μm and particularly preferably 2 nm or more but not more than 10 μm. In the case of forming a film containing indium oxide as the main component by the sputtering method, it is possible to form reactive sputtering with the use of a metal target containing indium as the main component or a baked target containing indium oxide as the main component. The latter target is preferred form the viewpoint of controlling the reaction. It is particularly preferable to use indium oxide containing tin oxide. The content of tin oxide preferably ranges from 1% by mass to 20% by mass and still preferably from 3% by mass to 12% by mass. In the reactive sputtering method, an inert gas such as argon is employed as the sputtering gas and oxygen is employed as the reactive gas. It is preferable to use the plasma emission monitor method for controlling the oxygen flow rate. Although the discharge system is not particularly restricted, it is preferable to use a DC magnetron sputter, an RF magnetron sputter or a method of applying AC voltage between a pair of targets. The substrate temperature at the film formation is not particularly determined. However, there is a tendency that the film strength is improved in the case of heating at an available temperature not exceeding the glass transition temperature of the substrate.

It is preferable that the light transmittance of the substrate thus provided with the transparent conductive film is 70% or more, still preferably 80% or more and particularly preferably 90% or more.

In the case of using ITO, for example, the thickness of the transparent conductive film preferably ranges from 5 to 200 nm, still preferably from 7 to 150 nm and still preferably from 10 nm to 30 nm. In some cases, the whole face of the transparent conductive film may be employed as the electrode. Alternatively, it is subjected to resist-formation and patterning by etching after forming the whole face electrode.

As the fixed substrate in the two substrates constituting the touch panel, use may be made of a glass plate as described above and a film having the transparent conductive film may be bonded to the glass substrate. Alternatively, a polymer film having the transparent conductive film may be directly used as a substitute for the glass substrate. Furthermore, it is possible to an appropriate sheet having transparent conductivity. Concerning the movable substrate, it is preferable that the transparent conductive film is provided at least on one face of the substrate. Needless to say, it is also possible to bond a film having a transparent conductive film to the substrate.

(Liquid Crystal Display Unit)

The touch panel according to the invention can be located on a liquid crystal cell of a liquid crystal display unit and employed as an inner type touch panel. However, it can be used in combination with various display units other than the liquid crystal display unit. Examples of these display units include a cathode ray tube (CRT), a plasma display (PDP), a field emission display (FED), an inorganic EL device, an organic EL device and so on. Because of having the retardation plate and the circular polarizing plate, the touch panel according to the invention can reduce the reflection of outer light in these display units. Among these display units, it is preferable to combine the touch panel according to the invention with the inorganic EL device or the organic EL device, in addition to the liquid crystal display unit.

Although the liquid crystal mode to be used in the liquid crystal display unit is not particularly restricted, it is preferable to employ the TN (twisted nematic) mode, the STN (super twisted nematic) mode, the HAN (hybrid aligned nematic) mode, the OCT (optically compensated bend) mode, the ECB (electrically controlled birefringence) mode, the. VA (vertically aligned) mode or the GH (guest host) mode therefor.

The twist angle of the TN mode liquid crystal cell preferably ranges from 40 to 100°, still preferably from 50 to 90° and most desirably from 60 to 80°. The product (And) of the refractive anisotropy (Δn) of the liquid crystal layer and the thickness (d) of the liquid crystal layer preferably ranges from 0.1 to 0.5 μm and still preferably from 0.2 to 0.4 μm.

Polarizing films include iodine type polarizing films, dye type polarizing films using dichromatic dyes and polyene type polarizing films. The iodine type polarizing films and the dye-type polarizing films are generally produced with the use of polyvinyl alcohol-based films. The polarization axis of a polarizing film corresponds to the direction perpendicular to the drawing direction of the film.

A reflective liquid crystal display unit can be used either in the normally white mode, wherein a bright display is presented under a low application voltage and a dark display is presented under a high application voltage, or in the normally black mode, wherein a dark display is presented under a low application voltage and a bright display is presented under a high application voltage, though the normally white mode is preferred.

EXAMPLES

Examples of the invention will be presented. However, it is to be understood that the invention is not construed as being restricted thereto.

Example 1

(Formation of Protective Film)

At room temperature, 120 parts of cellulose acetate having an average degree of acetylation of 59.7% was mixed with 9.36 parts by weight of triphenylene phosphate, 4.68 parts by weight of biphenyl diphenyl phosphate, 538.2 parts by weight of methylene chloride and 46.8 parts by weight of methanol to give a solution (a dope). The obtained dope was casted onto a stainless band and the film was dried until the self-holding properties of the film were established. Then the film was peeled off from the band and dried at 120° C. for 30 minutes.

The thickness of the thus obtained film was 102 μm.

(Hard Coat Layer)

(Production of Material for Hard Coat Layer)

(Synthesis of Ring-Opening Polymerizable Group-Containing Compound A)

Under a nitrogen stream, 275 ml of methyl ethyl ketone (MEK) was stirred at 60° C. for 1 hour. Then 0.5 g of V-65 (a polymerization initiator manufactured by Wako Pure Chemical Industries, Ltd.) dissolved in 8.3 ml of MEK was added thereto all at once. Subsequently, glycidyl methacrylate (50 g) was dropped thereinto over 2 hours. After the completion of the addition, a solution of V-65 (0.5 g) in MEK (8.3 ml) was added and the mixture was reacted for 2 hours. After adjusting the reaction temperature to 80° C., the reaction was performed for 2 hours. After the completion of the reaction, the mixture as cooled to room temperature. The reaction solution thus obtained was dropped into 10 L of hexane over 1 hour. The precipitate was dried under reduced pressure at 35° C. for 8 hours. Thus, 45 g of a ring-opening polymerizable group-containing compound A was obtained.

(Preparation of Dispersion of Inorganic Crosslinking Fine Particles)

The following reagents were weighed into a ceramic-coated vessel.

| | |
|---|---|
| methyl isobutyl ketone | 234 g |
| anionic functional group-containing surface treatment agent S-6 (X═H) $H_2C$═$C(X)COO(C_5H_{10}COO)_2H$ | 36 g |
| Alumina C (manufactured by Nippon Aerosil Co., Ltd., average particle size: 13 nm) | 180 g |

The above mixture was finely dispersed in a sand mill (¼ Gsand mill) at 1600 rpm for 10 hours. As media, 1400 g of zirconia beads (diameter: 1 mm) were employed. After the completion of the dispersion, the beads were separated and thus a dispersion of surface-modified inorganic crosslinking fine particles was obtained.

(Preparation of Hard Coat Solution)

An ethylenically unsaturated group-containing compound, the ring-opening polymerizable group-containing compound A, a radical polymerization initiator (IRGACURES 184 manufactured by Ciba-Geigy) and a cationic polymerization initiator (UVI-6990 manufactured by Union Carbide Japan) were dissolved in a methyl isobutyl ketone/ methyl ethyl ketone mixture (1/1). Next the dispersion of inorganic crosslinking fine particles was added thereto and the resultant mixture was stirred for 30 minutes to give a hard coat solution. The combination of the ethylenically unsaturated group-containing compound with the ring-opening polymerizable group-containing compound was selected as listed in Table 1 and the mixing ratio of the ethylenically unsaturated group-containing compound, the ring-opening polymerizable group-containing compound and the crosslinking fine particles was regulated to the level as specified in Table 1.

Concerning the polymerization initiators, the radical polymerization initiator and the cationic polymerization initiator were added in 2.9% portions based on the total mass of the ethylenically unsaturated group-containing compound and the ring-opening polymerizable group-containing compound. In the case where no ring-opening polymerizable group-containing compound A was contained, 5.8% of the radical polymerization initiator alone was added.

(Formation of Protective Film Provided with Hard Coat Layer)

Using the protective film constructed above, the surface was glow-discharged. Then the hard coat layer solution prepared above was applied thereto with a wire bar to give a film thickness as specified in Table 1. After drying at 120° C. for 2 minutes, it was irradiated with UV light in a dose of 750 mJ/cm² and heated to 120° C. for 10 minutes to give a protective film provided with a hard coat layer. This film had a retardation value of 5 nm.

(Formation of Retardation Plate)

At room temperature, 100 parts by weight of cellulose acetate having an average degree of acetylation of 59.5% was mixed with 7.8 parts by weight of triphenyl phosphate, 3.9 parts by weight of biphenyl diphenyl phosphate, 1.32 parts by weight of the following retardation elevating agent, 587.69 parts by weight of methylene chloride and 50.85 parts by weight of methanol to give a solution (a dope).

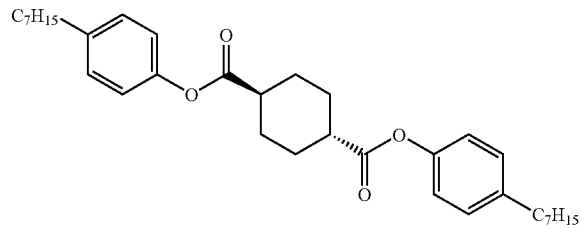

The obtained dope was casted onto a film-forming band and dried at room temperature for 1 minute and then at 45° C. for 5 minutes. After drying, 30% by mass of the solvent remained. The cellulose ester film was separated from the band and dried at 120° C. for 10 minutes. Next, it was drawn at 130° C. in the direction parallel to the casting direction substantially at 1.34-fold. The film was allowed to freely shrink in the direction perpendicular to the drawing direction. After drawing and drying at 120° C. for 30 minutes, the thus drawn film was taken out. After drawing, 0.1% by mass of the solvent remained therein.

The obtained polymer film had a thickness of 113 μm. Its retardation values (Re) at wavelengths of 450 nm, 550 nm and 590 nm measured with an ellipsometer (M-150, manufactured by JASCO) were respectively 125.2 nm, 137.8 nm and 141.1 nm. Thus, this cellulose ester film established λ/4 over a wide wavelength range.

Based on the results of the measurement of refractive index with the use of an Abbe refractometer and the measurement of angle-dependency of retardation, the refractive index (nx) in the in-plane slow axis direction, the refractive index (ny) in the direction perpendicular to the in-plane slow axis direction and the refractive index (nz) in the thickness direction at 550 nm were determined. The value (nx−nz)/(nx−ny) thus calculated was 1.48.

(Formation of Retardation Plate Provided with Transparent Conductive Film)

The above-described retardation plate was set in a sputtering apparatus of the winding type. After evacuating a vacuum tank until the pressure level attained 1.2 mPa, an Ar+$O_2$ gas mixture ($O_2$=1.5%) was introduced therein and the pressure was adjusted to 0.25 Pa. Then sputtering was performed at a substrate temperature of 120° C. and at an input power density of 1 W/cm$^2$. Thus, an $In_2O_3$ type transparent conductive film having a thickness of 21 nm was formed.

The surface resistivity in the transparent conductive film side of the retardation plate provided with the transparent conductive film thus obtained measured by the four terminal method was 406 Ω/□ and the light transmittance thereof was 88%.

The retardation values (Re) of the retardation plate provided with the transparent conductive film thus obtained at wavelengths of 450 nm, 550 nm and 590 nm measured with an ellipsometer (M-150, manufactured by JASCO) were respectively 125.2 nm, 137.8 nm and 141.1 nm. Thus, this retardation plate still established λ/4 over a wide wavelength range after attaching the transparent conductive film.

Based on the results of the measurement of refractive index with the use of an Abbe refractometer and the measurement of angle-dependency of retardation, the refractive index (nx) in the in-plane slow axis direction, the refractive index (ny) in the direction perpendicular to the in-plane slow axis direction and the refractive index (nz) in the thickness direction at 550 nm were determined. The value (nx−nz)/(nx−ny) thus calculated was 1.48.

(Formation of Movable Substrate)

A polarizing film was formed in the following manner.

A PVA film having an average degree of polymerization of 1700 and a film thickness of 75 μm was washed with ion-exchanged water in the both faces at a flow rate of 2 L/min. After eliminating the moisture from the surface with air-blowing, the PVA film was immersed in an aqueous solution containing 1.0 g/l of iodine and 60.0 g/l of potassium iodide at 25° C. for 90 seconds. Further, it was immersed in another aqueous solution containing 40 g/l of boric acid and 30 g/l of potassium iodide at 25° C. for 120 seconds. After eliminating excessive moisture by air-blowing the both faces of the film to thereby control the moisture content of the film to 2% or less, the film was introduced into a tenter drawing machine. Then the film was fed in a length of 100 m at a traveling speed of 5 m/min, drawn 5.5-fold in an atmosphere of 40° C. and 95% and then shrunk 4.0-fold. Subsequently, it was dried at 60° C. while maintaining the width at a definite level. When the moisture content of the drawn film attained 6%, the retardation plate A provided with the transparent conductive film formed above was bonded to one face while a cellulose ester film provided with a hard coat layer was bonded to the other face with the use of a 3% aqueous solution of PVA (PVA-117H manufactured by Kurary Co., Ltd.) as an adhesive. Then it was further heated to 60° C. for 30 minutes. The retardation plate A provided with the transparent conductive film was bonded in the face opposite to the transparent conductive film, while the cellulose ester film provided with the hard coat layer was bonded after saponifying the face opposite to the hard coat layer. Next, the film was released from the tenter and the edges were cut by 3 cm in the crosswise with a cutter, thereby forming a movable substrate comprising the circular polarizing plate A in a rolled state having an effective width of 650 nm and a length of 100 m.

The drying point was located midway in the zone (c) and the moisture content of the PVA film before the initiation of the drawing was 30% while its moisture content after the drying was 1.5%.

The traveling speeds of the left and right tenter clips were less than 0.05% and the angle between the center line of the introduced film and the center line of the film to be fed into the next step was 0°. At this point, |L1−L2| was 0.7 m and W was 0.7 m, thereby satisfying the relationship |L1−L2|=W. Neither wrinkling nor film deformation was observed at the outlet of the tenter.

The direction of the absorption axis of the circular polarizing plate A thus obtained sloped by 45° to the slow axis of the protective film (Fujitac) and that of the λ/4 plate. The degree of polarization measured at 550 nm was 99.97% and the monoplate transmittance was 42.9%. The thickness of the circular polarizing plate A was 251 μm.

Further, this movable substrate was cut into a size 84 mm×64 mm corresponding to the size of the bottom substrate of Zaurus MI-C1 (manufactured by Sharp). The obtained movable substrate weighed 1.56 g and had a thickness of 251 μm.

The protective film was saponified in the following manner. Namely, a 1.5 N aqueous NaOH solution was prepared and the protective film and the face of the polarizing plate to which the protective film was to be bonded were each saponified for 180 seconds followed by washing with water and neutralization.

(Formation of Touch Panel)

A glass plate of 0.7 mm in thickness provided with a transparent conductive film (ITO) having a surface resistivity of one face of 400 Ω/□ was prepared. Then a dot spacer of 1 mm in pitch was printed on its surface and silver electrodes were printed on the both edges. Further, silver electrodes were printed on the both edges of the retardation plate face provided with the transparent conductive film which was a part of the above-described movable substrate. Then the above-described transparent conductive glass plate was bonded thereto in such a manner that the transparent conductive films faced to each other. At the same time, a flexible electrode was attached. In this step, an insulating bonding agent of 100 μm in thickness was inserted around these substrates. Thus a touch panel was constructed.

(Formation of Reflective Liquid Crystal Display Unit Provided with Touch Panel)

From a reflective liquid crystal display unit provided with a touch panel (Power Zaurus MI-C1, manufactured by Sharp) using a TN mode liquid crystal cell, the touch panel was taken off and a polarizing plate and a retardation plate were separated. Then the touch panel constructed above was attached thereto.

Using the following methods, evaluation was made on the transmittance, haze and pencil hardness of the protective film provided with the hard coat layer formed above; the operability of the touch panel; and the reflectivity (white display and black display) and contrast of the touch panel.

Table 1 shows the results. In Table 1, DPHA represents a mixture of dipentaerythritol pentaacrylate/dipentaerythritol hexaacrylate (manufactured by Nippon Kayaku).

Example 2

A reflective liquid crystal display unit provided with a touch panel was constructed as in Example 1 but altering the film thickness of the hard coat layer as shown in Table 1.

Evaluation was made on the same items as in Example 1. Table 1 shows the results.

Example 3

(Preparation of Hard Coat Layer Coating Solution (h-1))

Glycidyl methacrylate was dissolved in methyl ethyl ketone (MEK). Under dropping a heat polymerization initiator, reaction was carried out at 80° C. for 2 hours. The reaction solution thus obtained was dropped into hexane and the precipitate was dried under reduced pressure. The thus obtained polyglycidyl methacrylate (molecular weight in terms of polystyrene: 12,000) was dissolved in methyl ethyl ketone to give a concentration of 50% by mass. 100 parts by mass of the resulting solution was mixed under stirring with 150 parts by mass of trimethylolpropane triacrylate (VIS-COAT #295, manufactured by Osaka Organic Chemical Industry), 6 parts by mass of a photoradical polymerization initiator (IRGACURE 184, manufactured by Ciba-Geigy) and 6 parts by mass of a photocationic polymerization initiator (RHODOSIL 2074, manufactured by Rhodia) dissolved in 30 parts by mass of methyl isobutyl ketone, thereby giving a hard coat layer coating solution.

(Formation of Protective Film Provided with Hard Coat Layer)

The substrate film given in Table 1 was glow-discharged and then the above-described coating solution for hard coat layer was applied thereon with a wire bar and dried to give the addition ratio and film thickness as specified in Table 1. After irradiating with UV light, a protective film provided with a hard coat layer was formed.

(Formation of Retardation Plate Provided with Transparent Conductive Film)

A transparent conductive film was attached to the retardation plate formed in Example 1 in the same manner as in Example 1 to give a retardation plate provided with the transparent conductive film.

(Formation of Movable Substrate)

A movable substrate was formed as in Example 1.

(Formation of Touch Panel)

A touch panel was formed as in Example 1.

(Formation of Reflective Liquid Crystal Display Unit Provided with Touch Panel)

A liquid crystal display unit provided with a touch panel was formed as in Example 1.

Evaluation was made on the same items as in Example 1. Table 1 shows the results.

Example 4

A reflective liquid crystal display unit provided with a touch panel was constructed as in Example 3 but altering the film thickness of the hard coat layer as shown in Table 1.

Evaluation was made on the same items as in Example 1. Table 1 shows the results.

Example 5

(Preparation of Hard Coat Layer Coating Solution (h-2))

306 parts by weight of a mixture of dipentaerythritol pentaacrylate with dipentaerythritol hexaacrylate (DPHA, manufactured by Nippon Kayaku) was dissolved in a solvent mixture comprising 16 parts by weight of methyl ethyl ketone and 220 parts by weight of cyclohexanone. To the solution thus obtained was added 7.5 parts by weight of a photopolymerization initiator (IRGACURE 907, manufactured by Ciba-Geigy) followed by stirring until it was dissolved. Next, 450 parts by weight of MEK-ST (a dispersion of $SiO_2$ sol in methyl ethyl ketone, average particle size: 10 to 20 nm, solid concentration: 30% by mass, manufactured by Nissan Chemical Industries, Ltd.) was added and stirred. The obtained mixture was filtered through a polypropylene filter (PPE-03) of 3 μm in pore size, thereby giving a hard coat layer coating solution h-2.

(Formation of Protective Film Provided with Hard Coat Layer)

The substrate film given in Table 1 was glow-discharged and then the above-described coating solution for hard coat layer was applied thereon with a wire bar and dried to give the addition ratio and film thickness as specified in Table 1. After irradiating with U light, a protective film provided with a hard coat layer was formed.

(Formation of Retardation Plate Provided with Transparent Conductive Film)

A transparent conductive film was attached to the retardation plate formed in Example 1 in the same manner as in Example 1 to give a retardation plate provided with the transparent conductive film.

(Formation of Movable Substrate)

A movable substrate was formed as in Example 1.

(Formation of Touch Panel)

A touch panel was formed as in Example 1.

(Formation of Reflective Liquid Crystal Display Unit Provided with Touch Panel)

A liquid crystal display unit provided with a touch panel was formed as in Example 1.

Evaluation was made on the same items as in Example 1. Table 1 shows the results.

Example 6

A reflective liquid crystal display unit provided with a touch panel was constructed as in Example 1 but altering the film thickness of the hard coat layer as shown in Table 1.

Evaluation was made on the same items as in Example 1. Table 1 shows the results.

Example 7

A reflective liquid crystal display unit provided with a touch panel was constructed as in Example 4 but using a retardation plate B formed in the following manner as a substitute for the retardation plate A in Example 4. Formation of retardation plate B (Formation of First Orientation Film)

An optically isotropic rolled cellulose triacetate film of 100 μm in thickness, 500 mm in width and 500 m in length was employed as a transparent support.

A dilution of the following copolymer (1) was continuously applied onto one face of the transparent support to form a first (perpendicular) orientation film having a thickness of 0.5 μm. Next, continuous rubbing was carried out in the direction slanting to the right by 16° to the longer direction of the transparent support.

Copolymer (1):

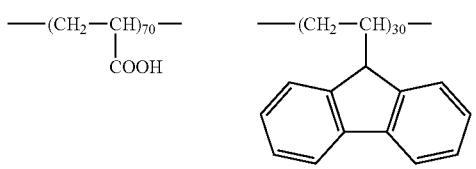

(Formation of First Optically Anisotropic Layer)

On the first orientation film, a coating solution of the following composition was continuously applied with a bar coater, dried and heated (aging of orientation). Further, it was irradiated with UV light to form a first optically anisotropic layer of 1.6 μm in thickness. This first optically anisotropic layer had a slow axis in the direction at an angle of 74° to the longer direction of the transparent support. The retardation value at a wavelength of 550 nm was 225 nm.

| Composition of first optically anisotropic layer coating solution | |
|---|---|
| the following rod-shaped liquid crystal compound (1) | 14.5% by mass |
| the following sensitizer | 1.0% by mass |
| the following photopolymerization initiator | 3.0% by mass |
| the following horizontal orientation accelerator | 1.0% by mass |
| methyl ethyl ketone | 80.5% by mass |

Rod-Shaped Liquid Crystal Compound (1):

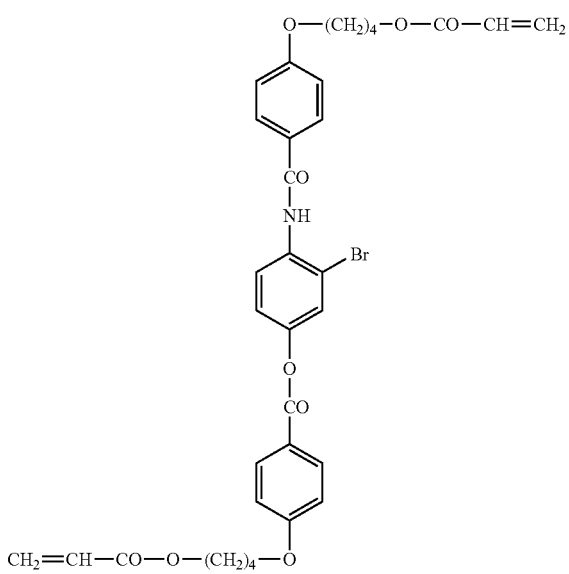

Sensitizer: Photopolymerization Initiator:

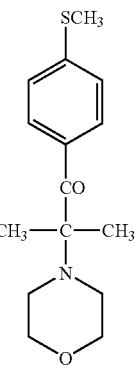

Horizontal Orientation Accelerator:

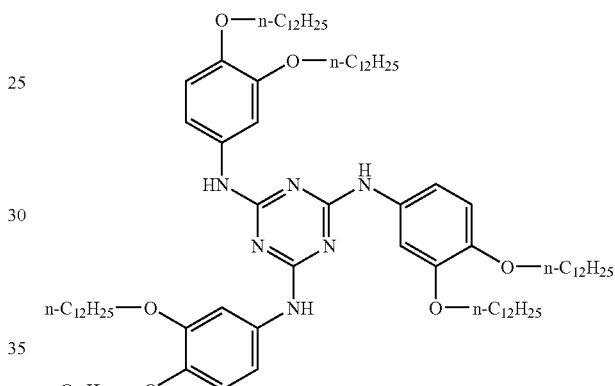

(Formation of Second Orientation Film)

A dilution of the following copolymer (2) was continuously applied on the first optically anisotropic layer to form a second (parallel) orientation film having a thickness of 0.5 μm. Next, continuous rubbing was carried out in the direction slanting to the left by 16° to the longer direction of the transparent support (i.e., the direction slanting to the right by 580 to the slow axis of the first optically anisotropic layer).

Copolymer (2):

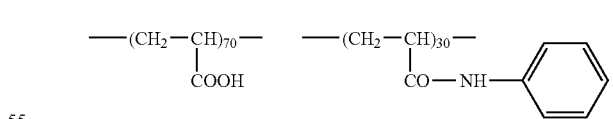

(Formation of Second Optically Anisotropic Layer)

On the second orientation film, a coating solution of the following composition was continuously applied with a bar coater, dried and heated (aging of orientation). Further, it was irradiated with UV light to form a second optically anisotropic layer of 0.8 μm in thickness. This second optically anisotropic layer had a slow axis in the direction at an angle of 74° in the left to the longer direction of the transparent support. The retardation value at a wavelength of 550 nm was 113 nm.

| Composition of second optically anisotropic layer coating solution | |
|---|---|
| the rod-shaped liquid crystal compound (1) used in first anisotropic layer | 13.0% by mass |
| the sensitizer used in first anisotropic layer | 1.0% by mass |
| the photopolymerization initiator used in first anisotropic layer | 3.0% by mass |
| the horizontal orientation accelerator used in first anisotropic layer | 1.0% by mass |
| methyl ethyl ketone | 82.0% by mass |

(Evaluation of λ/4 Plate)

The λ/4 plate constructed was irradiated with light (measurement wavelengths: 450 nm, 550 nm and 590 nm) and the phase differences (retardation values: Re) of the transmitted light were measured. Table A shows the results.

TABLE A

| Retardation plate | Re(450 nm) | Re(550 mn) | Re(590 nm) |
|---|---|---|---|
| Calculated | 112.5 nm | 137.5 nm | 147.5 nm |
| Example 1 | 110 nm | 136 nm | 146 nm |

The angle between the slow axis direction of the first optically anisotropic layer and the slow axis direction of the polarizing plate was adjusted to 15°. Thus, a touch panel was constructed.

Example 8

A reflective liquid crystal display unit provided with a touch panel was constructed as in Example 4 but using a retardation plate C formed in the following manner as a substitute for the retardation plate A in Example 4.

Formation of Retardation Plate C (Formation of First Orientation Film)

An optically isotropic rolled cellulose triacetate film of 100 μm in thickness, 500 mm in width and 500 m in length was employed as a transparent support.

A dilution of the following copolymer (3) was continuously applied onto one face of the transparent support to form a first (perpendicular) orientation film having a thickness of 0.8 μm. Next, continuous rubbing was carried out in the direction slanting to the right by 16° to the longer direction of the transparent support.

Copolymer (3):

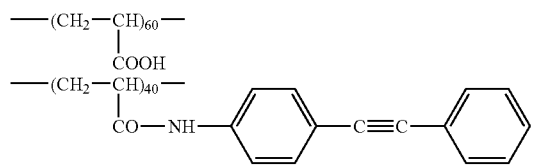

(Formation of First Optically Anisotropic Layer)

On the first orientation film, a coating solution of the first optically anisotropic layer used in Example 1 was continuously applied with a bar coater, dried and heated (aging of orientation). Further, it was irradiated with UV light to form a first optically anisotropic layer of 1.6 μm in thickness. This first optically anisotropic layer had a slow axis in the direction at an angle of 74° to the longer direction of the transparent support. The retardation value at a wavelength of 550 nm was 224 nm.

(Formation of Second Orientation Film)

A dilution of the copolymer (2) used in Example 1 was continuously applied on the first optically anisotropic layer to form a second (parallel) orientation film having a thickness of 0.5 μm. Next, continuous rubbing was carried out in the direction slanting to the left by 16° to the longer direction of the transparent support (i.e., the direction slanting to the right by 58° to the slow axis of the first optically anisotropic layer).

(Formation of Second Optically Anisotropic Layer)

On the second orientation film, the coating solution of the second optically anisotropic layer used in Example 1 was continuously applied with a bar coater, dried and heated (aging of orientation). Further, it was irradiated with UV light to form a second optically anisotropic layer of 0.8 μm in thickness. This second optically anisotropic layer had a slow axis in the direction at an angle of 16° in the left to the longer direction of the transparent support. The retardation value at a wavelength of 550 nm was 113 nm.

(Evaluation of λ/4 Plate)

The λ/4 plate constructed was irradiated with light (measurement wavelengths: 450 nm, 550 nm and 590 nm) and the phase differences (retardation values: Re) of the transmitted light were measured. Table 2 shows the results.

TABLE 2

| Retardation plate | Re(450 nm) | Re(550 mn) | Re(590 nm) |
|---|---|---|---|
| Calculated | 112.5 nm | 137.5 nm | 147.5 nm |
| Example 2 | 110 nm | 136 nm | 146 nm |

The angle between the slow axis direction of the first optically anisotropic layer and the slow axis direction of the polarizing plate was adjusted to 15°. Thus, a touch panel was constructed.

Example 9

A reflective liquid crystal display unit provided with a touch panel was constructed as in Example 4 but further forming a subsequent antireflective layer on the hard coat layer.

(Formation of Antireflective Layer)

(1) Preparation of Coating Solution of High-Refractive Index Layer 30.0 parts by mass of fine titanium dioxide particles (TTO-55B, manufactured by Ishihara Sangyo Kaisha), 4.5 parts by mass of a carboxylate group-containing monomer (ARONIXM-5300 manufactured by Toagosei, Ltd.) and 65.5 parts by mass of cyclohexanone were dispersed in a sand grinder mill to prepare a titanium dioxide dispersion having a mass-average particle size of 55 nm. The above-described titanium dioxide dispersion was mixed with dipentaerythritol hexaacrylate (DPHA, manufactured by Nippon Kayaku) and a photopolymerization initiator (IR-GACURE 184, manufactured by Ciba-Geigy, 5% based on the total monomer content, i.e., dipentaerythritol hexaacrylate+anionic monomer+cationic monomer) so as to adjust the refractive index of the high-refractive index layer to 1.85.

(2) Preparation of Coating Solution of Low-Refractive Index Layer 60 parts by mass of pentaerythritol tetraacrylate (PETA, manufactured by Nippon Kayaku), 2 parts by mass of a and a photopolymerization initiator (IRGACURE 184, manufactured by Ciba-Geigy), 9 parts by mass of MEGAFAC 531A ($C_8F_{17}SO_2N(C_3H_7)CH_2CH_2OCOCH=CH_2$, manufactured by Dainihon Ink & Chemicals) and methyl ethyl ketone were mixed together and stirred to give a coating solution of low-refractive index layer.

The refractive index is controlled by adding a dispersion of fine silicon dioxide particles having a mass-average particle size of 12 nm which was prepared by dispersing 30.0 parts by mass of fine silicon dioxide particles (AEROSIL 200 manufactured by Nippon Aerosil), 4.5 parts by mass of a carboxylate group-containing monomer (ARONIX M-5300 manufactured by Toagosei, Ltd.) and 65.5 parts by mass of cyclohexanone in a sand grinder mill. In this Example, the refractive index was adjusted to 1.53.

(3) Formation of Hard Coat Film Provided with Antireflective Layer

To a plastic film provided with a hard coat (having the same meaning as "a hard coat film"), the coating solution of high-refractive index layer was applied with a wire bar, dried and irradiated with UV light to give a dry film thickness of 75 nm. Further, the coating solution of low-refractive index layer was further applied onto the high-refractive index layer with a wire bar, dried and irradiated with UV light to give a dry film thickness of 90 nm, thereby forming an antireflective hard coat film having an antireflective layer.

Example 10

A reflective liquid crystal display unit provided with a touch panel was constructed as in Example 9 but altering the refractive index of the high-refractive index layer of the antireflective layer to 1.80, altering the refractive index of the low-refractive index layer to 1.50, and using the same hard coat layer as in Example 5.

Example 11

A reflective liquid crystal display unit provided with a touch panel was constructed as in Example 9 but altering the refractive index of the high-refractive index layer of the antireflective layer to 1.70 and the thickness thereof to 80 nm, and altering the refractive index of the low-refractive index layer to 1.50.

Example 12

A reflective liquid crystal display unit provided with a touch panel was constructed as in Example 9 but altering the refractive index of the high-refractive index layer of the antireflective layer to 1.90 and the thickness thereof to 72 nm, and altering the refractive index of the low-refractive index layer to 1.50.

Example 13

A reflective liquid crystal display unit provided with a touch panel was constructed as in Example 9 but using the retardation plate B as a substitute for the retardation plate A.

Example 14

A reflective liquid crystal display unit provided with a touch panel was constructed as in Example 9 but using the retardation plate C as a substitute for the retardation plate A.

Example 15

A reflective liquid crystal display unit provided with a touch panel was constructed as in Example 14 but altering the thickness of the base film provided with the hard coat to 80 µm, altering the thickness of the cellulose triacetate film of the retardation plate to 60 µm to give a retardation plate D and altering the circular polarizing plate thickness to 202 µm.

Example 16

A movable substrate was constructed as in Example 1 but forming no hard coat layer. Via an adhesive layer, the protective film provided with hard coat was bonded thereon. Then the movable substrate was cut into a size 84 mm×64 mm corresponding to the size of the bottom substrate of Zaurus MI-C1 (manufactured by Sharp).

Thus, the resultant movable substrate weighed 2.26 g and had a thickness of 350 µm.

Comparative Example 1

A reflective liquid crystal display unit provided with a touch panel was constructed as in Example 1 but forming on hard coat layer. Evaluation was made on the same items as in Example 1. Table 1 shows the results.

Comparative Example 2

Evaluation was made on the respective items of a commercially available reflective liquid crystal display unit provided with a touch panel using a TN-mode liquid crystal cell (Power Zaurus MI-C1, manufactured by Sharp). The transmittance, haze and pencil hardness of the film were evaluated by peeling off the surface plastic film having a hard coat from the above-described unit. Table 1 shows the results.

(Evaluation Method)

Evaluation of Transmittance and Haze of Protective Film Provided with Hard Coat Layer The transmittance and haze of a protective film provided with a hard coat layer were measured by using a haze meter (Model 1001DP, manufactured by Nippon Denshoku).

Evaluation of Pencil Hardness

A protective film provided with a hard coat layer and a protective film having no hard coat layer were conditioned at a temperature of 25° C. under a relative humidity of 60% for 2 hours and then subjected to the pencil hardness evaluation test specified in JIS-K-5400 with the use of pencils for the test according to JIS-S-6006. Using a 1 kg weight, the films were scratched five times with each of pencils having various hardnesses. The pencil hardness was expressed in the hardness of a pencil causing no mark. Although the marks as defined in JIS K5400 involve: (1) a breakage of a coating film, (2) a scratch in the coating film but (3) a dent in a coating is excluded therefrom, a dent in the coating film was also regarded as a mark in this case.

Confirmation of Operability of Touch Panel and Evaluation of Optical Properties (Reflectivity and Contrast)

The operability of a reflective liquid crystal display unit provided with a touch panel was confirmed. The evaluation results were indicated in the following three grades.

| | |
|---|---|
| ⊚: | Responding to a slight touch to the touch panel display with a polyacetal pen (for example, Pentopia, manufactured by Pilot). |
| ○: | Responding to a touch to the touch panel display with a polyacetal pen. |
| Δ: | Responding to a strong touch to the touch panel display with a polyacetal pen. |

Moreover, a black display reflectivity and a white display reflectivity were measured by using a reflectometer (Model CM-2002, manufactured by Minolta) and thus the contrast (white display reflectivity/black display reflectivity) was calculated.

Evaluation of Resistance to Steel Wool

A surface of a protective film provided with a hard coat layer and a protective film having no hard coat layer were rubbed with steel wool (#0000) fifty times under a pressure of 1.96N/m². The surface was then observed by eye. The evaluation results were indicated in the following three grades.

| | |
|---|---|
| ○: | No damage was observed |
| Δ: | Few damages were observed, but within an allowance |
| X: | A lot of damages are observed, and out of an allowance |

TABLE 1

| | Protective film having hard coat layer | | | | | | | |
|---|---|---|---|---|---|---|---|---|
| | Base film | | Crosslinking group-containing compound (mixing ratio: %) | | Packing ratio of inorganic crosslinking fine particles (vol %) | Hard coat film thickness after hardening (μm) | Retardation plate | Thickness (μm) of retardation plate |
| | Base film type | Base film thickness (μm) | Ethylenically unsaturated group-containing compound | Ring-opening polymerizable group-containing compound | | | | |
| Ex.1 | triacetylcellulose | 102 | DPHA (65) | A (35) | 12.8 | 17 | A | 113 |
| Ex.2 | triacetylcellulose | 102 | DPHA (70) | A (30) | 12.8 | 39 | A | 113 |
| Ex.3 | triacetylcellulose | 102 | h-1 | | — | 17 | A | 113 |
| Ex.4 | triacetylcellulose | 102 | h-1 | | — | 39 | A | 113 |
| Ex.5 | triacetylcellulose | 102 | h-2 | | 6.1 | 3 | A | 113 |
| Ex.6 | triacetylcellulose | 102 | h-2 | | 6.1 | 10 | A | 113 |
| Ex.7 | triacetylcellulose | 102 | h-1 | | — | 39 | B | 103 |
| Ex.8 | triacetylcellulose | 102 | h-1 | | — | 39 | C | 104 |
| Ex.9 | triacetylcellulose | 102 | h-1 | | — | 39 | A | 113 |
| Ex.10 | triacetylcellulose | 102 | h-2 | | — | 39 | A | 113 |
| Ex.11 | triacetylcellulose | 102 | h-2 | | — | 39 | A | 113 |
| Ex.12 | triacetylcellulose | 102 | h-2 | | — | 39 | A | 113 |
| Ex.13 | triacetylcellulose | 102 | h-1 | | — | 39 | B | 103 |
| Ex.14 | triacetylcellulose | 102 | h-1 | | — | 39 | C | 104 |
| Ex.15 | triacetylcellulose | 80 | h-1 | | — | 39 | D | 64 |
| Ex.16 | triacetylcellulose (2 sheets) | 102×2 | DPHA (65) | A (35) | 12.8 | 17 | A | 113 |
| C.Ex.1 | triacetylcellulose | 102 | | | — | — | A | 113 |
| C.Ex.2 | polyethylene terephthalate + hard coat | | | | | | — | — |

| | Thickness (μm) of polarizing film | refractive index Thickness of movable substrate (circular polarizing plate) | Antireflective layer | | | | Protective hard coat | | | |
|---|---|---|---|---|---|---|---|---|---|---|
| | | | High-refractive index layer | | Low-refractive film having layer | | | | | |
| | | | Refractive index | Thickness (μm) | Refractive index | Thickness (μm) | haze (%) | Pencil hardness | Resistance to steel wool | Touch panel operability |
| Ex.1 | 19 | 251 | — | — | | | 0.6 | 3H | ○ | ○ |
| Ex.2 | 19 | 273 | — | — | | | 0.8 | 4H | ○ | ○ |
| Ex.3 | 19 | 251 | — | — | | | 0.5 | 3H | ○ | ○ |
| Ex.4 | 19 | 273 | — | — | | | 0.7 | 4H | ○ | ○ |
| Ex.5 | 19 | 237 | — | — | | | 0.4 | 2H | ○ | ○ |
| Ex.6 | 19 | 244 | — | — | | | 0.5 | 3H | ○ | ○ |
| Ex.7 | 19 | 263 | — | — | | | 1.0 | 4H | ○ | ○ |
| Ex.8 | 19 | 264 | — | — | | | 0.7 | 4H | ○ | ○ |
| Ex.9 | 19 | 273 | 1.85 | 75 | 1.53 | 90 | 0.7 | 4H | ○ | ○ |
| Ex.10 | 19 | 273 | 1.80 | 75 | 1.50 | 90 | 0.7 | 3H | ○ | ○ |
| Ex.11 | 19 | 273 | 1.70 | 80 | 1.50 | 90 | 0.5 | 3H | ○ | ○ |
| Ex.12 | 19 | 273 | 1.90 | 72 | 1.50 | 90 | 0.4 | 3H | ○ | ○ |
| Ex.13 | 19 | 263 | 1.85 | 75 | 1.53 | 90 | 0.6 | 4H | ○ | ○ |
| Ex.14 | 19 | 264 | 1.85 | 75 | 1.53 | 90 | 0.5 | 4H | ○ | ○ |
| Ex.15 | 19 | 262 | 1.85 | 75 | 1.53 | 90 | 0.5 | 4H | ○ | ⊚ |
| Ex.16 | 19 | 350 | — | — | | | 0.5 | 2H | ○ | ○–Δ |

TABLE 1-continued

| | | | | | | | | | |
|---|---|---|---|---|---|---|---|---|---|
| C.Ex.1 | 19 | 234 | — | — | | 1.0 | B | X | ○ |
| C.Ex.2 | — | — | — | — | | 0.4 | H | Δ | ○ |

| | white display reflectivity (%) | Black display reflectivity (%) | Contrast (white display reflectivity/black display reflectivity) |
|---|---|---|---|
| Ex.1 | 10.5 | 4.9 | 2.14 |
| Ex.2 | 10.3 | 5 | 2.06 |
| Ex.3 | 10.3 | 4.9 | 2.1 |
| Ex.4 | 10.4 | 4.9 | 2.12 |
| Ex.5 | 10.3 | 4.9 | 2.1 |
| Ex.6 | 10.4 | 4.9 | 2.12 |
| Ex.7 | 10.5 | 5.0 | 2.10 |
| Ex.8 | 10.5 | 4.9 | 2.19 |
| Ex.9 | 6.5 | 1.6 | 4.06 |
| Ex.10 | 6.26 | 1.4 | 4.47 |
| Ex.11 | 7.15 | 2.2 | 3.25 |
| Ex.12 | 6.23 | 1.32 | 4.72 |
| Ex.13 | 6.6 | 1.7 | 3.88 |
| Ex.14 | 6.6 | 1.5 | 4.40 |
| Ex.15 | 6.65 | 1.48 | 4.49 |
| Ex.16 | 10.2 | 5.2 | 1.96 |
| C.Ex.1 | 10.7 | 4.7 | 2.28 |
| C.Ex.2 | 20.2 | 15 | 1.35 |

As the data given in Table 1 clearly show, the touch panels according to the invention have high hardness and excellent scuff resistance while sustaining favorable operability, contrast and haze.

The inner type touch panel according to the invention has a high hardness and an excellent scuff resistance while sustaining favorable operability, contrast and haze. A liquid display unit provided with this inner type touch panel has a favorable operability, a high contrast, a good visibility, a low haze and an excellent scuff resistance.

In producing the inner touch panel according to the invention, a polarizing film is formed by dyeing and drawing and then boned to a protective film and a retardation plate each in the state of continuous length. Thus, the production can be consistently performed in-line, which is advantageous from the viewpoints of production process and cost.

This application is based on Japanese Patent application JP 2002-205971, filed Jul. 15, 2002, Japanese Patent application JP 2002-205972, filed Jul. 15, 2002, Japanese Patent application JP 2002-243770, filed Aug. 23, 2002, and Japanese Patent application JP 2002-174781, filed Jun. 14, 2002, the entire contents of those are hereby incorporated by reference, the same as if set forth at length.

What is claimed is:

1. A touch panel comprising:
   a cellulose film provided with a hard coat layer having a pencil hardness of 2H or more;
   a polarizing film;
   a retardation plate;
   a first transparent conductive film;
   a second transparent conductive film; and
   a substrate, in this order,
   wherein
   the first and second transparent conductive films are provided so as to face each other,
   the cellulose film, the hard coat layer, the polarizing film, the retardation plate and the first transparent conductive film define a movable substrate, and
   the cellulose film has a retardation value of 20 nm or less and an absorption axis of the polarizing film is placed so as to make an angle of 20° or higher but lower than 70° to a slow axis of the cellulose film and the retardation plate.

2. The touch panel according to claim 1, wherein the retardation plate is a λ/4 retardation plate.

3. The touch panel according to claim 2, wherein the λ/4 retardation plate comprises at least two optically anisotropic layers and at least one of the optically anisotropic layers comprises a liquid crystal compound.

4. The touch panel according to claim 1, wherein the movable substrate has a thickness of from 80 to 300 μm.

5. The touch panel according to claim 1, which further comprises an antireflective layer comprising two or more layers having different refractive indexes provided on the hard coat layer, wherein the hard coat layer and the antireflective layer are layers comprising a hardened product of a hardening resin which hardens upon irradiation with an active energy beam.

6. The touch panel according to claim 1, wherein the hard coat layer comprises a hardened product of a hardening resin comprising metal oxide particles, wherein the hardening resin hardens upon irradiation with an active energy beam.

7. The touch panel according to claim 1, wherein a side of at least one of the cellulose film and the retardation plate is saponified, the side facing the polarizing film.

8. A process for producing the touch panel according to claim 1, comprising a step of in-line bonding a cellulose film, a polarizing film, and a retardation plate.

9. A device comprising a display unit and the touch panel according to claim 1.

* * * * *